(12) United States Patent  
Wood et al.

(10) Patent No.: US 8,326,794 B1  
(45) Date of Patent: Dec. 4, 2012

(54) ACTIVE ELEMENT MANAGEMENT AND SUPPORT

(75) Inventors: Douglas A. Wood, Westford, MA (US); Mark A. Parenti, Milford, NH (US); George J. Grosner, Jr., Westborough, MA (US); Stephen J. Todd, Shrewsbury, MA (US)

(73) Assignee: EMC Corporation, Hopkinton, MA (US)

( * ) Notice: Subject to any disclaimer, the term of this patent is extended or adjusted under 35 U.S.C. 154(b) by 1107 days.

(21) Appl. No.: 12/002,431

(22) Filed: Dec. 17, 2007

(51) Int. Cl.
*G06F 7/00* (2006.01)
*G06F 17/00* (2006.01)
*G06F 17/30* (2006.01)
*G06F 12/00* (2006.01)
*G06F 15/16* (2006.01)
*G06F 3/00* (2006.01)
*G06F 9/44* (2006.01)
*G06F 9/46* (2006.01)

(52) U.S. Cl. .................. 707/600; 707/607; 719/319

(58) Field of Classification Search .................. None
See application file for complete search history.

(56) References Cited

U.S. PATENT DOCUMENTS

| 7,076,690 B1 * | 7/2006 | Todd et al. ........... 714/13 |
| 2003/0105824 A1 * | 6/2003 | Brechner et al. .......... 709/206 |
| 2004/0255144 A1 * | 12/2004 | Le-Rouzo et al. ......... 713/200 |

OTHER PUBLICATIONS

U.S. Appl. No. 11/906,127, filed Sep. 28, 2007, Wood, et al.
U.S. Appl. No. 11/906,149, filed Sep. 28, 2007, Wood, et al.
U.S. Appl. No. 11/906,134, filed Sep. 28, 2007, Wood, et al.
U.S. Appl. No. 12/002,945, filed Dec. 19, 2007, Moranta, et al.
U.S. Appl. No. 11/824,578, Gupta et al.
U.S. Appl. No. 11/906,127, Wood et al.
U.S. Appl. No. 11/906,149, Wood et al.
U.S. Appl. No. 11/906,134, Wood et al.

* cited by examiner

*Primary Examiner* — S. Sough
*Assistant Examiner* — Craig Dorais
(74) *Attorney, Agent, or Firm* — Muirhead and Saturnelli, LLC

(57) ABSTRACT

Described are techniques for providing support in connection with a data storage system. An active element manager component is used to perform, a data storage system management operation. The active element manager component collects context information. The context information is transmitted from the data storage system to an external environment. User relevant information is received at the active element manager component from the external environment. The external environment determines the user relevant information in accordance with the context information and support information and services provided by the external environment. The user relevant information includes information about one or more types of support. The user relevant information is displayed via a user interface.

17 Claims, 33 Drawing Sheets

| |
|---|
| User ID 622 |
| User Contact Information 624 |
| License Information 626 |
| Support and Service Contract Information 628 |
| Service Call and Problem History 630 |
| Data Storage Information 632 (Hardware and/or software; Configuration, Capacity) |
| Website Activity Information 634 (download paper, website query) |
| Live Chat Support 636 |
| Phone Support 638 |
| User Community Information 640 |
| ... .. |

ACTIVE ELEMENT MANAGEMENT AND SUPPORT

BACKGROUND

1. Technical Field

This application generally relates to data storage, and more particularly to techniques used for data storage management.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, software may be executed on the data storage system in connection with performing data storage administration tasks such as for data storage configuration, management, and/or monitoring. In connection with performing administrative tasks, help facilities may be integrated with software used for performing the administrative tasks. The help facilities may be available locally on the data storage system, for example, using help files statically included on a CD-ROM. If there is insufficient information included in the help facilities on the data storage system, the customer may invoke a web browser in a different session and manually enter information to navigate and search different websites on the Internet in efforts to obtain additional relevant information for performing the data storage administrative tasks. The foregoing has drawbacks in that such searches can be time consuming and cumbersome, the customer may lack sufficient knowledge to perform accurate searches, and the customer may obtain incorrect information from unreliable sources. In connection with performing the first task, the user may perform the data storage administration in a first session connected to the data storage system. In connection with performing the second task of searching for additional information about the problems encountered in the first task, the user may start a second session by invoking the web browser to navigate and search websites on the Internet. There is no information shared between the two tasks performed other than that which the user enters manually.

Thus, it may be desirable to utilize techniques in connection with data storage system management, configuration, and/or monitoring which provide for connections to other external locations and environments outside of the data storage system. It may also be desirable that such techniques provide for transfer of information between the data storage system and the environments external to the data storage system to assist the user in connection with performing different data storage system management tasks.

SUMMARY OF THE INVENTION

In accordance with one aspect of the invention is a computer-implemented method for providing support in connection with a data storage system, the method comprising: performing, by an active element manager component, a data storage system management operation in connection with a data storage device of the data storage system; collecting, by said active element manager component, context information, said context information including information about a current state of the data storage system in connection with said data storage management operation performed with an active element management session having a first user identifier; transmitting said context information from said data storage system to an external environment which has connectivity to said active element manager component and is external with respect to a data storage system environment including said data storage system; and receiving user relevant information at said active element manager component from said external environment, wherein said external environment determines said user relevant information in accordance with said context information and support information and services provided by said external environment, said user relevant information including information about one or more types of support, said one or more types of support including updated help, updated error messages, a software upgrade, available training, electronic publication, and an interactive support dialogue; and displaying, for said active element management session having said first user identifier, said user relevant information via a user interface. The step of transmitting may be performed in response to a selection to receive assistance in connection with performing said data management operation. The user relevant information may include information about at least one of updated help, updated error messages, and a software upgrade, and said user interface provides for display a first portion of said user relevant information, wherein, upon selection of said first portion, said active element manager component connects to a target location in said external environment that is associated with said user relevant information to obtain said at least one of updated help, updated error messages, and software upgrade. The active element manager component may be included in said data storage system and communicates with said external environment over a network connection, said external environment including a network location having a first website and the data storage system being location at another network location. The context information may include a trace log of one or more actions performed on the data storage system. The active element manager component may be configured to transfer control to one or more of a plurality of target locations in one or more external environments, said active element manager component performing processing to select, in accordance with said context information, said one or more target locations from said plurality of target locations. The step of transmitting may be performed at defined time intervals. The user relevant information may include information regarding at least one of training, a software upgrade, and a publication. The active element manager component may determine that a first of said one or more target locations includes a website of value added reseller, and said active element manager component may determine first information related to a component used in said data storage system supplied by said value added reseller and includes said first information in context information provided to said first target location. The method may also include: determining, in accordance with a license for said data storage system, a portion of said support information and services provided by said external environment; and performing processing in said external environment to ensure that said user relevant information only includes support information and services of said portion. The user relevant information may include an advertisement for a support feature not included in said portion. The step of receiving may occur in response to said transmitting. The step of receiving may occur in response to said external environment providing one of: a new training offering, a new software upgrade, or a new publication. At least one of said active element manager and said data storage system may be configured to transmit one or more instances of context information for defined time period and, wherein, if said user relevant information includes a training offering, said training offering may be displayed in said displaying only after said defined time period. The external environment may perform analysis of said context information to determine said user relevant information, said analysis including executing software on a computer of said external environment.

In accordance with another aspect of the invention is a data storage system comprising a computer readable medium with executable code stored thereon for providing support in connection with a data storage system, the computer readable medium comprising executable code for: performing, by an active element manager component, a data storage system management operation in connection with a data storage device of the data storage system; collecting, by said active element manager component, context information, said context information including information about a current state of the data storage system in connection with said data storage management operation performed with an active element management session having a first user identifier; transmitting said context information from said data storage system to a website provided by one of a vendor of the data storage system or a supplier of the data storage system; and receiving user relevant information at said active element manager component from said website, wherein said website performs processing that determines said user relevant information in accordance with said context information, license information for said data storage system, and support information and services provided by said first website, said user relevant information including information about one or more types of support, said one or more types of support including updated help, updated error messages, a software upgrade, available training, electronic publication, and an interactive dialogue with a support person; and displaying, for said active element management session having said first user identifier, said user relevant information via a user interface. The computer readable medium may further include executable code for: determining, in accordance with a license for said data storage system, a portion of said support information and services provided by said external environment; and performing processing in said external environment to ensure that said user relevant information only includes support information and services of said portion. The active element manager component may be configured by a value added reseller of said data storage system to transfer control to one or more of a plurality of target locations in one or more external environments, said active element manager component performing processing to select, in accordance with said context information, said one or more target locations from said plurality of target locations. The active element manager component may determine that a first of said one or more target locations includes a website of value added reseller, and said active element manager component determines first information related to a component used in said data storage system supplied by said value added reseller and includes said first information in context information provided to said first target location. Filtering of said support information may be performed in accordance with said license by said executable code for determining a portion of said support information and services provided by said external environment to ensure that only allowable support information is included in said user relevant information.

BRIEF DESCRIPTION OF THE DRAWINGS

Features and advantages of the present invention will become more apparent from the following detailed description of exemplary embodiments thereof taken in conjunction with the accompanying drawings in which:

FIG. 7A is an example representation of user profile information;

DETAILED DESCRIPTION OF EMBODIMENT(S)

Figure 1:
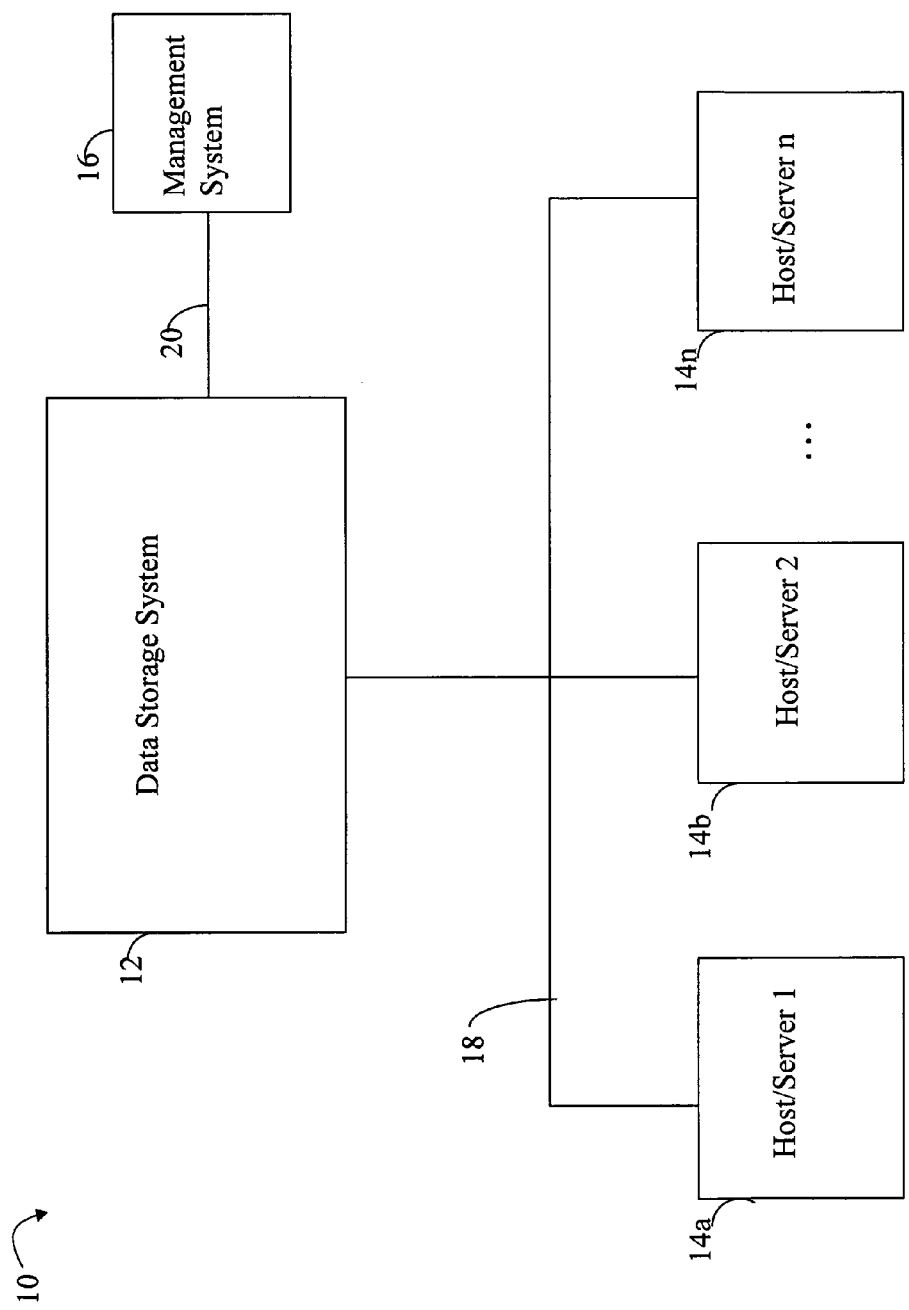
FIG. 1 is an example of an embodiment of a system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like. Techniques that may be used in connection with performing data storage configuration and configuration tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage configuration request.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Figure 2:
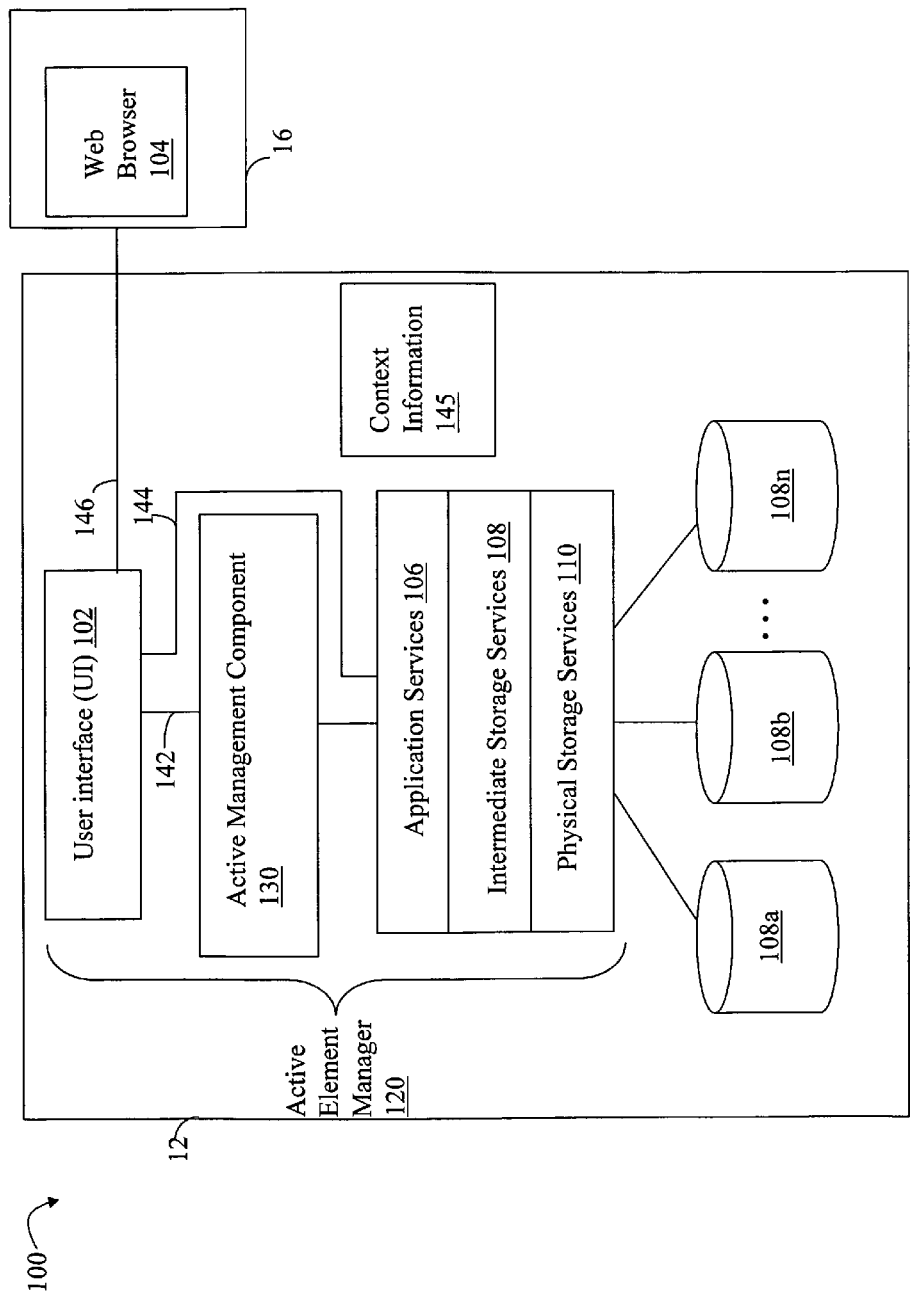
FIG. 2 is an example of components that may be included on the data storage system for use in performing the techniques herein.

Referring to FIG. 2, shown is an example of components that may be included on the data storage system 12 and the management system 16. The management system 16 may include a web browser 104 which is used when communicating with the active element manager (AEM) 120 of the data storage system 12. The AEM 120 may be used to perform operations in connection with management, configuration, monitoring, and the like, of the data storage system. For example, the AEM 120 may be used to provision storage used by any one or more different applications such as an email application, a database application, and file server, and the like. As described herein, the AEM 120 may also be used to facilitate interactions with environments and locations external to the data storage system 12 and management system 16, such as other computer network locations. In other words, the AEM 120 may be used to facilitate communications with other locations and environments external with respect to the data storage system environment in which the data storage system environment may include, for example, one or more data storage systems 12, the management system 16, a SAN, and the like.

The AEM 120 includes a user interface (UI) 102, an active management component 130, and one or more layers or levels of services, such as 106, 108 and 110, in connection with implementing a data storage request such as a data storage configuration request.

The user interface (UI) 102 may provide for one or more different types of user interfaces and associated data. For example, the UI 102 may provide support for a graphical user interface (GUI), command line interface (CLI), and the like, to support interactions between the data storage system 12 and the hosts 14a-14n of FIG. 1. The UI 102 may interact with other components on the data storage system in connection with communicating with a user. For example, the UI 102 may provide UI data (e.g., content or data used to populate the UI menus), and UI presentation or structure information (e.g., command organization or particular hierarchical menu structure) to another component such as the web browser 104 in connection with interacting with the user.

The active management component 130 may be used in connection with facilitating communications between the UI 102 and the different service layers 106, 108 and 110 when performing active element management operations. Active element management operations may be characterized as those involving interactions with environments and locations external to the data storage system environment. Such external environments and locations may include, for example, other network locations and websites as described elsewhere herein. The active management component 130 may facilitate a two-way communication flow of information to and/or from the external environments. The active management component 130 may gather context information 145 describing the current context and state of the data storage system with respect to the current user and operation being performed. The component 130 may gather such information included in 145 by communicating with other components on the data storage system 12, such as one or more of the service layers 106, 108 and 110. The component 130 may communicate the context information 145 to a target location in an external environment such as a target network location on the Internet. The component 130 may facilitate selecting, in accordance with the context information 145 of the data storage system, a target location in the external environment, such as an Internet website, and communicating the context information directly to the target location. The component 130 may also be used to facilitate communicating information received from the target location to the user.

In the example 100, the component 130 is represented as a single logical component. However, an embodiment may integrate the operations and functionality of the component 130 in the UI 102 and/or other components included in the AEM 120.

It should be noted that there are two paths 142 and 144 illustrated in FIG. 2. The path 142 may be used in connection with those operations involving interactions with environments external to the data storage system. The path 144 may be used when performing operations that do not involve such interactions with environments external to the data storage system 12 and management system 16. For example, the path 144 may be used in connection with performing a data storage configuration request issued by a user from the management system 16. The path 142 may be utilized if an operation or condition occurs involving the active management component 130 such as when the user requests connection to a website on the Internet for additional information and assistance with respect to an error that occurred as a result of the data storage configuration request.

In the example 100, the AEM 120 may include application services 106, intermediate or generic storage services 108, and physical storage services 110. In one embodiment, the user may interact with the UI communicating directly with any one of the different services 106, 108 and 110. In other words, a user may communicate directly with layer 106, 108 or 110. If a user provides an input request and/or data by directly communicating with one of the upper service layers, such as 106, the user request and/or data may be mapped to one or more lower service requests, such as by services of 106 communicating with services of 108 and/or 110 to implement the original input request. By connecting to the different service layers 106, 108 and 110, the UI may provide the user with exposure to different levels of abstraction in connection with performing data storage system management tasks. In one embodiment as described in more detail below, the different service layers may be in accordance with different levels of proficiency and knowledge with respect to performing data storage system management tasks for different applications.

The application services 106 may have an application-specific focus and provide a level of abstraction customized for an application such as, for example, a particular email application, law office application or medical office application, as well as a class of related applications, such as multiple email applications. The application services layer 106 may map the user provided inputs for use by the intermediate storage services 108. When a user interacts with the application services 106 for a particular application, the interface language may vary with the application. For example, if the application is a law office application, the interface language, menu options, and the like, may be tailored to the law profession. Similarly, a medical office application may utilize an interface language, menu options, and the like, familiar to the medical office. As such, the application services 106 may use one set of rules or mappings for each application to implement the application specific best practices for the user level. A first set of rules for the medical office application may be used to map the user input parameters using medical office terminology to parameters for the appropriate API calls for other services included in 108 and/or 110. A second set of rules for the law office application may be used to map the user input parameters using law office terminology to parameters for the appropriate API calls for other services 108 and/or 110. The user connecting to the data storage system at the application services 106 may be provided with a user interface customized for the selected level and application to perform a requested data storage configuration.

The intermediate storage services 108 may be an intermediate level. The application services 106 may communicate with the intermediate storage services 108 when implementing a request for data storage configuration. In one embodiment, a user connecting to the intermediate storage services 108 may be provided with a generic level of interaction which may not be tailored for the particular application. In other words, the same language and user interface may be presented to a user for multiple applications such as the medical application or law office application. As a variation to the foregoing, the intermediate storage services 108 may be customized for each application and provide for a more detailed level of exposure that varies per application.

The physical storage services 110 provide the most detailed or greatest level of exposure of the underlying data storage system. The physical storage services 110 may be customized for the particular storage vendor and associated options. The user interface for a user connected at to the physical storage services may include menu options and terms particular to the underlying storage vendor and the more knowledgeable user. For example, the user may specify particular devices, RAID levels and techniques, file types, SCSI and iSCSI terminology, and the like.

As an example in connection with a user making a data storage configuration request and communicating with the application services 106, the user may input data in connection with the request in an application specific context. For example, a user may make a data storage configuration request to configure data storage for a file system or email application. The data input by the user may be in the context of the particular application (e.g., a number of mailboxes, size of mailbox, storage group, and the like). The application-specific data received by the application services 106 may be mapped to one or more application-neutral or generic requests to the intermediate storage services 108. The intermediate storage services 108 may then make one or more calls to the physical storage services 110 to implement requests in the context of the physical storage devices 108a-108n, for example, for the particular data storage vendor and underlying hardware.

Software executed on the data storage system may provide for implementation of best practices for data storage configuration and data services in accordance with each particular application whose data is hosted on the data storage system. Such software may be included in the different service layers, such as 106, 108 and 110, of the AEM and are described in more detail in U.S. patent application Ser. No. 11/824,578, filed: Jun. 29, 2007, APPLICATION AWARE STORAGE, which is incorporated by reference herein. In such an embodiment using the different service layers, such as 106, 108 and 110 having an application-specific focus with each layer providing a different level of abstraction customized for each application, the UI may provide a user with different levels of exposure to information and requests when performing data storage system configuration tasks.

It will be appreciated by those skilled in the art that an embodiment may include different service layers in connection with performing the techniques described herein. For example, an embodiment of the AEM 120 may not incorporate services which have an application-specific focus and may not be characterized as application aware.

It should be noted that the example 100 is one possible embodiment of the components used in connection with the techniques herein. As illustrated in FIG. 2, the AEM 120 is included in the data storage system. In another embodiment using the techniques herein, the AEM 120 may be installed and execute on a host or other component connected to the data storage system. In yet another embodiment portions of the AEM 120, such as the UI 102 and/or one or more of the services 106, 108, 110 may be installed and execute on a host or other component connected to the data storage system.

Figure 3:
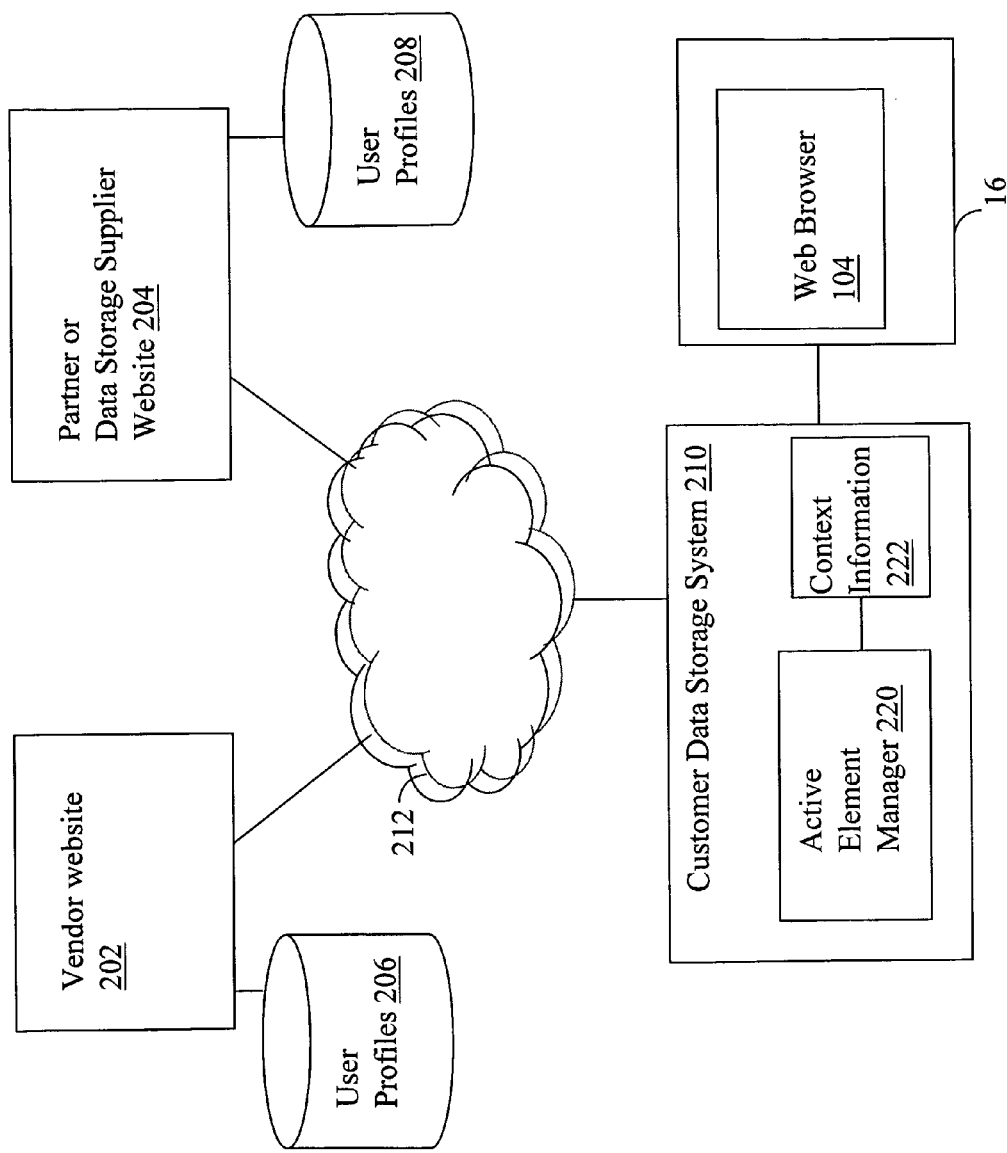
FIG. 3 is an example of a network that may include the data storage system utilizing the techniques herein.

Referring to FIG. 3, shown is an example 200 of a network in which the techniques herein may be performed. The example 200 includes a customer data storage system 210 connected to a network 212, such as the Internet, a vendor website 202 and a partner or data storage supplier website 204. The customer data storage system 210 may be a data storage system 12 as described elsewhere herein. The system 210 may include the AEM 220 which may generate the context information 222. A user may connect to the AEM 220 by logging in using a web browser 104 on the management system 16. As described herein, the data storage system 210 and management system 16 may be included in a data storage system environment. The data storage system 210 may be connected standalone to the network 212, may be included in a SAN, or other arrangement. The AEM 220 may be used in connection with producing the context information 222 and facilitating communication of the context information 222 to an external environment, such as one or more of the websites 202 and 204. Additionally, the AEM 220 may be used in connection with receiving information from the external environment and communicating the received information to the user, such as via the web browser 104.

The vendor website 202 may be a website of a data storage vendor or manufacturer, such as EMC Corporation. The partner or data storage supplier website 204 may be a website provided by a partner or data storage supplier. As an example, a partner or data storage supplier may be a distributor, reseller or VAR (Value added reseller) of the data storage systems of the vendor. In connection with examples provided herein, a particular partner or data storage supplier, such as a VAR, may be described for purposes of illustration and should not be construed as a limitation. As an example, a VAR may add additional hardware and/or software for use with the data storage system of a particular vendor and the VAR may sell the combination of the data storage system with VAR-added hardware and/or software to the customer. Each partner or data storage supplier may have a business relationship with the vendor or manufacturer of the data storage system. A customer may purchase a data storage system from one of the partners or data storage suppliers. As an example with respect to FIG. 3, the customer may purchase the data storage system 210 from a VAR. The VAR may provide an environment, such as a VAR website. The VAR website may be an illustrative example of website 204. The VAR website may include, for example, information on VAR hardware and software products, services, training and educational courses offered by the VAR, support for VAR-related products, VAR online store, VAR-sponsored user communities (e.g., using a particular application on a data storage system including VAR products), and the like. The website 204 may be provided by, and under the control of, the VAR or other partner. The vendor website 202 may be provided by, and under the control of, the data storage vendor or manufacturer. The vendor may provide website 202 for use by the vendor's partners. The vendor website 202 may include information regarding vendor supplied products, services, training, user communities, and the like, as may be included in the partner website 204 but, in contrast, may be vendor specific if included in 202. As will be described herein, the data storage system 210 may communicate, directly or indirectly, with the websites 202 and 204.

As described herein, the AEM 220 may be used in connection with configuring and management of the data storage system in the data storage system environment. The AEM may also be used to facilitate connecting the AEM on the data storage system with external environments along with context information from the data storage system.

As an example in connection with existing data storage systems not utilizing the AEM, a user may perform a data storage configuration operation, such as provision data storage for mailboxes in connection with an email application hosting data on the data storage system 210. An error may occur in connection with performing the data storage provisioning and the user may open up a new window or another web browser session. The user may manually enter a URL of a website which the user knows has additional information relevant to the provisioning task for the email application. If the user does not know the URL, the user may first perform a search, such as using an Internet search engine, to determine the correct URL. Once the user has the correct URL, the user may navigate to the URL for the website and perform queries at the website to gain additional information about how to handle the error encountered. In the foregoing, two tasks are performed: a first task in connection with the provisioning operation and a second task in connection with the subsequent search for additional information in connection with the error from the provisioning operation.

In connection with the AEM, the AEM may be used to automate the foregoing process and automatically connect the user to the correct website. Furthermore, the user may be connected to a particular page on the website. The context information of the data storage system on which the user encountered the error may be communicated to the target location, such as the website. The AEM may be used to obtain the relevant context information for use in connection with subsequent interactions between the user and the website to which the user is being connected. Additionally, the user may receive through the AEM additional information from the external environment of the target location. Thus, the AEM serves to facilitate automatically connecting the user to the appropriate external environment, providing the relevant context information to the target location of the external environment, and facilitating further communications between the data storage system 210 and the external environment.

The AEM 220 may be configured by the VAR or other partner selling the data storage system 210 to connect the user to the appropriate target location and external environment. For example, for errors occurring with VAR hardware and/or software, a customer may be automatically connected to the website 204 with the appropriate context information 222 for the data storage system as well as VAR hardware and/or software. If an error occurs with the data storage system having nothing to do with the VAR products, the customer may alternatively be connected to the vendor website 202. The customer may be directed to any one or more target locations at the external environment such as, for example, a virtual or online user community, a customer support agent, online store, and the like. As described herein, the user community may be characterized as a virtual community having a common interest. In connection with the techniques herein, there may be user communities focused on a particular vendor's hardware, combination of data storage system and application hosting storage therein, and the like. Members of the user community may exchange information regarding the common area of interest, for example, via a user community hosted at a website location. The user community may include user forums, blogs, various sources of technical information, and the like.

Included at each of the websites 202 and 204 may be, respectively, user profile data 206 and 208. The user profile data 206, 208 may be data gathered about the user, such as customer-related information about data storage systems purchased, license information, and data regarding current and previous interactions with the websites. In one embodiment, the set of user profile data 208 may be a master or aggregate copy of user profile data. The user profile data 206 may be collected for a time period, such as in connection with user interactions during the time period, and then provided to the website 204 for incorporation into the master user profile 208. A vendor providing the website 202 may perform such data gathering and forwarding of user profile data 206 as a service to its partners or suppliers having a website such as 204.

The context information 222 may describe, for example, an error received, the recent operations performed by the user leading up to the error, information about the current data storage configuration, the user ID (e.g., the user login identifier as provided in connection with authentication), and the like. The user profile 208 may include, for example, current licensing information, and a variety of different types of historical user data such as service calls, previous problems reported to an interactive customer support agent, previous purchases (via online or other), and the like.

The AEM 220 may collect and provide selected context information 222 in accordance with the particular problem or other current context related to the user's data storage system environment. The AEM 220 may be characterized as the launching point or connection point to the external environments and target locations (e.g., such as over a computer network) in which the AEM 220 facilitates the two-way flow of information between the data storage system and the external environment(s). The two-way information flow facilitated by the AEM may be used to enrich the data storage system customer's experience in a variety of different interactions such as, for example, related to support, e-commerce, virtual or online user communities, and the like, at one or more external environments, such as websites 202 and/or 204 as will be described in more detail elsewhere herein.

As one example, the data storage system 210 may directly communicate and interact with the partner website 204. In turn, the partner website 204 may communicate with the vendor website 202, for example, to retrieve information which is then provided to the customer. The website 204 may communicate with the website 202 to indirectly expose the customer to selected filtered portions of the website 204. For example, the data storage system 210 may communicate directly with the website 204 and the website 204 may expose particular portions of the website 202 to the customer. As another example, the data storage system 210 may directly communicate with both the websites 202 and 204 in accordance with the configuration of the AEM 220.

Figure 4:
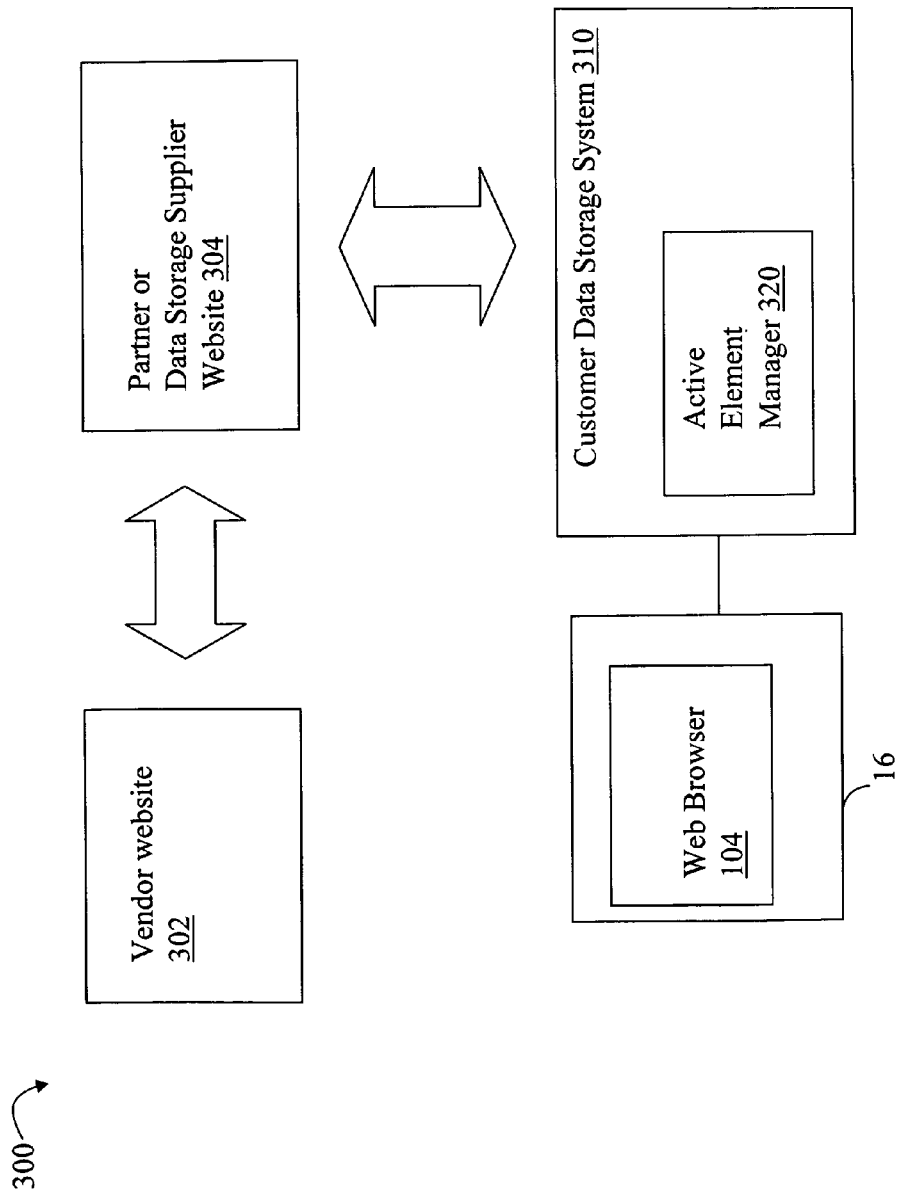
FIGS. 4 and 5 are examples illustrating data flow between the data storage system and external websites in connection with the techniques herein.

Referring to FIG. 4, shown is an example illustrating how information may flow in connection with the techniques herein. The example 300 illustrates a customer data storage system 310 which communicates directly with the partner or data storage supplier website 304, such as that under the control of a VAR. The website 304, in turn, may communicate with the vendor website 302, such as under the control of a data storage vendor or manufacturer having the VAR as a business partner. Information from the websites 302 and/or 304 may be communicated through website 304 to the data storage system 310. The data storage system 310 may include the AEM 320. A data storage system environment may include a management system 16 with a web browser 104 through which a customer uses to invoke and utilize the AEM 320 of the customer data storage system 310.

As an example, a VAR website may obtain selected technical information from different vendor websites dependent on the customer's data storage system. The VAR website may communicate with the appropriate vendor website to obtain the information which is then displayed to the customer via the AEM and web browser connected thereto. The customer may not be aware of the indirect communication between the VAR and vendor website.

Figure 5:
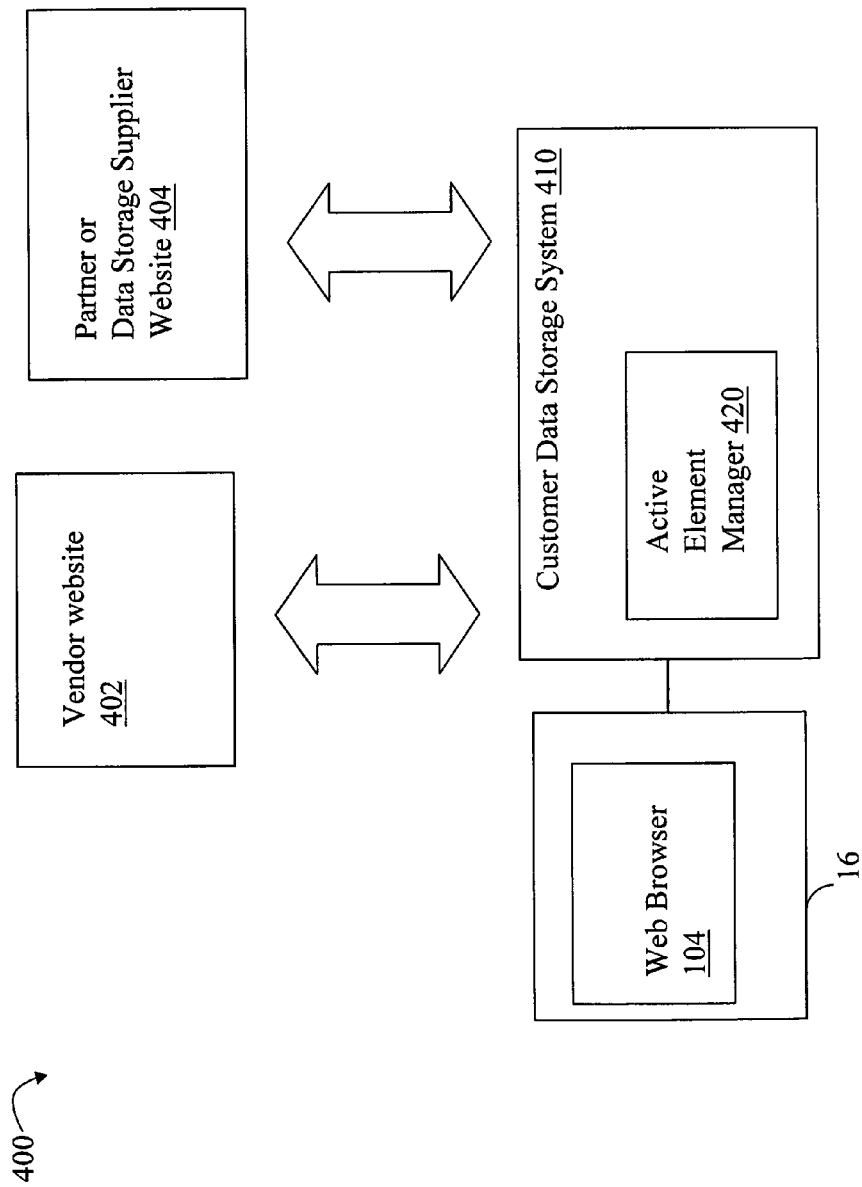

Referring to FIG. 5, shown is another example illustrating how information may flow in connection with the techniques herein. The example 400 illustrates a customer data storage system 410 which communicates directly with the partner or data storage supplier website 404, such as that under the control of a VAR. The data storage system 410 may also communicate directly with the vendor website 402, such as under the control of a data storage vendor or manufacturer having the VAR as a business partner. Information from the websites 402 and/or 404 may be communicated directly to the data storage system 410. The data storage system 410 may include the AEM 420. A data storage system environment may include a management system 16 with a web browser 104 through which a customer uses to invoke and utilize the AEM 420 of the customer data storage system 410.

It should be noted that information flow in connection with the customer data storage system as facilitated by the AEM may be a combination of that which is illustrated in FIGS. 4 and 5 as well as other variations. For example, the partner and/or vendor may each have one or more websites to which the customer data storage system may communicate depending on the particular context information and configuration of the AEM. The AEM may be configured by the partner to control the external environments and target locations therein to which the customer data storage system communicates. As illustrated elsewhere herein, the particular external environment and target location with which the data storage system communicates may vary with context information.

In connection with the techniques herein, context information may be information that is transmitted from the data storage system to a target location in an external environment. Information that is received by the data storage system may include user-relevant information determined, for example, by code executing on one of the partner and/or vendor websites. Other information that may be communicated between the data storage system and external environments may vary with particular user interactions. The foregoing is described in more detail in following paragraphs.

Figure 6:
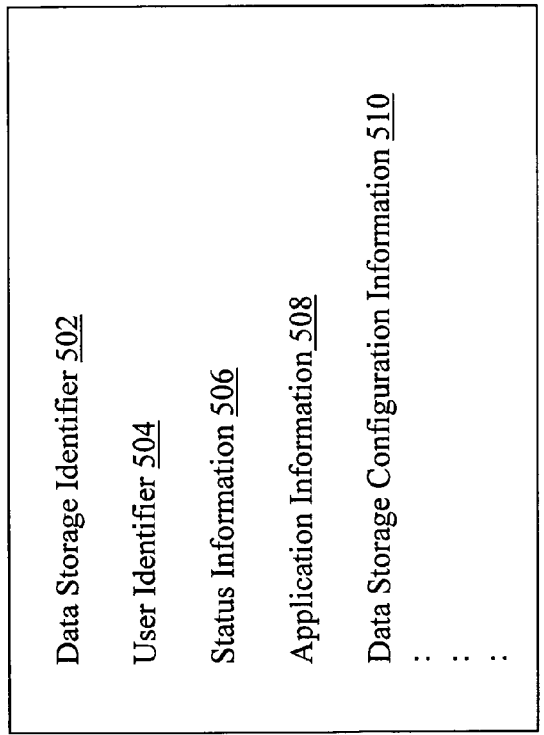
FIGS. 6 and 7 are examples of context information.

Referring to FIG. 6, shown an example representation of context information as may be collected by the AEM and transmitted to an external environment. The example 500 includes a data storage identifier 502, a user identifier 504, status information 506, application information 508 and data storage configuration information 510. The context information supplied by the AEM may be different than as described herein and vary with the particular AEM as well as the particular context to which the AEM is responding. For example, as described in FIG. 2, the AEM may have information regarding the particular applications which are hosting data on the data storage system. However, another embodiment may include an AEM which does not have information regarding the particular applications hosting data on the data storage system and, as such, application information 508 may be omitted in such an embodiment. As another example, the AEM may be installed on a data storage system supplied by a VAR. The data storage system may also include VAR-specific hardware and/or software. An error or other user action may occur involving VAR-specific hardware and/or software. As a result, additional information may be included in the context information related to the VAR-specific hardware and/or software. Such additional context information may include the name, version number, settings, options, and the like, for the VAR-specific products. The user may be directed to the VAR website all the time, or conditionally, such as when a VAR-specific component is involved in connection with the user inquiry, error, and the like, to which the AEM is responding. If there is an error which is not related to a VAR product, the AEM may omit any VAR-particular information and may connect the user to the vendor website directly, or indirectly through the VAR website.

Figure 7:
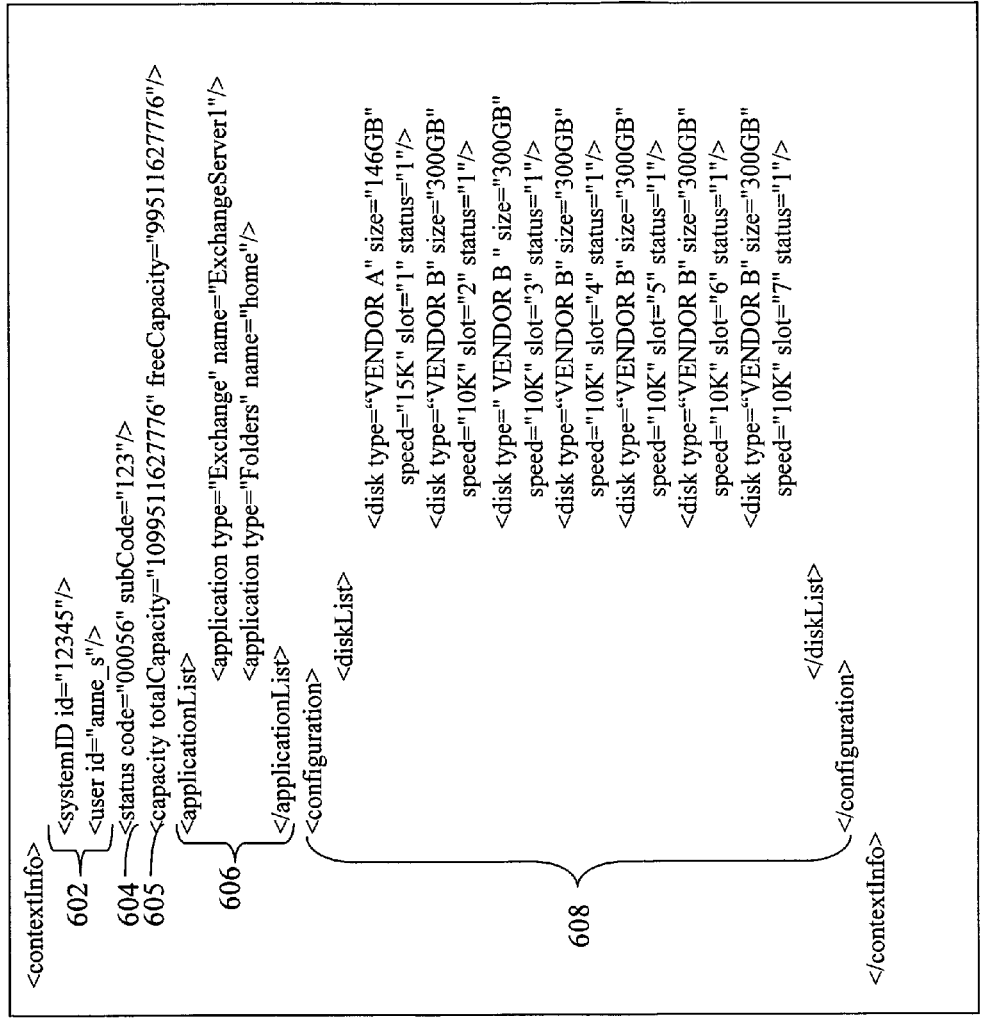

Referring to FIG. 7, shown is a more detailed example of context information that may be transmitted from the AEM. The example 600 illustrates context information which is communicated in XML format. Element 602 includes a system identifier and user identifier. The system identifier of "12345" may be an identifier of the particular data storage system on which the AEM is included. The system identifier may identify the data storage system model as well as a particular instance of a data storage system manufactured or supplied. The user identifier "anne_s" may identify the user as logged onto the AEM. The user identifier may be used as an index into the user profile data, for example, as illustrated in FIG. 3 on the websites 202 and 204. Data may be stored per user as identified by each user identifier. The user identifier, along with other authentication information, may also be used to allow the data storage system including the AEM to connect to the external environment.

The field 604 may include status information, such as in the form of a status code and subcode, indicating the status of the data storage system. The field 604 may include a numeric encoding of an error condition or state of the data storage system, for example, resulting from the most recent user operations. In one embodiment, the data storage system including the AEM as well as the different external environments with which the AEM communicates may utilize a common message catalogue. The AEM may provide information in 604 which is also commonly understood by other external environments with which the AEM can communicate.

The field 605 may include information regarding the storage capacity of the data storage system and also the amount of available or free data storage. Such information may relate generally to the state of the data storage system and can be useful for a variety of different purposes as described herein, such as, for example, support and problem diagnostics and e-commerce.

The field 606 may identify the particular applications for which storage is being hosted on the data storage system identified by 602. The field 606 may identify, for example, the type of application, such as a general category as email applications, as well as name the application instance, such as Microsoft® Exchange Server.

The field 608 may include other data storage configuration information such as, for example, identifying the particular disk drive vendor, size, speed, location (e.g., slot number), status, and the like.

The information in various fields of FIG. 7 may describe the current configuration and associated state thereof. For example, field 605 conveys information regarding the data storage configuration (e.g., maximum capacity) as well the current state (e.g., amount of storage which is used or free). Similarly information of field 608 includes information about the data storage configuration (e.g., the disk types indicating vendor) as well as the current state of the data storage configuration (e.g., status of each disk).

Referring to FIG. 7A, shown is an example representation of the types of data that may be included in the user profile as maintained for each user identifier. User profiles are illustrated, for example, in FIG. 3 as elements 206 and 208. User profile information may include the user identifier 622, user contact information 624, license information 626, support and service contract information 628, service call and problem history 630, data storage information 632, website activity information 634, live chat support information 636, phone support information 638, and user community information 640. It should be noted that any portion of the information included in FIG. 7A as stored in connection with the user profile may be included in context information provided by the AEM. The particular portions included may vary with the particular connection, transaction and/or operation being performed by the AEM.

The user identifier 622 may be used as an index or identifier into the user profile information for each user. The user identifier 622 may be, for example, the identifier of 504 of FIG. 6 and 602 of FIG. 7 as described elsewhere herein. The user contact information 624 may include complete name, address, phone, email, and other information used to contact the user identified by 622. The information in 624 may be used, for example, to customize and personalize interactions between the user and customer support personnel in interactions facilitated by the AEM via the partner and/or vendor website.

The license information 626 may describe the one or more licenses that the user has, for example, for the VAR or vendor software thereon. The license information may describe the license terms and provisions of the one or more licenses. For example, the license information 626 may indicate an expiration date, if any, for different software installed on the data storage system. The information in 626 may be useful, for example, in connection with facilitating e-commerce transactions to remind the user that a current license will expire, offer better or different license terms, and the like.

The support and service contract information 628 may include the level of support being provided to the user, such as by the partner. For example, the user may have purchased a contract for unlimited help support, a fixed fee for each problem inquiry, and the like. Information in 628 may be useful, for example, when the AEM is facilitating interactions between the user and online or telephone customer support interactions to indicate to the customer support personnel information on the relationship with the particular user.

The service call and problem history 630 may indicate a history of previous problems this user has had, the number of technician service calls dispatched to the customer's site by the partner and/or vendor, and the like. Such information may be useful in connection with subsequent interactions since the user may be experiencing the same or related problems.

The data storage information 632 may identify the particular hardware and/or software of the vendor and/or supplier. Such information may identify the hardware and/or software component name, version information, options and settings for configurations, storage capacity, and the like. The information in 632 may be useful, for example, in providing customer support, directing the user to information of interest, and in e-commerce transactions to notify the user regarding discounts on hardware/software of interest.

The website activity information 634 may identify recent user interactions and activities such as, for example, different electronic paper publications downloaded, different queries performed at the vendor and/or partner websites, and the like. The information in 634 may be useful, for example, in notifying the user of other information that may be of interest, indicating a level of proficiency of the user, and the like. For example, based on particular electronic publications downloaded or queries may at the vendor and/or partner website, it may be inferred that a user is a novice, or other level of proficiency with respect to a particular application and/or data storage system for data storage system management.

The live chat support information 636 may include a record of user interactions with online interactive help support. This may be useful in a manner similar as described in connection with 630 to provide a context for a current interaction since the current interaction for help may be a follow-up on a previous interaction for support assistance.

The phone support information 638 may include a record of user interactions with phone support. This may be useful in a manner similar as described in connection with 630 and 636 to provide a context for a current phone support interaction since the current phone support call may be a follow-up on a previous interaction for support assistance.

The user community information 640 may describe the membership and/or activities of the user identified in 622 for different online virtual user communities. For example, there may be virtual user communities for provisioning and management of data storage for a particular application on a particular vendor's data storage system. Examples of data that may be included in 640 are described elsewhere herein. Different virtual user communities focus on particular areas of interest, such as products of a vendor and/or VAR used with a particular application, Information included in the user profile may be used in connection with providing selected user-relevant information to the AEM from the partner and/or vendor website. The user-relevant information may be targeted or customized for the particular user in accordance with the user's profile information. The customized information may take a variety of different form using a variety of different technologies. For example, customized information may be pushed from the vendor and/or partner websites to the AEM in the form of notices, alerts, emails, and the like, notifying the user about the existence of different products, services, papers, virtual user communities, sales events, discounts, upgrades, new software and/or hardware, and the like, that may be of interest to the user. This is described in more detail in following paragraphs.

Figure 8:
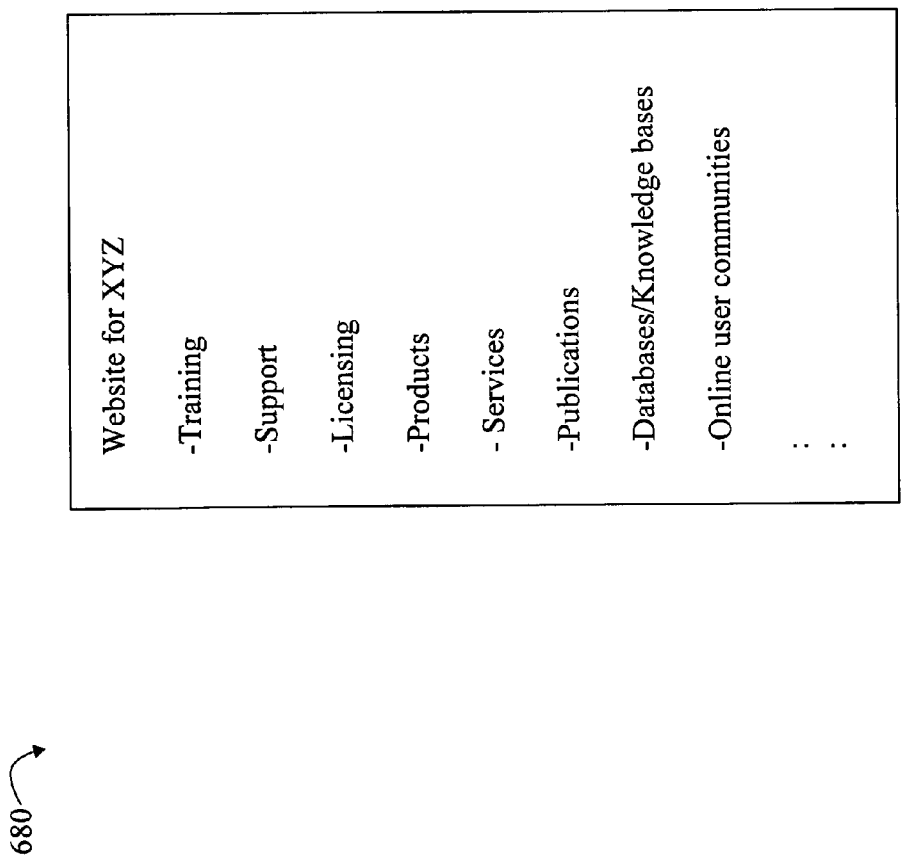
FIG. 8 is an example representing information that may be included at a vendor or partner website.

Referring to FIG. 8, shown is an example of information that may be included on a website of a vendor or partner. In the example 680, the website for vendor or partner XYZ may include information specific to the particular vendor or partner. For example, the website may include information related to training, support, licensing, products, services, publications, databases or knowledge bases, and virtual user communities provided by the party XYZ. The example 680 generally represents the types of information that may be included on a main web page of the website, such as 202 or 204 of FIG. 2. The main web page may include links to other web pages hosted on the website providing additional detail on each item in the example 680.

The user may be notified regarding relevant portions of the information 680 available at the website as selected in accordance with a user's profile.

Figure 9:
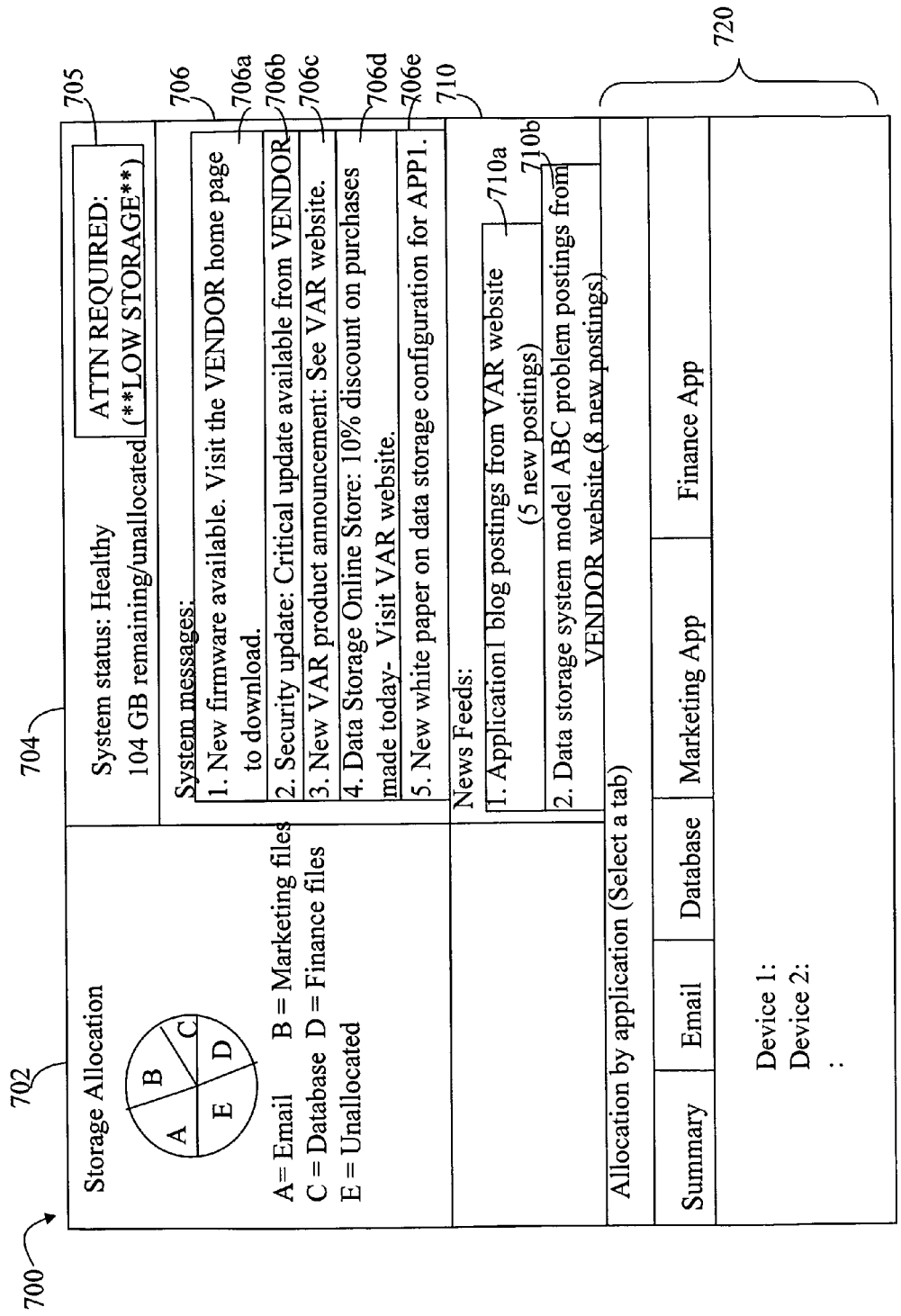
FIG. 9 is an example of a screenshot that may be displayed for use with the active element manager.

Referring to FIG. 9, shown is an example of a screenshot that may be displayed on a web browser when a user is connected to the AEM of the data storage system. Area 702 may illustrate the current storage allocation in a graphical display for the different applications having their data hosted on the data storage system. Area 704 may include a first portion of notifications or system messages. The area 704 may include an overall system status indicator (e.g., healthy), amount of remaining/unallocated storage and other system notifications requiring attention. In this example, area 704 includes a notification 705 that the amount of available storage is low and requires attention. Selection of 705 may result in the AEM connecting to a target location in an external environment, such as at a partner or vendor website, to assist in connection with the low storage notification. The notifications in area 704 may relate to the data storage system. Area 706 may include other system messages or notifications using information provided by the vendor and/or partner website. Some of the information included in 706 may be selected in accordance with the user's profile and provided to the AEM so that it is included for display such as in the example 700. In this example, the area 706 includes five (5) notifications. Each notification 706a-706e may include a hyperlink which, when selected, connects the user to a target location in an external environment, such as a webpage at the partner and/or vendor website. Element 706a is a notification regarding new firmware available at the VENDOR homepage. Selection of 706a may connect the AEM to the VENDOR homepage or location at the VENDOR website. Element 706b is a notification regarding a critical security update available from the VENDOR. Selection of 706b may connect the AEM to the VENDOR homepage or location on the VENDOR website where information about the update is available and the update may be available for download from the VENDOR website. Element 706c is a notification regarding a new VAR product. Selection of 706c may connect the AEM to a location on the VAR website which may describe the new VAR product and/or provide the VAR product for download if the VAR product is a software product. If the VAR product is a hardware product, selection of 706c may connect the AEM to an online store location at the VAR website where the user may purchase the new VAR product. Element 706d is a notice regarding a sale of data storage systems and/or devices through the VAR's online store. Selection of 706d may connect the AEM to a location at the VAR's online store where the products on sale may be purchased. Element 706e includes a notification regarding a new electronic publication regarding APP1, an application that may be hosting its data on the data storage system. Selection of 706e may connect the AEM to a location at a partner or vendor website from which the paper may be downloaded, purchased, and the like.

Included in area 710 are various messages that may be displayed when a particular user logs into the AEM. The information included in 710 may be customized and vary with the particular user. Notifications in area 710 may be provided from the vendor and/or partner website as described in connection with area 706. The area 710 may include new or additional postings in connection with various virtual user communities, such as blogs or user forums, that a user may belong to. In this example, element 710a indicates 5 new postings to a blog on Application 1 at the VAR website. The user currently logged into the AEM may participate in this blog at the VAR website and may have signed up to receive notification in connection with any new postings. Selection of 710a may connect the AEM to the location at the VAR website where the new postings can be found for the blog. Element 710b indicates that there are 8 new postings at the VENDOR website regarding a particular data storage system model. Selection of 710b may connect the AEM to the location at the VENDOR website for the indicated 8 new postings.

Area 720 may include a display of information used in connection with allocating storage for a particular application.

In one embodiment, the elements 705, 706a-e, and 710a-710b may be UI indicators having associated hyperlinks which, when selected, navigate to a target location in an external environment, such as an appropriate web page of a website in accordance with the selection. The web page may be located at a website such as the partner and/or vendor website. Additionally, the AEM may provide context information as described elsewhere herein to the target location. Examples of the types of data that may be included in the context information are illustrated, for example, in FIGS. 6 and 7.

With reference to the display 700, a user may be logged in and performing a data storage management operation, such as provisioning data storage for use by one of the applications using the interface area 720. In response to allocating additional storage for use by the application, the message or indicator 705 may appear on the display indicating low storage. In other words, the last operation of provisioning data storage for use by the application caused the amount of available or free storage to fall below some predefined threshold. By selecting 705, the AEM may be used to provide a connection between the current data storage management session, such as in connection with provisioning data storage for use by an application, and an external environment, such as another website, which may provide additional information, customer support, purchase of additional storage, and the like, related to the low storage condition or state of the data storage system. Additionally, the AEM may automatically collect and transmit to the target location context information regarding the current state of the data storage system including, for example, the amount of currently available free storage on the data storage system, the error message status code indicating the low storage condition indicated by 705, the current devices and associated storage capacities currently included in the data storage system, and the like.

In connection with the foregoing or other selection of a UI indicator from the display 700, another browser window may be opened and the AEM may provide for navigation to the external website including the appropriate page of the website for the blog, knowledge base/database, or other source of information for the selected UI indicator. As another example, if the UI indicator provides a connection to a database for information about a particular problem, selection of the UI indicator may navigate to the appropriate external website location, supply query terms to the database and query the database. The results of the query may be displayed to the user in a browser window.

As yet another example, selection of a UI indicator in 700 for a problem or error may connect the AEM to a chat room at a partner or vendor website where the user logged into the AEM may interact directly with a customer service representative or agent to schedule service, provide interactive customer assistance, and the like. The context information may be provided by the AEM to the agent at the partner or vendor website so the agent can examine the current context of the data storage system. This may assist the agent in diagnosing a problem and providing recommendations for solutions to the problem. Additionally, the agent may utilize the user profile information stored on the partner and/or vendor website in connection with providing additional context information about the user. In one embodiment, the context information transmitted by the AEM to the agent may include the user identifier. The agent may access the records from the user profile information for the user identifier. In this manner, the agent may be able to examine any existing problem histories and solutions to see, for example, what solutions for the same problem did/did not work previously for the same or similar problem. Using context information provided from the AEM, the agent may be able to detect the version of software on the data storage system and the particular problem the user encountered. The error may be related to a correction included in a later version of the software so the agent may recommend that the user install the updated software including the correction or patch. If a problem is recurring, the agent may recommend replacing a hardware component, providing a particular service for the component, and the like.

In the foregoing examples, the customer logged into the AEM does not have to provide the context information that may be useful to the customer service representative in problem analysis, service scheduling, providing recommended actions/next steps, and the like. Such context information is automatically collected and transmitted to the selected target location in the external environment.

Figure 10:
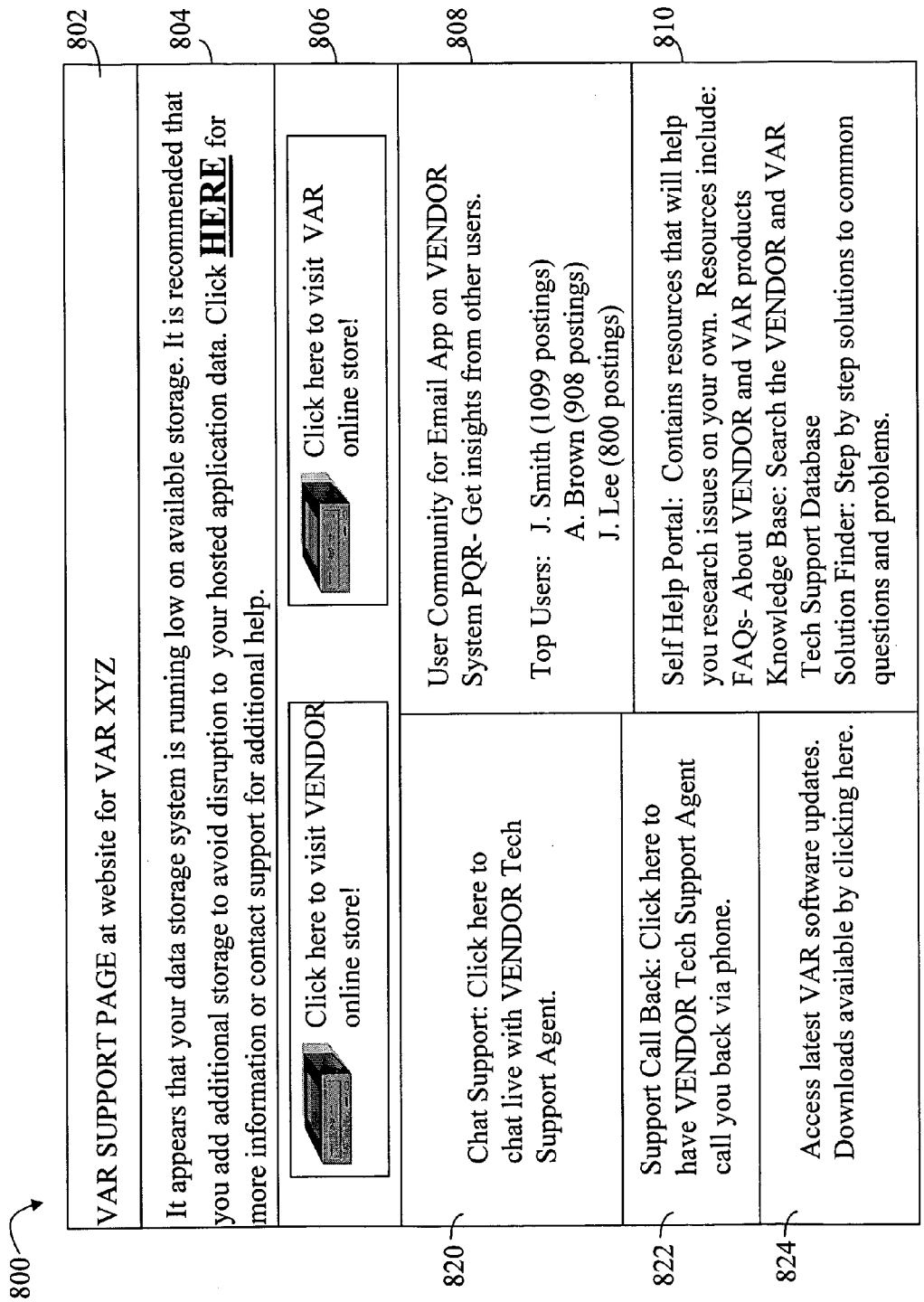
FIG. 10 is an example of a screenshot that may be displayed as a webpage for a partner website.

With reference to the example 700 of FIG. 9, selection of the UI indicator 705 indicating low storage may result in opening another browser window and a connection is made to the VAR website resulting in display of a web page of the VAR website as illustrated in FIG. 10.

Referring to FIG. 10, shown is a screenshot that may be displayed as result of selecting 705 from the example 700. The example 800 represents information that may be displayed for a VAR website page. Area 802 indicates that the displayed information is in connection with support web page at website for VAR XYZ. Area 804 includes information related to the low storage indicator 705 in that the data storage system whose context information was transmitted to the VAR website is running low on storage. Selection of the word "HERE" from area 804 may result in additional information being displayed regarding the error condition. The message displayed in 804 may be customized, for example, in connection with the status or error code provided in the context information from the AEM. On the web page 800, the user may select an operation to be performed in accordance with the context information pushed from the AEM to the VAR website. The user may select to purchase additional storage from the VENDOR or VAR online store via selection of the appropriate UI indicator in 806. Selection of one of the indicators of 806 may navigate the user to one of the indicated online stores. Additionally, the context information as supplied by the AEM may also be used to populate the display with data storage products compatible with the current data storage configuration of the user's data storage system as indicated in the context information and/or user profile data.

The user may select 820 to navigate to a location on the VAR website providing live online/interactive support with a support agent. Selection of 820 provides for automatic connection to a subsequent web page and also propagates the context information to the support agent. As an alternative to online interactive support, the user may select 822 to have a support agent call the user back on the telephone. Selection of 822 may result in the context information being transmitted to a support agent and accessing contact information for the user from the user profile. The agent may then use the contact information to call back the user.

Selection of 824 may result in navigation to a web page where the latest VAR software updates are available.

Selection of 808 may result in navigation to a user community. The user community selected and displayed in 808 may be in accordance with the context information and/or user profile. The user may be a registered or active member of the user community as indicated in the user's profile data. If the user is not a member, the user community indicated in 808 may be selected based on the vendor and application indicated in the context information provided by the AEM. The user community may be used to provide insights from other users, for example, using the same vendor's data storage system for the same application. Another user may be able to make a recommendation regarding what next steps may be appropriate based on similar experiences, errors, and the like.

Selection of 810 may result in automatic navigation to a web page including databases that may be provide additional information about the low storage condition or state indicated in 804. Selection of 810 may result in navigation to a page of resources from which the user may make a further selection. The sources of information may include a database of frequently asked questions (FAQs) about the VENDOR and/or VAR products, a knowledge base which is a technical support database, and a database of solutions to common questions and problems. Query terms may be automatically provided in accordance with the context information transmitted from the AEM, such as query terms in connection with the status of low available storage. It should be noted that information included in 810 may also be a portion of information associated with one or more virtual user communities. Alternatively, the information included in 810 may not be associated with any virtual community but may rather be generally available data sources on a website provided by a vendor and/or partner.

In connection with the foregoing the AEM automatically selects and navigates to a location based on current context information indicating the state of the data storage system at the time the AEM is connecting to the external environment and target location. The AEM automatically communicates the context information from the data storage system to the VAR website, or other external environment, so that the context information may be used in connection with subsequent user interactions.

Figure 10A:
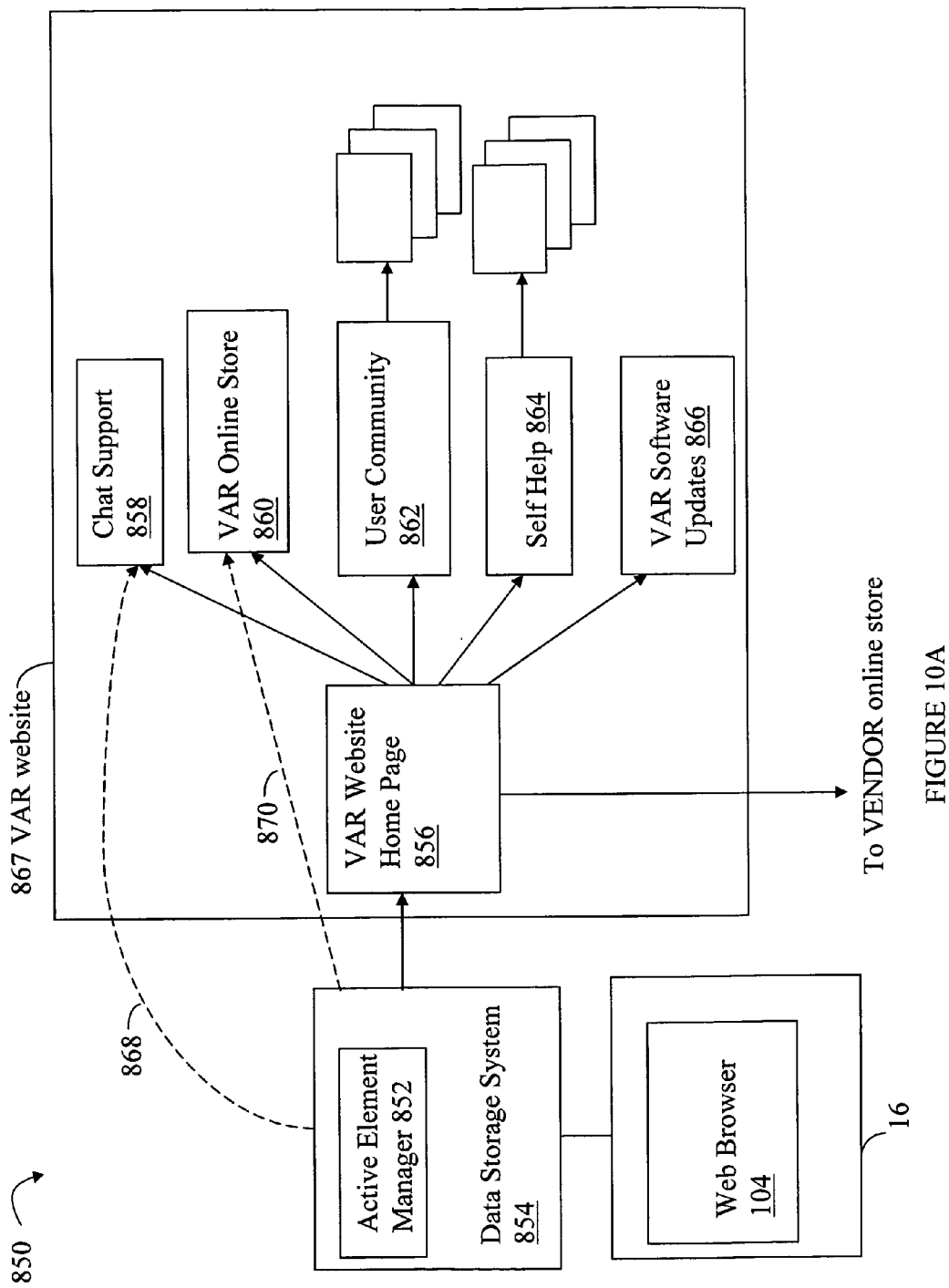
FIG. 10A is an example illustrating navigation from the data storage system to various web pages at external websites.

Referring to FIG. 10A, shown is an example illustrating the various connections and information flow from the data storage system including the AEM. In other words, the example 850 illustrates the various launch or connection points that can be made from the AEM and the customer's data storage system 854. The example 850 illustrates the connections made in accordance with a VAR web site and web pages as described in connection with FIG. 10. Selection of the UI indicator 705 results in a connection to the main or home web page 856 of the VAR website. From this main page 856, a user may make another selection navigating to a different web page for the VAR website 867. For example, selection of one of the links from area 806 of FIG. 10 results in navigation to one of the VAR online store 860 or the VENDOR online store. Selection of 820 from FIG. 10 results in navigation to chat support web page 858. Selection of 808 from FIG. 10 results in navigation to a user community web page 862, which may be further connected to one or more other web pages that a user may traverse. Selection of 810 from FIG. 10 results in navigation to a self help web page 864 which may be further connected to one or more other web pages that a user may traverse for the different sources of self help. Selection of 824 from FIG. 10 results in navigation to a VAR software updates page 866.

In the example described in connection with FIGS. 9 and 10, selection of 705 from FIG. 9 may result in navigation to the main or home web page of the VAR 856 of FIG. 10A. However, rather than have selection of 705 result in a connection to 856, the AEM may be configured by the partner, such as the VAR, which supplied the data storage system 854 to connect directly to chat support 858 (as illustrated by connection 868), or connect directly to the VAR online store (as illustrated by connection 870) where the user may be presented with relevant data storage devices that can be purchased in accordance with the current data storage system configuration of 854 as indicated in the supplied context information and/or user profile information.

Figure 10B:
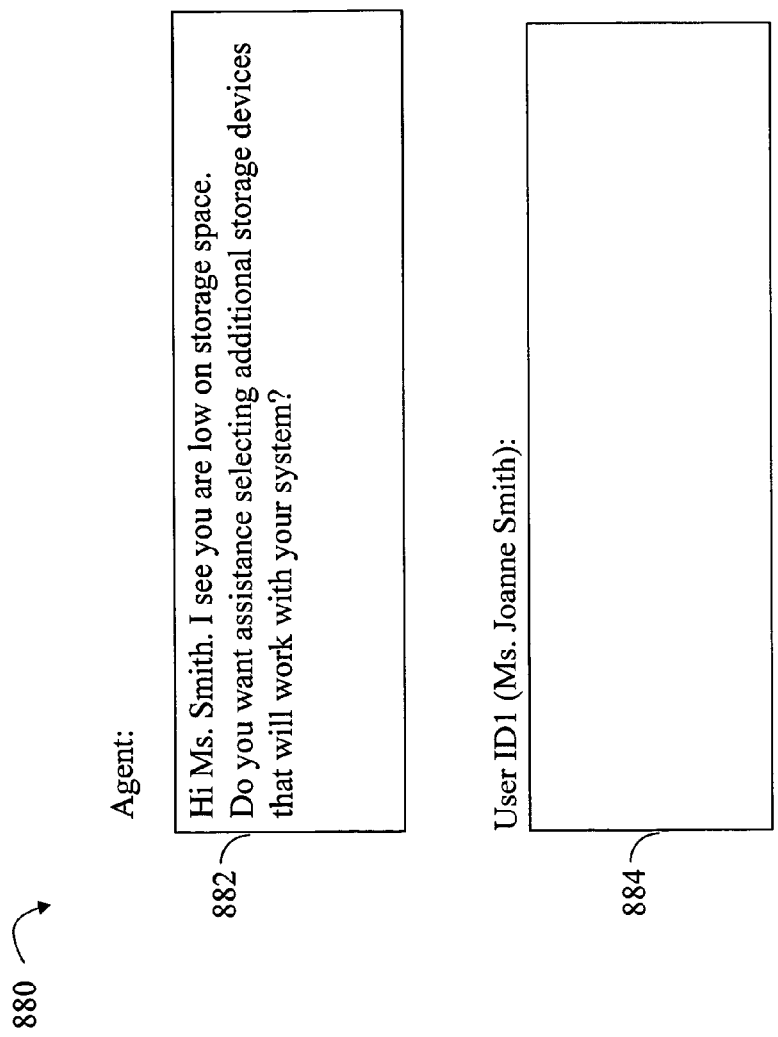
FIG. 10B is an example of a display for use in connection with interactive customer support.

Referring to FIG. 10B, shown is an example of a screenshot as may be displayed to the user logged on to the AEM in response to selecting 820 of FIG. 10, or otherwise configuring the AEM to directly connect to the chat support location 858 of FIG. 10A. The example 880 includes a dialogue box 882 for the agent. The agent may personalize the dialogue for the particular user by accessing information about the user in the user profile in accordance with the user identifier communicated in the context information supplied by the AEM. In this example, the user ID1 may have corresponding user profile information including contact information for Ms. Joanne Smith. The agent may inquire in 882 whether the user is connecting to the chat support for assistance with the current state and message regarding low available storage on the data storage system. The foregoing may be accomplished using the context information indicating the low storage state to the agent. The user may interact with the agent by inputting data in the dialogue box 884.

With reference to FIG. 10A, in one embodiment, the AEM may be configured to connect to the home or main page 856 for certain types of error or status conditions. For errors of a particular type or severity level, or recurring errors, the user may be directly connected to the chat support page. The AEM may make a determination to conditionally connect the user to one of a variety of different locations based on context information collected by the AEM on the data storage information. The AEM may examine the current error or status code (e.g., 506 of FIG. 6) indicating a state of the data storage system and connect to one of multiple locations depending on the error code and/or severity. The context information provided by the AEM may include a recent history of status codes, for example, status codes for the last n operations performed by the user within a time period that resulted in an error, status codes associated with the last n times that the user requested connection to the VAR website, and the like. If the user has experienced the same error within a defined time period, the AEM may connect the user directly with chat support.

As described herein, regardless of the target location in the external environment to which the AEM connects, the AEM automatically collects and provides context information when communicating with the target location. As also described herein, providing the context information from the customer's data storage system including the AEM to the target location is only one way in which information can flow. Communication between the customer's data storage system and the external environment including the target location is bi-directional so that information may also be pushed from the target location to the data storage system. Information from external environments, such as the partner and/or vendor websites, may be provided to the AEM automatically or as part of the interactive dialogues. The information from the partner and/or vendor websites may be provided automatically resulting in notifications to a user when the user logs onto the AEM. Examples of such notifications are described above, for example in connection with the information used to populate sections 706 and 710 of FIG. 9.

Information can be pushed to the AEM from a partner website and/or vendor website, directly or indirectly. Such information may include user-relevant information. Examples may include a new VAR service that is available, a recently discovered problem or security update that a user may want to know about, and the like. The information pushed to the AEM may be user-relevant information determined in accordance with the user profile data. The user profile data may be collected based on user interactions at the vendor and/or partner websites, data included in context information transmitted from various interactions with the AEM, data initially provided when the user makes a first purchase or acquires a first license with the partner or vendor. The user profile may include context-related history information for each user. Based on a user's profile, relevant information may be selected from the vendor and/or partner websites and the user may be provided notifications or alerts regarding the existence of the relevant information. For example, a user may perform operations on the vendor and/or partner website related to provisioning data storage system for an application. Subsequently, as new relevant information about provisioning data storage for the application on the vendor's data storage system becomes available, the user may be notified by pushing relevant notifications to the AEM which are presented to the user when the user logs into the AEM. For example, there may be new offerings regarding services, training, versions or updates of software for use with the particular application, online publications on the application or usage of features, known or serious problems related to the application, and the like. When such information becomes available on the vendor and/or partner website, the information relevant for the particular user may be pushed to the AEM. Thus, in accordance with one aspect of the techniques herein, targeted or selected information may be provided to the AEM which is customized for the particular users based on a previous history of user information as may be included in the user profile information for the users. The selection of information pushed to the AEM may be based on previously observed patterns of usage at the vendor and/or partner website and previous context information provided by the AEM.

In one embodiment, RSS technology may be used to provide information to the AEM from the one or more external websites or other environments. For example, RSS technology may be used to supply news, new product updates, new services, critical support information, and the like, as illustrated in providing notifications of 706 and 710 of FIG. 9. RSS may be characterized as a family of web feeds used to publish frequently updated contents such as blogs and news feeds. An RSS document may include summary or full text information from the website providing the content, such as the website hosting the blog, news service, and the like. A feed reader or aggregator program may be included in the data storage system or the management system (16 of FIG. 1) which receives published information from the content provider. The feed reader may then obtain the updated information from the one or more content providers, for example, by periodically polling the content providers for any new content. As an example, a user may register with a user community on a VAR website. In connection with the registration, the user may select to receive information on new postings in an online user forum or blog, new electronic paper publications, and the like. When the user logs into AEM, the user may receive notifications regarding the new postings in the blog and new electronic paper publications. Using an RSS-based implementation, a web feed, such as in the form of an XML document, may be transmitted from the VAR to the data storage system including the AEM. The web feed document may include hyperlinks to the full content of the paper, blog entries, and the like, on the VAR website. The hyperlinks may be initially displayed such as in areas 706 and 710 of FIG. 9 and used to provide connection to the complete content when a user makes a selection from the notification displayed.

The techniques herein of the bidirectional information flow between the data storage system and one or more external environments may be used to facilitate and enrich the customer's experience using the data storage system by automatically connecting to the one or more external environments in connection with various operations and tasks, such as when an error occurs on the data storage system when the user is performing data storage administration tasks. The AEM may be used to automatically connect to the appropriate target location based on the current context of the data storage system, such as the particular error experienced or other status of the data storage system. The AEM may automatically provide context information describing the current context of the data storage system to the external environment and target location therein to which the AEM connects. Additional context-related information as may be included in user profile information for the particular user may also be utilized by the external environment, such as website of the partner and/or vendor. The techniques herein may be used in connection with facilitating support operations, such as by providing context information and automatic connection to chat or interactive support, relevant knowledge or data bases and relevant online or virtual user communities. In connection with providing support for vendor and/or partner products and services, various alerts or notifications may be provided to the AEM regarding new service and training offerings, product updates or upgrades, relevant technical tips, new postings in user communities, security alerts or problems as well as relevant solutions (e.g., patches), electronic paper publications, and the like. The techniques herein may also be used to facilitate electronic commerce transactions. For example, in connection with resource consumption alerts, such as the low amount of available storage alert included in 705 of FIG. 9, the user may be connected to one or more appropriate target locations, such as customer support or the vendor or partner online store, to facilitate the purchase of additional data storage. A user may also be notified regarding relevant upgrades, new products, new services and other offerings as may be available for purchase in connection with facilitating electronic commerce. Such notifications may be selected in accordance with the user profile information and pushed to the AEM for display, for example as illustrated in area 706 of FIG. 9, when the user logs into the AEM.

What will now be described in more detail is utilizing the techniques herein of the bidirectional flow of information from the customer data storage system to external environments in connection with virtual user communities. This is described in some detail above as one aspect of providing user support. The AEM captures context information about the data storage system and current user and provides this context information to an external environment, such as a vendor or partner website, hosting a user community. The techniques herein may be used in providing a bidirectional flow of information between the external environments hosting the user communities and the data storage system including the AEM that is customized for the particular user. As an example, a user community may exist on a partner or vendor website for customers provisioning data storage for a Microsoft® Exchange server. The user community may include blogs, FAQs, knowledge bases, solutions, electronically published papers, and the like as described elsewhere herein relevant to provisioning data storage for this particular email application server. Different users may be ranked within the user communities based on a favorable number or postings. The foregoing and other activities may be made available to a user on the data storage system and facilitated using the techniques herein with the AEM.

Figure 11:
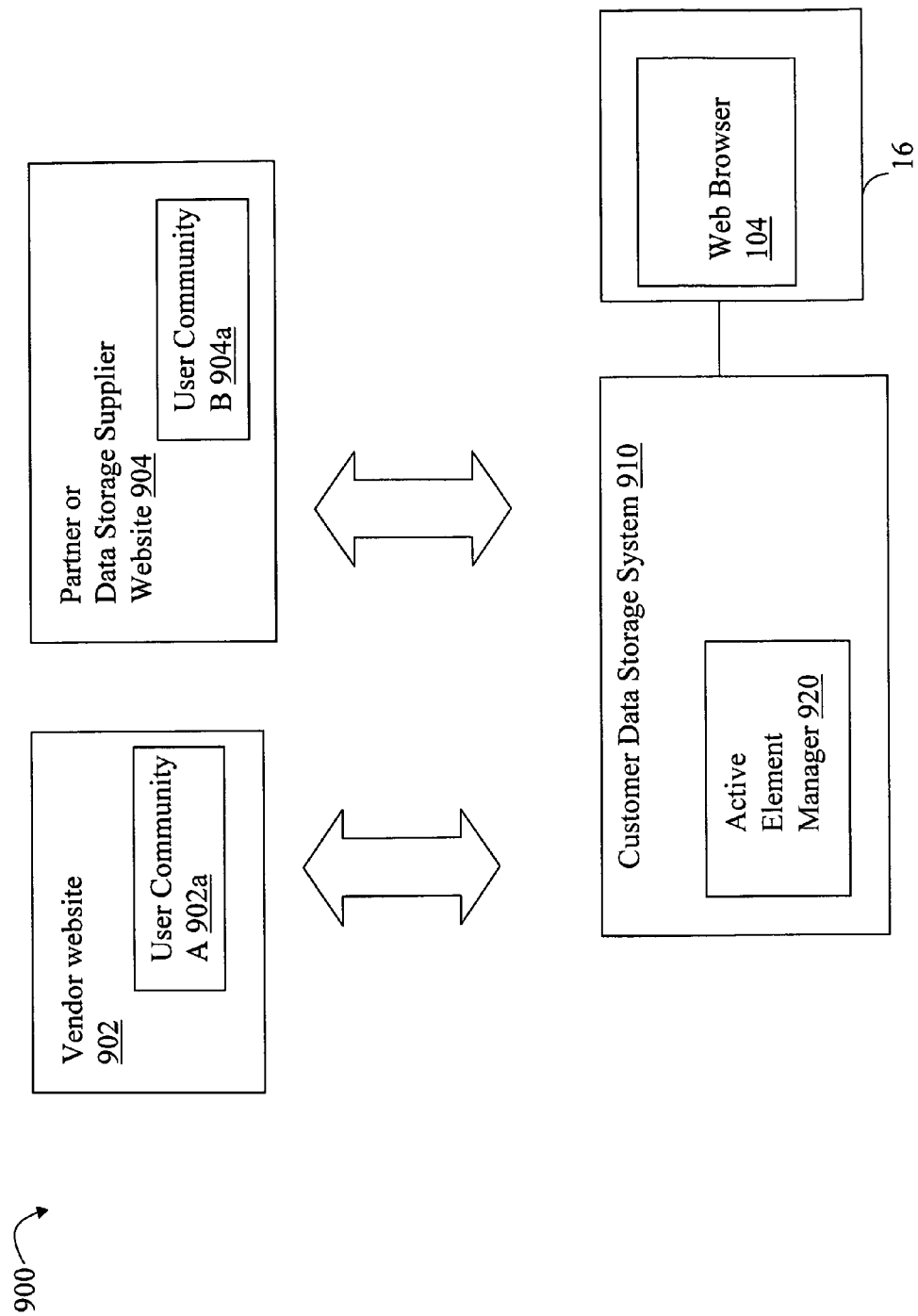
FIGS. 11 and 12 are examples of data flow in connection with the data storage system and navigation to virtual user communities at websites.

Referring to FIG. 11, shown is an example of the data flow that may occur between the customer data storage system 910 and the vendor and/or partner websites. The data flow of FIG. 11 is similar to that as generally described in connection with FIG. 5. The example 900 illustrates the flow of information with respect to the user communities that may be hosted on the websites 902 and 904 in that the user logged into the AEM on the system 910 may communicate directly with user communities on the vendor website 902 and/or the partner website 904. The AEM 920 may be used to automatically launch and provide a connection to a user community 902a or 904a. The AEM 920 may provide the context information as described elsewhere herein in connection with user interactions with the user communities. The context information provided when connecting with the user communities may include, for example, a user identifier for the current AEM user, license information, data storage configuration information, recently viewed or selected items (e.g., based on recent user community activity, items selected in accordance with notifications provided as illustrated in 706 and 710 of FIG. 9), applications which are currently hosting storage on the data storage system to indicate how the storage is being used to direct user to potentially relevant user communities (e.g., how to configure storage for use with a particular email application, database application), and the like.

Figure 12:
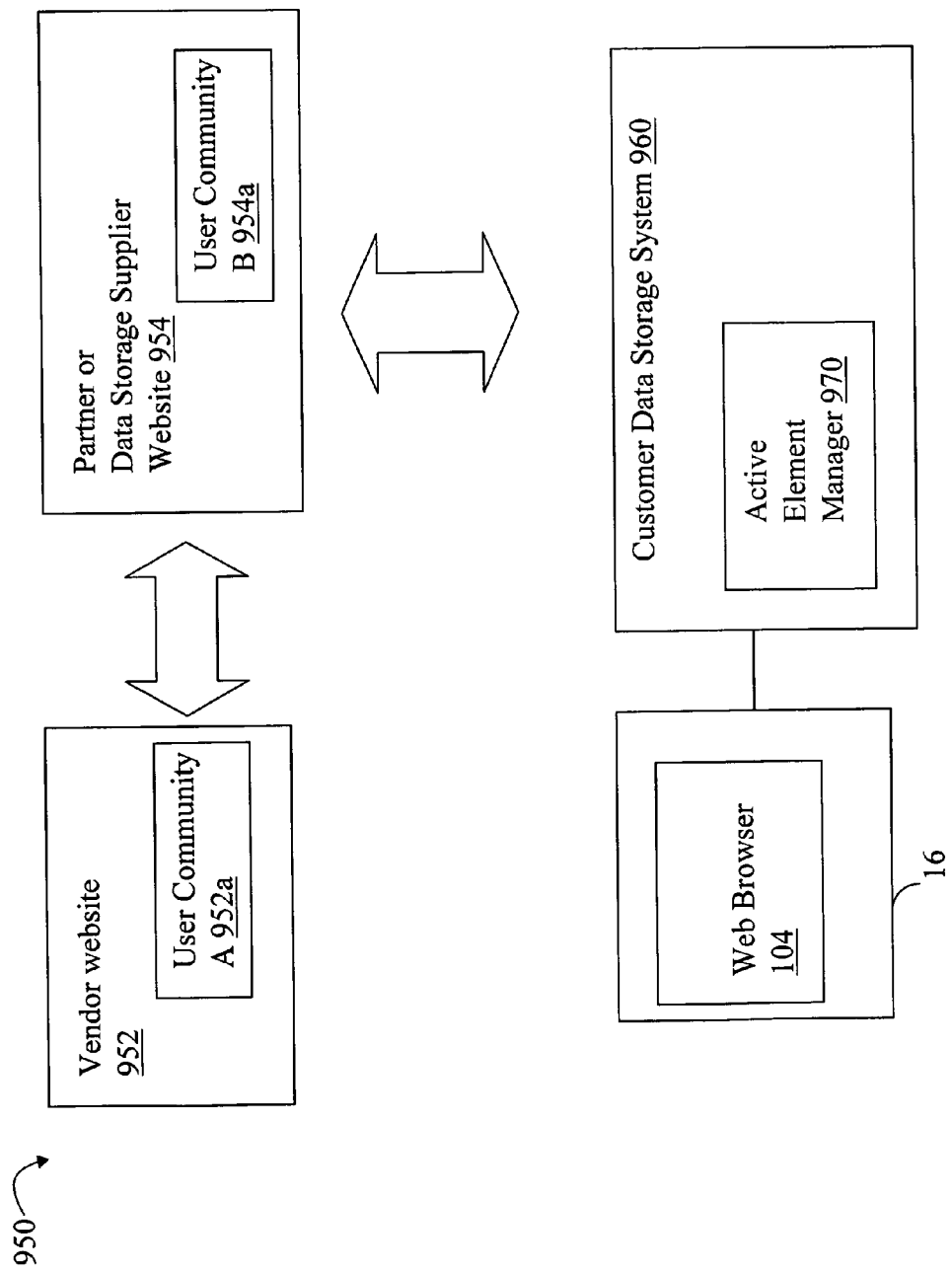

Referring to FIG. 12, shown is an example of the data flow that may occur between the customer data storage system 960 and the vendor and/or partner websites. The data flow of FIG. 12 is similar to that as generally described in connection with FIG. 4 in which the data storage system 960 may communicate with partner website 954. In turn, the partner website may be used to facilitate communications with a user community located on the vendor website 952. The foregoing illustrates how the user may be indirectly connected to a user community 952a through the partner website 954.

In connection with the bidirectional data flow described herein, the AEM may be used to provide information from user communities to the user and to allow a user to interact with the user communities. The user may interact with the AEM as the active launching point and communication point between the data storage system and the user communities hosted in the vendor and/or partner websites, and information related to the particular user and user community may be communicated using the bidirectional communication path as described herein.

As illustrated in connection with FIG. 9 described above, a user may received selected or targeted information from user communities of interest to the user. The particular user communities of interest to the user may include those which the user has expressly indicated as being interested such as through user community registration or participation. Particular user communities that may be of interest may be determined indirectly or inferred, for example, using context information (e.g., application information 508 of FIG. 6), by observing user interactions and web surfing activities at the vendor and/or partner website (e.g., as may be recorded in the user profile information for the user), and the like. The information regarding user communities of interest may be in the form of alerts or notifications as included in 706 and/or 710 of FIG. 9. For example, a user may log onto the AEM and receive a message or UI notification that a new topic is posted in user forum X that the user is registered for, regarding commonly received errors or problems (e.g., when performing particular data storage management operations for an application) and associated corrections (e.g., manual correction or via a particular upgrade, software patch, etc.), or regarding how to obtain better performance for a particular application hosting data on a vendor's data storage system (e.g., by performing an operation at a low level such as 110 of FIG. 2 for a particular vendor's data storage system), and the like. If the user selects the displayed UI notification, the user may be automatically launched from the AEM and connected into the user community. The context information provided by the AEM may include any user authentication information needed to log into the user forum. Activities regarding the user's participation in the forum and other offerings of the user community may be monitored and data collected and stored in the user profile information for the user.

A user may also navigate directly into the user community from a web browser on another computer system without utilizing the AEM. In other words, the user may connect to the user community using the techniques herein with the AEM as well as without utilizing the AEM. In such instances where the user interacts with the user community without going through the AEM, activities of the user while logged into the user community may be monitored and additional data added to the user profile information as may be stored on the partner and/or vendor website.

Figure 13:
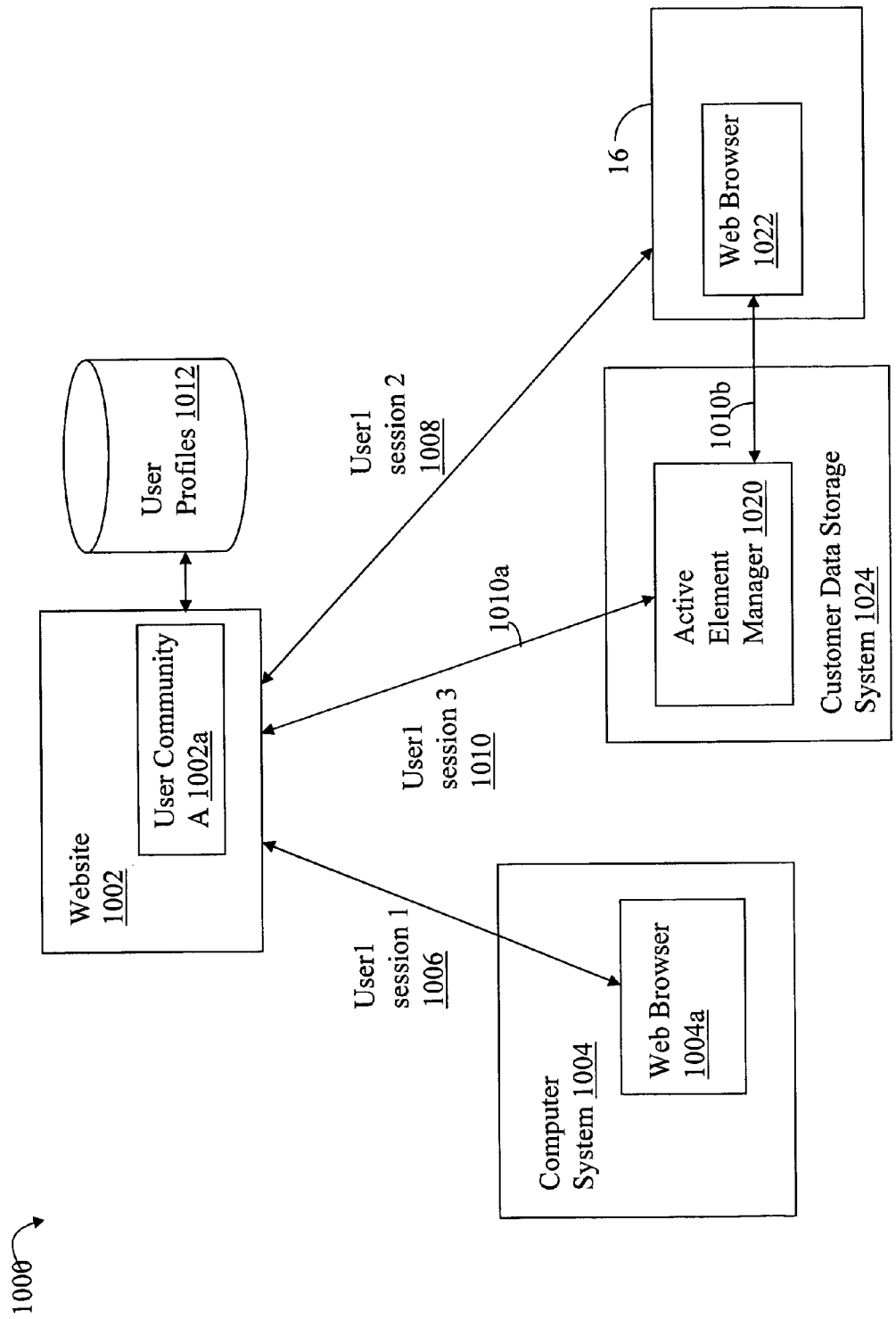
FIG. 13 is an example illustrating various sessions of user interaction with the user community.

Referring to FIG. 13, shown is an example illustrating the various ways in which a user may connect and interact with a user community. In the example 1000, a user, user1, may connect in a first session 1006 from a computer system 1004 via web browser 1004a to the user community 1002a of the website 1002. The website 1002 may be a partner or vendor website. User profile information 1012 may be recorded regarding the user 1's activities in community 1002a for the first session 1006. At a second point in time, user1 may connect to user community 1002a in second session 1008 directly from the management system 16 without going through the AEM 1020. User profile information 1012 may be recorded regarding the user1's activities in community 1002a for the second session 1008. At a third point in time, the same user1 may connect to the user community 1002a in a third session 1010 utilizing the AEM 1020 of the data storage system 1024 and the web browser 1022. User profile information 1012 may be recorded regarding the user1's activities in community 1002a for the third session 1010. As such, the user profile 1012 for the user1 may include aggregated information regarding the user community activity in all three session both with and without utilizing the AEM 1020. When the user connects to the user community 1002a through the AEM, authentication information allowing user access to the website 1002 and user community may be entered automatically on behalf of the user (e.g., stored on AEM and automatically supplied when accessing website 1002). When connecting from the computer system 1004 without using the AEM, the user may MANUALLY enter authentication information when accessing the website 1002. The website 1002 may store historical use information regarding user community activities independent of how a user connects to the website. When on the AEM, the user may navigate directly to the user community 1002a through links and UI indicators (e.g., in area 710 of FIG. 9). Using the techniques herein, a determination that a user community may be of interest to a user may be determined in accordance with one of more of the following types of information: context information provided by the AEM such as the application information 508 of FIG. 6, user activity on the partner and/or vendor website (e.g., website query, selection of particular electronic paper publications, etc.), and express registration in user communities. The first type of information may be used to provide a user with an initial list of what user communities may be of interest pushing relevant notification information to the AEM without the user ever having participated or registered for a user community. Once a user registers and/or participates in a user community, the user may be notified about new information related to the user community as it becomes available. The notifications may selectively notify the user of new information based on user community participation. For example, if a user selects an electronic paper for download, the user may be notified of related electronic publications, technical tips, new postings in relevant user forums, and the like. A user may explicitly sign up to receive notifications regarding new postings in selected blogs, user forums, and the like, as may be included in a user community. Alternatively, a user may receive such notifications based on information inferred from previous activities as recorded in the user profile and/or communicated in the context information from the AEM.

Figure 14:
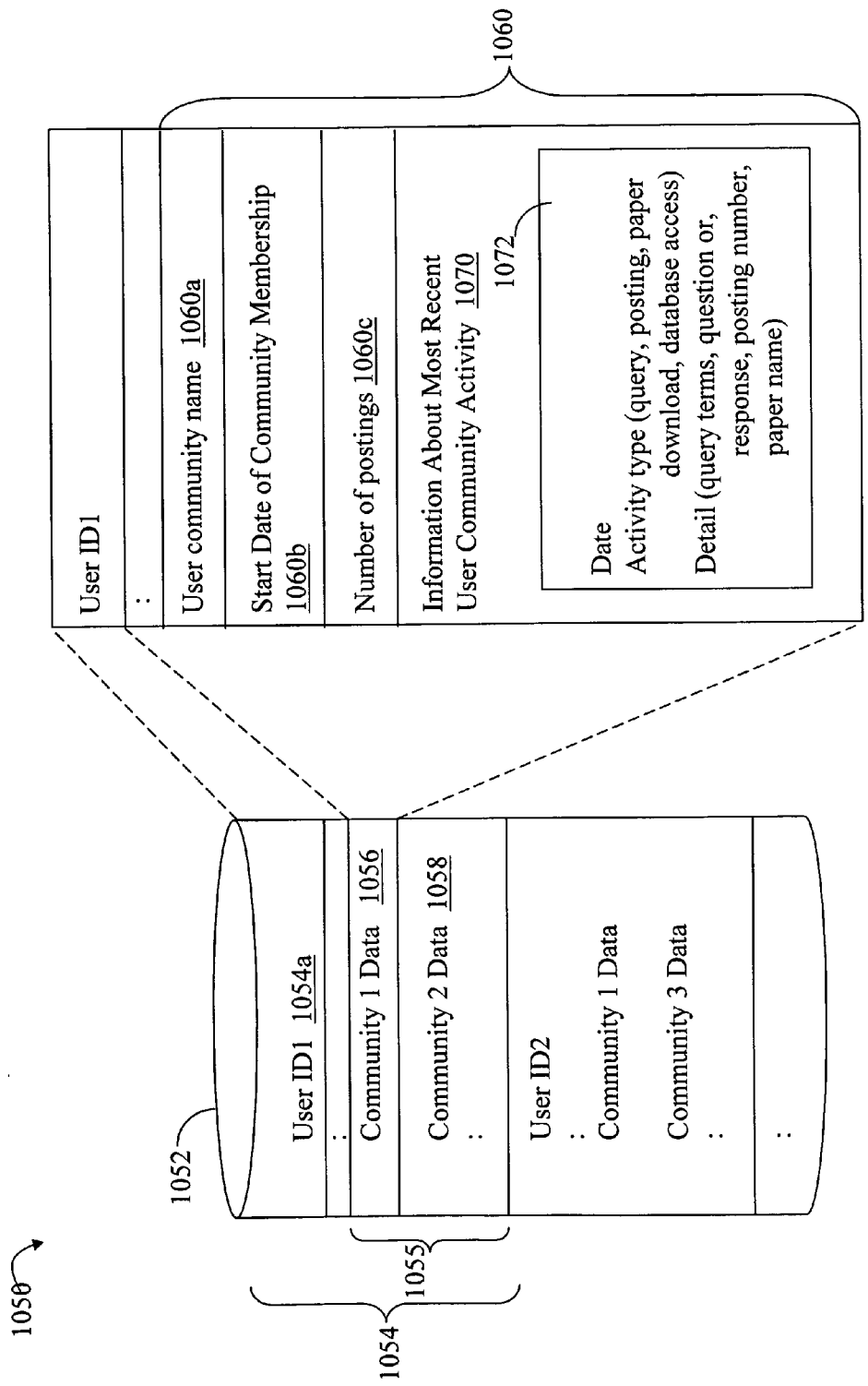
FIG. 14 is an example illustrating in more detail user community information.

Referring to FIG. 14, shown is an example of user community information as may be included in the user profile information. With reference to FIG. 7A, exemplary types of user profile information are illustrated including user community information 640. The example 1050 illustrates in more detail what may comprise the user community information 640 in one embodiment. The element 1052 may represent the user profile information for all users as may be stored on the partner website. The user profile information 1052 may include a portion 1054 of user profile information for each user. In this example, the element 1054 represents the user profile data for user ID1. The user community information for user ID1 is indicated by 1055. Data is recorded in 1055 for each community that user ID1 is registered for. In this example, user ID1 may be registered with two user communities 1056 and 1058. Element 1060 illustrates in more detail what may comprise the data recorded in the user profile for each user community data set 1056 and 1058. For each user community, the following may be recorded as indicated in 1060: user community name 1060*a*, start date of community membership 1060*b*, number of postings 1060*c*, and information regarding most recent user community activity 1070. Element 1070 may include a set of information 1072 for each user community activity recorded. The set of information 1072 may include the date, activity type, and details regarding the activity. The activity type may indicate whether the user activity was a query, posting, paper download, database access, such as to the FAQ or technical tips database. Details regarding the activity may vary depending on the activity and may include query terms, an indicator as to whether a posting was a question or response, a posting number in the blog or user forum, a name of a paper downloaded, and the like. The information included in 1060 may also include any ranking a user may have in the community, such as in connection with a number of correct or favorable responses entered by the user ID1. Such a ranking may be an indication regarding the technical proficiency of the user ID1. Information such as the technical proficiency may be used in connection with determining relevant information or notifications pushed by the website to the data storage system for presentation to the user when logged onto the AEM. For example, if the user is ranked as a novice user, one set of new electronic publications may be relevant. In contrast, if the user has a high level of proficiency, a different set of electronic publications may be relevant to the user. The user may be provided by the website with notifications regarding new user community information in accordance with the level of proficiency as well as other information included in the user profile. As another example, user ID1 may be ranked as a novice user based on user community participation. Based on the proficiency ranking and other activity information (e.g., query terms, previous white papers downloaded, and the like), the user ID1 may be provided with notifications regarding additional user community postings and newly acquired information to direct the user to the appropriate resources.

The AEM and bidirectional information flow may be used herein for user communities in which the information flow is customized for the particular user. The AEM may facilitate communications with the user communities located in external environments, such as vendor and/or partner website, in an automated fashion.

Figure 15:
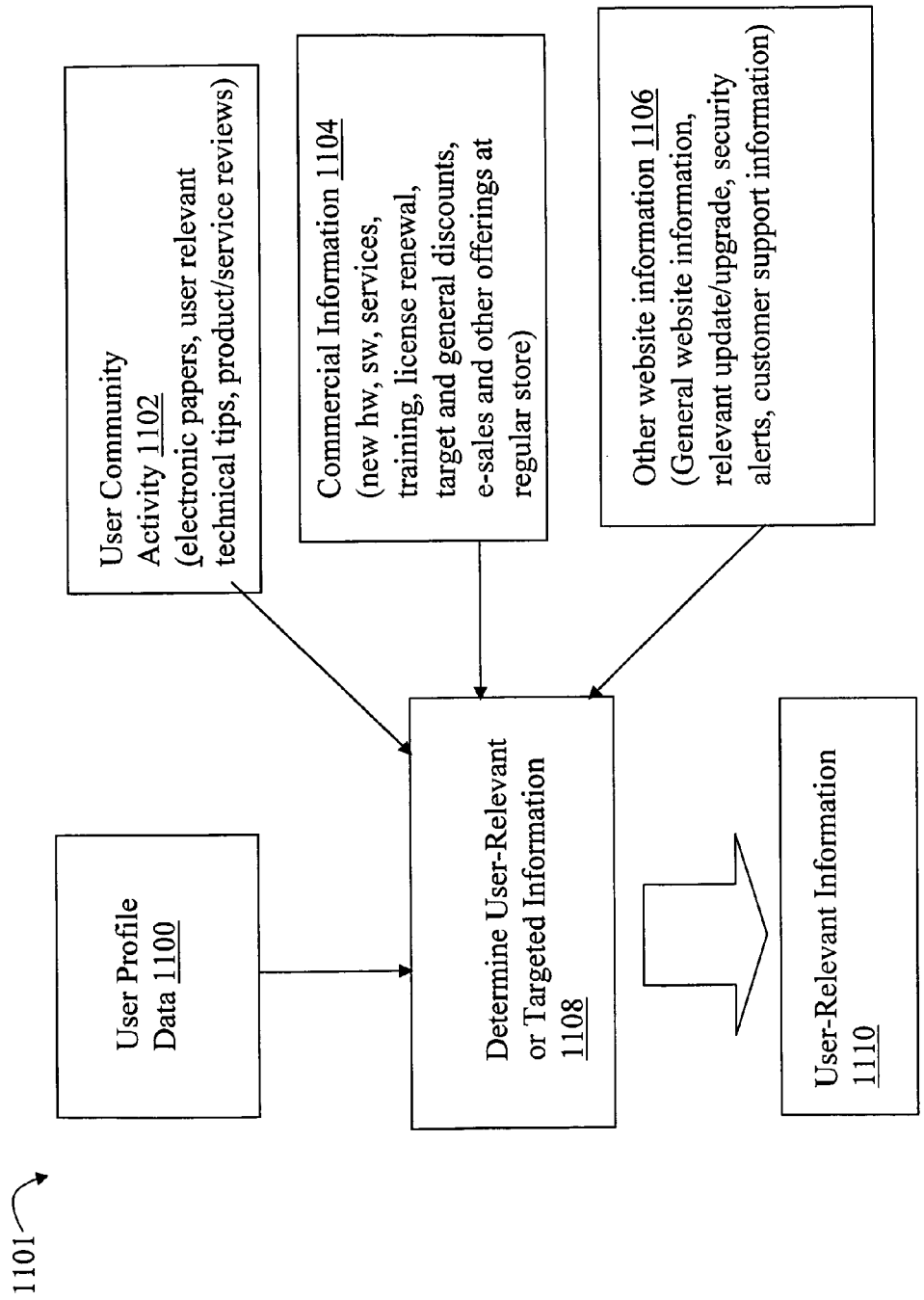
FIG. 15 is an example illustrating data flow processing performed to determine user-relevant information that may be transmitted from an external environment to the active element manager on the data storage system.

Referring to FIG. 15, shown is an example 1101 illustrating the data flow as may be used to determine user-relevant information 1110 pushed from the external environment, such as the vendor and/or partner website, to the customer's data storage system. The user profile data 1100 may be used in connection with selecting current information on the vendor and/or partner websites about which the user is notified via the AEM. The elements 1102, 1104 and 1106 may represent collectively or in the aggregate the different types of information that may be available regarding the vendor and/or partner website. The data in 1100 may be used to select relevant portions of 1102, 1104 and 1106 about which a user is notified. As described herein, the notifications may be pushed to the AEM and displayed to the user when logged into the AEM. The user community activity 1102 may include information about different user communities on the website (s) such as electronic papers, relevant technical tips, product/service reviews, and the like. Commercial information 1104 may include new product and/or service offerings such as new hardware, software, services, training, license renewals, support contract renewal, support services such as telephone and interactive chat, upgrades available for purchase, targeted and general discounts on any of the foregoing, electronic sales offerings at an online or regular store, and the like. Other website information 1106 may include general website information such as the different categories of information as described in FIG. 8, relevant update/upgrade information, security alerts, alerts regarding new problems and/or solutions of a general nature, and the like. Processing may be performed as indicated by 1108 to select relevant portions of 1102, 1104 and 1106 in accordance with the user profile data 1100 about which the user is notified. The user-relevant information 1110 may represent the selected relevant portions from 1102, 1104 and 1106.

Figure 16:
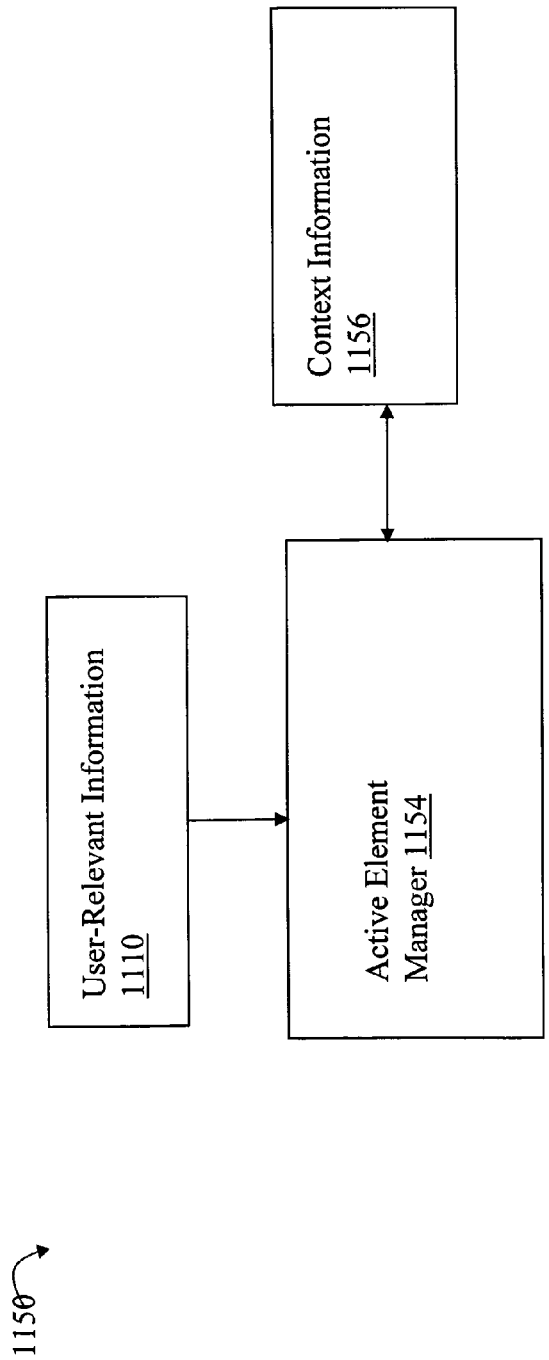
FIG. 16 is an example illustrating data flow in connection with the user-relevant information used by the active element manager.

Referring to FIG. 16, shown is an example of how the user-relevant information pushed to the AEM may be used by the AEM. In the example 1150, the user relevant information 1110 may be read by the AEM 1154 to provide notifications to the user as described elsewhere herein (e.g., as illustrated in FIG. 9). In connection with operations and activities on the data storage system including the AEM 1154, the AEM may facilitate communications with external environments, such as partner and/or vendor websites, and provide relevant context information 1156.

Figure 17:
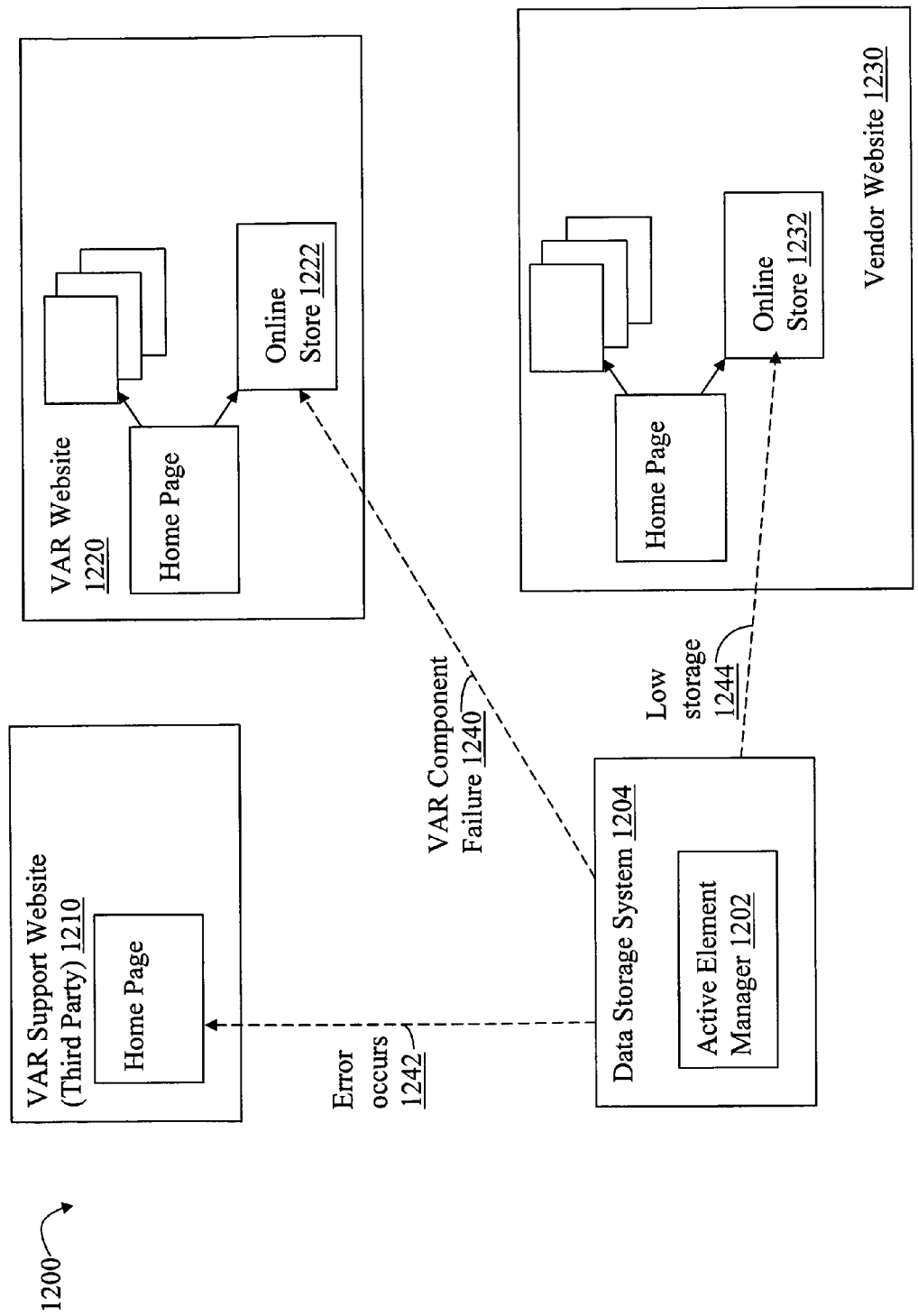
FIGS. 17 and 18 are examples illustrating how the active element manager may be configured to connect to different external environments.

Referring to FIG. 17, shown is an example illustrating how the AEM may be configured to connect to a variety of different locations in accordance with the context information of the data storage system and provide such context information to the target locations. In this example, the management system is omitted for simplicity of illustration. The example 1200 illustrates the data flow from the data storage system 1204 to various target locations although information may also flow from the target locations and their external environments to the data storage system as described elsewhere herein in connection with providing user-relevant information 1110 and subsequent user interactions.

In the example 1200, the AEM may be configured to connect to one of a variety of different target locations and environments depending on the current context information. This example illustrates the AEM connecting to different target locations in accordance with the error or status value, for example, as included in 506 of FIG. 6. It should be noted that this example illustrates a partner that is a VAR. Support related to VAR products and services may be provided online through website 1210. In this example, the VAR may contract with a third party to provide online support services for the VAR. If an error occurs on the data storage system related to VAR hardware and/or software products, the data storage system 1204 may display a UI indicator. Upon selection of the UI indicator, the user logged into the AEM of the data storage system 1204 may be connected to the website 1210 as indicated by 1242. If an error or status condition occurs the indicates a VAR component failure for selected components, such as power supply, the data storage system 1204 may display a UI indicator. Upon selection of the UI indicator, the user logged into the AEM of the data storage system 1204 may be connected to the VAR website 1220. In particular, the user logged into the AEM of the data storage system 1204 may be directly connected to the online store 1222 within the VAR website 1220. If a resource consumption alert occurs indicating low available storage as illustrated elsewhere herein, a UI indicator may be accordingly displayed. Upon selection of the UI indicator, the user logged into the AEM of the data storage system 1204 may be connected to the vendor website 1230. In particular, the user logged into the AEM of the data storage system 1204 may be directly connected to the online store 1232 within the vendor website 1230. The AEM 1202 may provide context information relevant for use by the target locations. The target locations may also utilize the user profile information as described herein for the user currently logged into the AEM 1202 for the particular data storage system 1204. For example, user profile information may indicate the previous data storage purchases in the past year. Such information may be used by the vendor website 1230, for example, in presenting or recommending particular storage devices to the user. If the user has been adding a lot of small capacity devices in the recent few months, this activity may be noted and the user may be presented with larger capacity storage device options along with a message indicating the recent purchase of small capacity devices which seems to have been utilized at a rapid rate. At the current rate of storage usage, the larger capacity devices, along with any discounts or deals, may be presented to the user.

The foregoing example 1200 illustrates how the techniques herein may be used to facilitate different types of transactions and operations ranging from electronic commerce to support.

Figure 18:
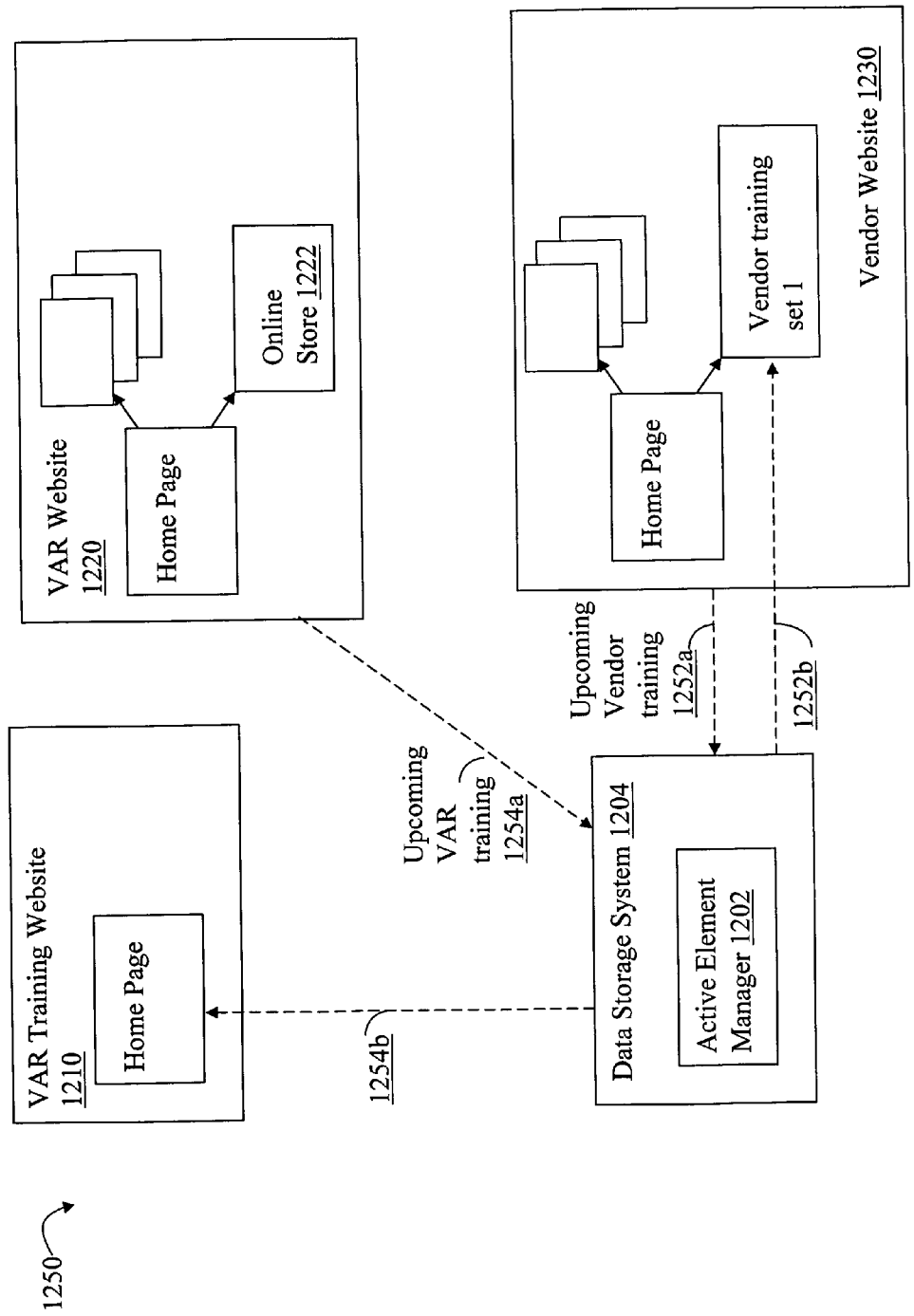

Referring to FIG. 18, shown is another example illustrating use of the techniques herein. In this example, the management system is omitted for simplicity of illustration. In the example 1250, user-relevant information may be pushed from the VAR website 1220 and vendor website 1230 to the data storage system 1204. The information pushed from the website 1220 may be represented by 1254*a* regarding upcoming relevant VAR training offerings. The user may be presented with notifications regarding the information of 1254*a* as illustrated in FIG. 9 with a UI indicator that may be selected. When selected, the UI indicator may provide a direct connection to the VAR training website 1210 as indicated by 1254*b* along with relevant context information.

The information pushed from the website 1230 may be represented by 1252*a* regarding upcoming relevant vendor training offerings. The user may be presented with notifications regarding the information of 1252*a* as illustrated in FIG. 9 with a UI indicator that may be selected. When selected, the UI indicator may provide a direct connection to the vendor website 1230 as indicated by 1252*b* along with relevant context information In one embodiment in connection with various training offerings as illustrated in FIG. 18, the context information pushed from the AEM to the websites 1210 and 1230 may include a user identifier of the AEM user, applications hosting data on the data storage system, error information (e.g., regarding the rate and/or types of errors received when performing particular data storage configuration or provisioning operations for an application), license information regarding licensed products to assist in directing a user to appropriate courses based on installed products, user community information to assist in directing a user to relevant training, and the like. The website receiving the context information may use one or more of the foregoing portions of context information and/or user profile information to provide relevant offerings for display to the user. When the AEM is facilitating connection to a website regarding relevant training, the context information provided may also omit one or more types of information. In connection with this and other operations, the context information may include relevant vendor-specific and/or partner-specific information. For example, the context information provided to one or more of the websites illustrated in FIG. 18 may include vendor-specific installed features or products. If the vendor-specific information is not relevant to the VAR training offerings, such information may be omitted from the context information provided to 1210 but included in the context information provided to 1230. Similarly, if VAR-specific product information regarding hardware and/or software licensed and/or installed on 1204 is relevant only for VAR training, then the VAR-specific information may be included in the context information provided by the AEM 1202 to 1210, but may not be included in the context information provided by the AEM 1202 to 1230.

As another example, the UI indicator regarding low storage previously described in connection with FIG. 17 may connect to one of the websites and provide a list of relevant training such as, for example, to learn how to add additional storage devices, modify a current configuration to obtain better performance as available storage capacity is consumed, and the like.

In connection with a state of the data storage system as may be indicated by context information, the techniques herein may be used to facilitate electronic commercial transactions. FIG. 17 illustrates one exemplary use for resource consumption alerts and FIG. 18 illustrates another exemplary use for additional offerings regarding training. The same techniques, for example as illustrated in FIG. 18, may be used in connection with selecting and presenting to the user in accordance with user profile information, relevant user information for services, additional hardware and/or software, enabling additional features of existing software (e.g., by modifying licensing terms and provisions), and the like.

As illustrated in FIG. 17, different resources, such as available storage as well as other resources (e.g., current battery or backup power supply charge), may be monitored and the user may be provided with notification (e.g. resource consumption alert) when the resource availability falls below a threshold amount. Different alerts may be generated for different threshold levels associated with the same resource. In connection with the resource consumption alert related to available or free disk storage as illustrated in FIG. 17, a user may be presented with a UI indicator which, when selected, directly connects to an online store 1232 and presents the user with a list of disks that can be purchased for use with customer's current data storage system based on user's context information and user profile (e.g., current usage patterns—how much new storage added in last n months or other time period, what is compatible with current customer data storage system and configuration). In connection with monitoring the data storage system and providing notifications or alerts, other examples include watching for soft errors or other conditions typically indicative of pending failure and prompting the user with a UI notification. The UI notification may notify the user regarding the observed behavior and inquire as to whether the user wants to order a replacement part.

In connection with the techniques herein, the context information regarding the data storage system and particular user as recorded in the user profile may be used to leverage sales of particular services, products, and the like, that may relevant to the user. Any purchases made online may be recorded in the user profile information.

The techniques herein may be used to facilitate a variety of different operations and interactions. The user is interacting with the AEM which, in connection with the techniques herein, as connectivity to external environments and provides for a bidirectional communication path between the AEM and external environments.

As described herein, the AEM may be customized by the partner selling the data storage system. Such customization may include directing the AEM to particular websites in accordance with different status or error conditions, collecting additional information for use in connection with VAR or other partner-provided components associated with an error or status condition and the like. The AEM may be customized in accordance with the particular business practices and arrangements of the partner with third parties and the vendor. For example, the AEM may collect a first set of generic data which may be characterized as vendor-specific. The AEM may be customized to collect additional data for use in connection with user communities, support services, e-commerce, and the like as described herein, with VAR-specific products and services. The VAR or other partner may control and regulate the flow of information in a variety of different ways. For example, for one particular status or error, the AEM may connect to one particular website supported by the VAR. If VAR is contracting or outsourcing support services to a third party, the VAR may direct the AEM to contact (e.g., navigate to) a third party website for support issues and otherwise navigate to the VAR website.

Figure 19:
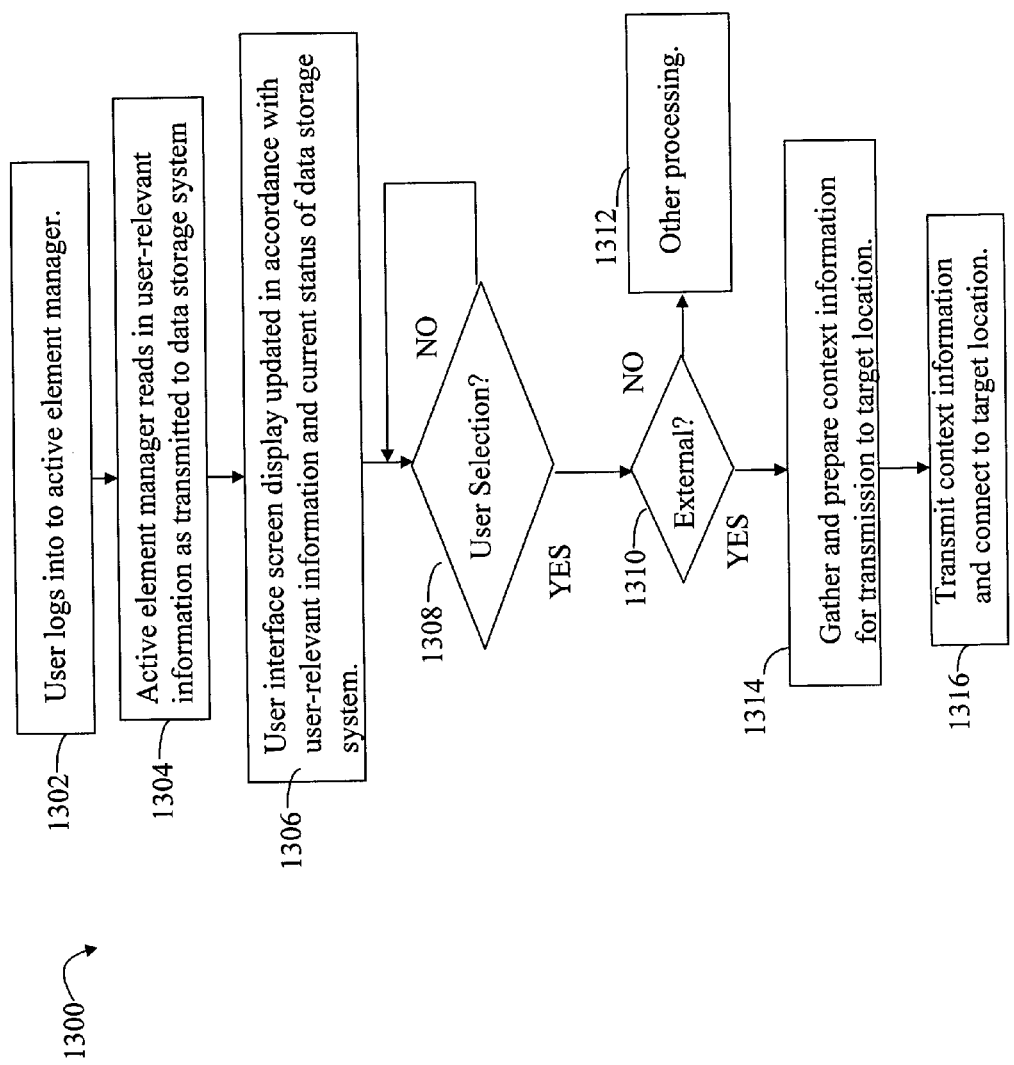
FIGS. 19 and 20 are flowcharts of processing steps that may be performed in an using the techniques herein.
Figure 20:
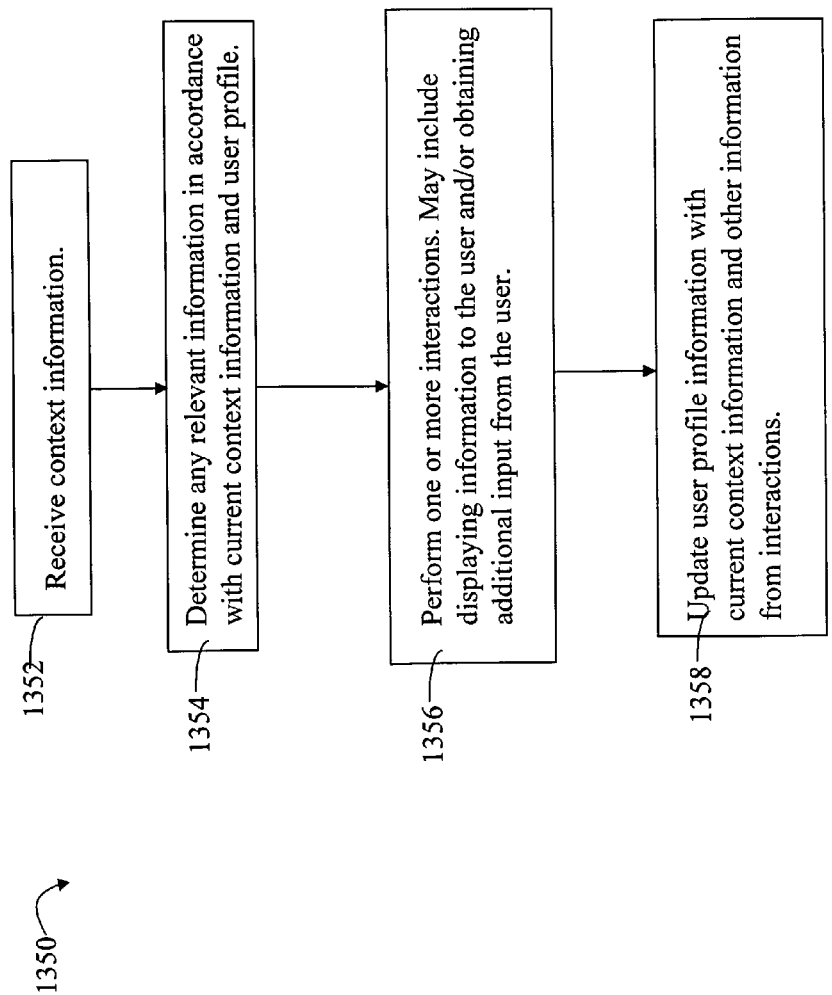

Referring to FIGS. 19 and 20, shown are flowcharts summarizing processing as may be performed in connection with the techniques herein as described above. At step 1302, a user logs into the AEM. In step 1304, the AEM may read in user-relevant information as selected and transmitted from one or more external environments to the data storage system. In one embodiment, step 1304 may include reading notifications as provided by the vendor and/or partner websites related to products, services, user communities, and the like. FIG. 9 provides some examples of the types of notifications as may be provided and displayed to the user in step 1306. Additionally, as part of step 1306, other status information regarding the data storage system may be obtained and included in the displayed information (e.g., general data storage system health, resource consumption alerts, and the like). At step 1308, the AEM waits for a user selection or operation. Once a user makes a selection to perform an operation from the displayed interface, control proceeds to step 1310. At step 1310 a determination is made as to whether the user selection involves making a connection to an external environment, such as a website of a vendor and/or partner. If not, control proceeds to step 1312 such as when performing a data storage provisioning operation. If step 1310 evaluates to yes, control proceeds to step 1314 where processing is performed by the active management component 130 of FIG. 2 to facilitate communications with the external environment. At step 1314, the context information is collected and prepared for transmission to the target location in the external environment. In step 1316, the context information is transmitted to the target location and the user is connected to the target location. In step 1352, the context data is received at the target location. Additional information may be extracted from the user profile. Information may be displayed to the user in accordance with the transmitted context information and/or user profile information. For example, as illustrated in FIG. 10, a message may be displayed to the user in 804 regarding the resource consumption alert indicated in the transmitted context information. As another example, a query may be performed of the available data storage devices to display to the user selected ones in a relevance ordering determined in accordance with the context information and user profile information (e.g., storage capacity and types compatible with the customer's current configuration). At step 1356, one or more other interactions may be performed with the user. This may include, for example, navigating to other web pages, displaying additional information to the user and/or obtaining additional input from the user. At step 1358, the user profile information is updated in accordance with the transmitted context data and interactions of steps 1356.

The user-relevant information that may be pushed to the data storage system for use by the AEM is described above, for example, in connection with FIG. 15.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

The techniques herein may be used in connection with any operation performed by the AEM 120 of FIG. 2. As described herein, exemplary operations may include performing data storage system management operations including data storage configuration requests such as data storage provisioning as well as monitoring and other operations associated with management of the devices of the data storage system.

It should be noted that as described herein, the AEM may facilitate automatically connecting to an external environment, and even a particular target location in the external environment. As part of this process, the AEM may provide the user identifier as part of the context information. The user identifier may be used, for example, as part of user authentication for the user of the AEM to connect to the external environment. For example, the user may be prompted to enter additional information as part of the authentication process to connect to a virtual user community, gain access to a partner or vendor site, and the like. In connection with a target location, a password may not be required, for example, if connecting to a public website without restricting access to particular users. In such instances, the user identifier included in the context information pushed to the website from the AEM may be used to track additional activities incorporated into the user profile information associated with the user identifier. Connecting to an external environment, such as a website provided by one of the vendors or data storage suppliers, may provide connection to one or more server computer system located at the particular website. Code may be executed on the one or more server computer systems in connection with performing the techniques described herein such as, for example, determining the user relevant information in accordance with the user profile information stored on a data storage device accessible to the server systems.

The techniques herein may be used to facilitate communication between the AEM and an external environment, such as a website, for electronic commerce purchases, upgrades, and other transactions. As described herein, the AEM may be used to monitor for failures of different components, such as different hardware component failures or signs of pending failure, and provide notification to the user. Pending failure may be determined, for example, by the AEM observing over time one or more types of errors of a component commonly known to indicate pending failure. The AEM may also be used to monitor data storage systems resources, such as data storage devices and components (e.g., batter backup power supply levels), in accordance with defined threshold levels and provide notification to the user when the resource levels falls below the specified threshold. For example, as illustrated herein, the AEM may monitor the amount of available disk storage and provide notification to the user when the amount falls below a threshold level. The threshold levels may be configurable, for example, by the partner as part of AEM configuration. The threshold levels may also be configurable by a user. By monitoring the data storage system for the occurrence of a threshold level, component failure, or other criteria, the AEM may provide notification of the particular event to the user, for example, via a user interface indicator 705 of FIG. 9. The user may then select the indicator and be connected by the AEM to a target location in an external environment, such as an online store at a vendor and/or partner website, to make a relevant purchase. Thus, the techniques herein with the AEM may be used to facilitate electronic commerce by, for example, ordering disk drives as before remaining storage capacity is used to a predetermined level, ordering replacement components on detection of failure and/or pending failure, renewing a license or support contract prior to expiration, and the like.

As described herein, the AEM may be used to facilitate a bi-directional information flow between the AEM and one or more external environments, such as one or more websites of a vendor and/or partner. The bi-directional information flow may be used in connection with performing a variety of different tasks and operations such as related to, for example, interactive automated support, electronic commerce, and/or virtual user communities. The AEM provides context information to enrich the task, operation, and the like, being facilitated using the bi-directional information flow. The context information is achieved in connection with data gathered regarding functions performed by an element manager as users manage and provision the storage. The AEM may use the data storage system to collect information as management operations are performed thereon (e.g., for data storage configuration, provisioning, monitoring and the like) for obtaining the context information provided by the AEM to an external environment. As described herein, the AEM may also receive information from one or more external environments, such as the websites of vendors and/or partners, as part of the bi-directional information flow to facilitate tasks such as interactive automated support and electronic commerce. The information received may be the user-relevant information provided to the AEM as well as other information exchanged as part of the bi-directional information flow. In connection with electronic commerce, the techniques herein may be used to facilitate interactions between the AEM and an external environment, such as the vendor or partner website, for initial purchase, renewal, extension, or upgrade for support agreements, warranties, and the like.

What will now be described in more detail are different ways in which the AEM may be used to facilitate providing support to a customer or user of a data storage system.

In accordance with one aspect, the user may be interactively issuing commands to the AEM to perform a task. The AEM may be used to facilitate support in completing such a task through bidirectional communications between the AEM and the external environment. A user of the AEM may be performing a particular task, for example, provisioning storage for use with an application. The user may be unable to complete the task and ask for assistance in order to complete the task. The user may be receiving errors or warnings in connection with performing the task. Alternatively, the user may not receive any of the foregoing processing errors or warnings but may not be achieving the desired result. The user may ask for help directly, such as, for example, through an AEM user interface selection or option, and the user may initiate such an exchange with the AEM. The AEM may also detect, based on user activity, that the user may be experiencing problems completing the task and prompt the user as to whether the user would like further assistance in completing the task. In other words, based on user activity, the AEM may initiate an exchange with the user and inquire whether the user would like to receive assistance. The AEM may detect this activity in any one or more different ways. As a first example, the user may receive one or more error messages, warning messages, and the like, and, based on this status, the AEM may inquire whether the user wants assistance. As a second example, the user may repeatedly perform search queries for online help. Such help inquiries may be analyzed by the AEM based on user-input keywords or query terms to determine that a user is looking for information trying to figure out how to complete a particular task. The AEM may analyze the user activity and accordingly inquire as to whether the user wants further assistance.

The prompting of the user by the AEM may take any one of a variety of different forms. For example, the AEM may display a dialogue box to the user making an inquiry as to whether the user wants to receive assistance in performing a task. Based on the evaluation and analysis performed by the AEM, the dialogue box may include information as to what the AEM concludes the task to be (e.g., what one or more tasks the user may be attempting to complete). The AEM may also inquire as to whether the user wants assistance via a GUI indicator, such as a flashing icon or other indicator displayed on the GUI of the AEM.

Upon the user selecting to receive assistance (either by user-initiated exchanges or AEM initiated exchanges), the AEM may initiate communications with one or more locations in the external environment and provide context information used to determine relevant support information and services. As previously illustrated and described herein, for example, in connection with FIGS. 4 and 5, the user may be directed to one or more different locations in the external environment such as a vendor website and/or partner website. For simplicity in illustration, the management system 16 may be omitted from examples herein.

Figure 21:
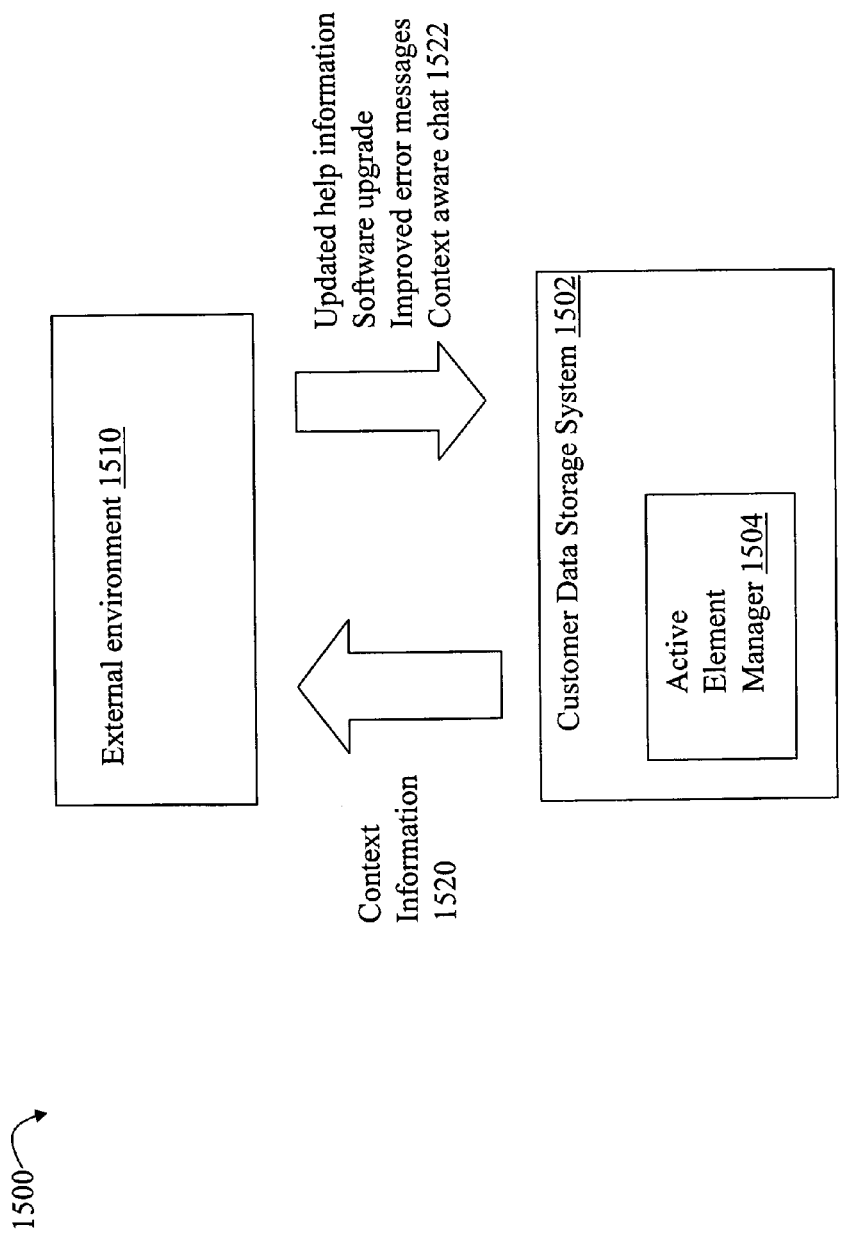
FIGS. 21-29 are examples illustrating data flow between the data storage system and external environments as may be performed in an embodiment in connection with the techniques herein.

Referring to FIG. 21, shown is an example illustrating a flow of information in an embodiment in connection with a user requesting further assistance for performing a task on the data storage system using the AEM. As described above, the user may be performing such a task through interactively issuing commands to the AEM via a user interface. The user may select to receive assistance, for example, via selection through a user initiated exchange (e.g., user selects HELP from a menu on the GUI of the AEM), or an AEM-initiated exchange such as UI indicator included in a GUI of the AEM such as illustrated in FIG. 9 (e.g., in area 705) or dialogue box. In response, the AEM may communicate context information 1520 to a location in the external environment 1510.

As described herein, the external environment may include one or more different locations such as a vendor website and/or partner website. The AEM may transmit varying context information 1520 to one or more locations in the external environment in accordance with AEM configuration options or settings, particular conditions related to data storage system status and/or user interactions, and the like. For example, the AEM may be configured by a VAR or other partner to transmit selected context information 1520 to one of a variety of different locations depending on the particulars of the context information 1520. The AEM may perform some initial analysis or evaluation of the context information and selects a particular target location in the external environment depending on that analysis performed by the AEM. If the task is related to a VAR-specific software and/or hardware component, the context information 1520 may be transmitted to a VAR website. If the task is related to a problem with the underlying data storage devices, the context information may be transmitted to a vendor website. The AEM may include software to perform such analysis or evaluation based on a state of the data storage system. The state may be determined based on error messages received, one or more previous user interactions (e.g., previous user selections from menus, commands issued), and the like. In response to receiving the context information, the external environment 1510 may perform additional analysis to determine one or more types of support information that may be relevant to the context information provided. The external environment may accordingly provide one or more different types of support information and/or services 1522. Such support information supplied by the external environment 1510 may relate to, for example, updated help information, software upgrade information, and improved error messages. Additionally, support services, such as an interactive, context aware chat session with a support person may be initiated. Alternatively, notification regarding the existence of such services may be provided as part of 1522 and may be initiated through subsequent user selections. Rather than have the AEM transmit context information to more than one possible location in the external environment, the AEM may always connect to a same location in the external environment, such as a VAR website location, at which analysis of the transmitted context information may be performed.

The context information 1520 may include one or more types of information as described in more detail elsewhere herein. In particular, the context information 1520 may include identification information about the data storage system and user. Additionally, the context information 1520 may include a trace log of user activity. The trace log may capture user activity from a particular point in time that may be analyzed by the external environment 1510 in deciding what information to return and/or action to take in connection with communicating with the AEM 1504. For example, the trace log may include user commands, errors received, help inquiries including keywords or query terms entered, and the like. A person and/or automated software in the external environment may analyze the trace log (as well as possibly other context information) to identify patterns or specific problems and respond accordingly.

The support information of 1522 may include updated help information such as, for example, identification of a website location from which an updated help file may be downloaded or installed. Via the AEM, the user may be presented with an option to install the updated help files. Alternatively, the help files may be automatically downloaded as part of the response 1522 and installed from the external environment 1510 based on security options, configuration settings, and the like, of the data storage system. As an example, the context information 1520 may include recent user activity in which the user has performed a number of searches with one or more related keywords on a particular topic. Software at an external environment location, such as a VAR website, may analyze the context information to identify the pattern of user help inquiries on the topic. Based on a supplied help version file identifier included in the context information, the software on the VAR website may determine that a later version of the help file is available and note that the help on the particular topic as included in the recent user activity has been updated. In response to receiving the context information at the VAR website and performing the foregoing analysis, the VAR website may send a message to the AEM 1504 with a link to a VAR website location at which a user may download and install the updated help file. Alternatively, the VAR website may automatically download and install the updated help file depending on the AEM and/or data storage system configuration options and settings.

The external environment may provide support information in 1522 regarding available software upgrades. Software upgrades may include, for example, patches or corrections, software versions which are more up to date than that currently executing on the data storage system, and the like. Software at the external environment location, such as a VAR website, may analyze the context information and determine that errors received by a user relate to a problem that has been corrected in a subsequent software upgrade. The context information may include a trace log of user activity as well as the current software versions installed on the data storage system. In response to the external environment location receiving and analyzing the context information, the external environment may send a message to the AEM 1504 indicating that errors received may relate to a known problem or bug that has been corrected in a software upgrade. The message may also include a website location where the user may download and install the software patch, newer version, and the like.

The external environment may provide support information in 1552 regarding improved or updated error messages. At the external environment location, the context information may be analyzed and particular messages (e.g., error, warning, or other informational messages) included therein may be known as non-descriptive or otherwise improved with a later version of an error message file. As such, in response to the external environment location receiving and analyzing the context information 1520, the external environment may send a message to the AEM 1504 indicating that error messages have been improved and a later version of a message file is available. The response may also include a website location where the user may download and install the improved error message file. If the improved error message file is included as a software upgrade, then the response from the external environment may identify the software patch or version and a location at which the user may download and install the software upgrade including the improved error messages.

In response to the external environment location receiving and analyzing the context information, a context aware chat or interactive dialogue (e.g., online message dialogue) with a live customer support agent may be initiated. The foregoing may assist the user in walking through steps to complete the task, ask further questions regarding problems encountered, and the like. As an alternative, information may be included in 1522 so that the user can initiate such a dialogue if desired. Rather than have an interactive dialogue online, element 1522 may provide a user with an alternative option to be contacted via phone by a support person. The context information, as well as other user profile information, may be used by the support person in assisting the user.

It should be noted that the support information and services indicated in the response of 1522 may vary depending on the analysis of received context information 1520 performed in the external environment 1510 as described above.

In connection with FIG. 21 as well as others described in following paragraphs, the support information and services indicated in the response received from the external environment may be presented to a user of the AEM in any one or more different forms including, for example, an icon or other UI indicator, an email message, a pop-up or dialogue box, and the like. The particular form may vary with the type of support information and service. For example, if an interactive chat dialogue is initiated, a dialogue box or window may appear on the UI of the AEM. A UI indicator may appear in a portion of the UI of the AEM, for example, as illustrated in FIG. 9, for other types of support information. If more than one type of support information or service is applicable, the response 1522 may include presenting a user with the different support options so that the user may select one to be taken.

In connection with FIG. 21 as well as others described in following paragraphs, the external environment may use the context information transmitted and as well as other user profile information that may be available.

Figure 22:
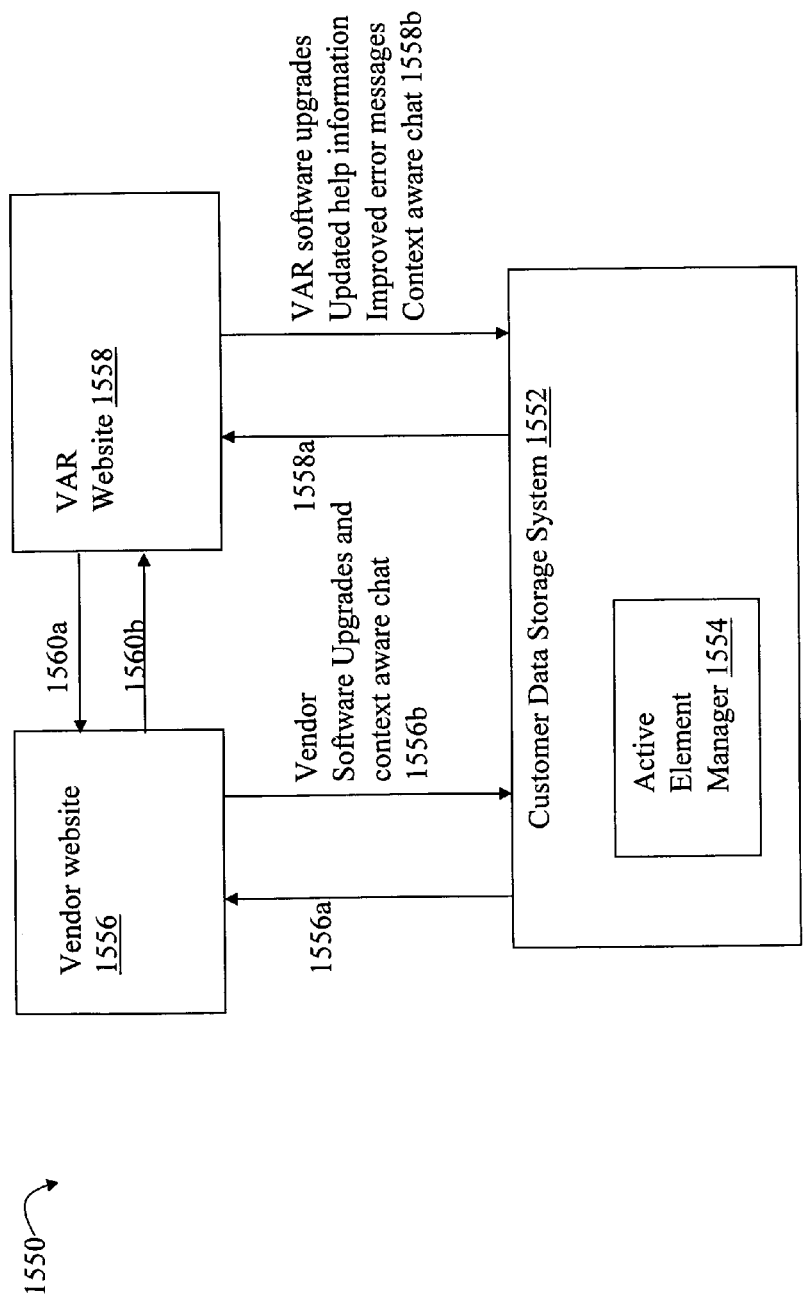

Referring to FIG. 22, shown is an example 1550 illustrating a data flow of information in one embodiment in connection with techniques herein for providing support. The support information and/or services may be provided as described above in connection with a user logged onto and interactively using the AEM 1554 to perform a task. The example 1550 illustrates one particular way in which interactions may occur between the data storage system 1552 and a location in the external environment as represented more generally in FIG. 21.

The AEM 1554 of data storage system 1552 may be configured by the VAR to connect 1556a to a vendor website 1556 for disk level errors or for errors related to vendor-supplied software. Element 1556a denotes transmission of the context information including a trace log as well as possibly other information as described herein. In turn, as described above, analysis of the context information may be performed at the vendor website to determine possible actions to take. Such actions may be included in a response 1556b and may include, for example, suggesting installation of a vendor software upgrade. If the context information includes error messages related to hardware problems, such as disk errors, the vendor may initiate a context aware chat session (e.g., an interactive dialogue between the user on the system 1552 and a customer support agent) to gather additional information, instruct the user to perform certain operations, and the like. As yet another alternative, the vendor website 1556 may transfer control to the VAR website 1558 if analysis performed at 1556, using automated software and/or review by a person, deems such action appropriate. The VAR website 1558 may perform additional analysis and further communications may then occur between the VAR website 1558 and the data storage system 1552.

In the example 1550, the AEM 1554 of data storage system 1552 may be configured by the VAR to connect 1558a to a VAR website 1558 for any support issues other than those related to disk level errors or for errors related to vendor-supplied software. For example, the AEM may perform initial analysis of the error message received and determine that the error relates to a VAR-provided software component. Based on such initial analysis, the AEM may connect 1558a to the VAR website 1558. Element 1558a denotes transmission of the context information including a trace log as well as possibly other information as described herein. In turn, as described above, additional analysis of the context information may be performed at the VAR website to determine possible actions to take. Such actions may be indicated in a response 1558b and may include, for example, suggesting installation of a VAR software upgrade, updated help information, or improved error messages, and may also initiate an interactive, context aware chat session. As indicated by 1560a and 1560b, the VAR website 1558 may also interact with the vendor website 1556 to obtain information as needed. For example, in connection with supplying updated help information or improved error messages, the VAR may generate and provide, respectively, an updated help file or error message file incorporating vendor and VAR supplied information.

It should be noted that the response 1558b may also present the user of the AEM 1554 with one or more options from which the user may select an action to be taken. For example, the VAR website may determine that one or more actions indicated by 1558b may be appropriate given the analysis of the context information as provided from the AEM.

As described above, the user may be directed to any one or more locations in the external environment, such as a vendor website or VAR website. The external environment locations to which the AEM connects and transmits context information may vary depending on, for example, configuration settings in the AEM (and data storage system). Such configurations may be made by the VAR or other partner, as well as via user-specified options, to connect to one or more external environment locations when a user asks for help. The external connections made by the AEM in response to a user help inquiry may also depend on initial analysis performed by the AEM on the trace log and/or other context information. Furthermore, the user may ask to be specifically connected to one or more external locations in accordance with a user configuration setting, a selection by a user to one of a variety of appropriate actions determined by the VAR website, and the like.

It should be noted that a user may also initiate and ask for help on a particular topic and the AEM may accordingly connect the user to the appropriate location. In other words, the user may make such an inquiry for help without actually performing steps or actions to complete the task, receiving error messages, performing searches, and the like.

Figure 23:
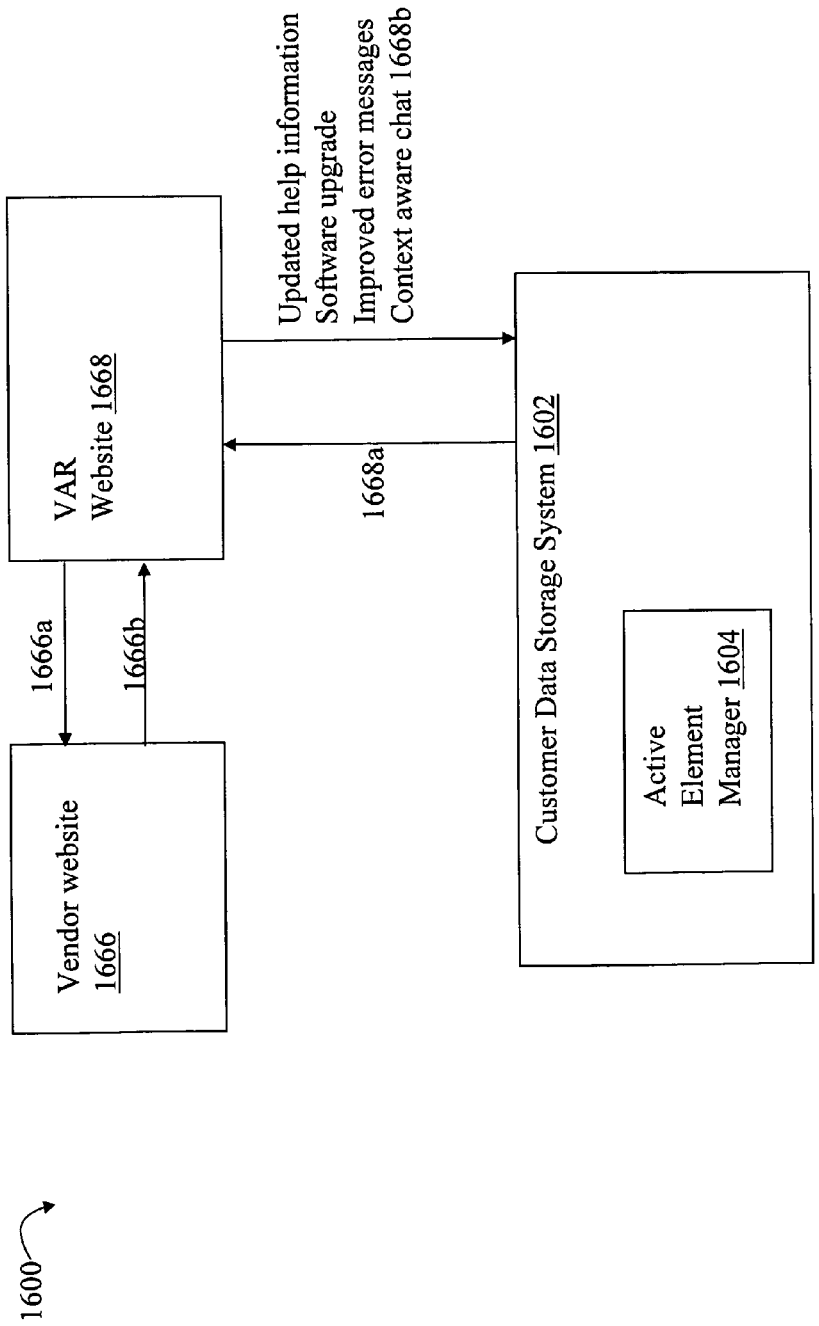

Referring to FIG. 23, shown is another example illustrating how data flow may occur between components in connection with the techniques herein. The example 1600 illustrates another way in which dataflow may occur to provide support information and services in connection with a user logged onto, and interactively using, the AEM 1604 to perform a task. The example 1600 illustrates another way in which interactions may occur between the data storage system 1602 and a location in the external environment as represented more generally in FIG. 21.

In the example 1600, the AEM 1604 may be configured to initially contact the VAR website 1668 in response to a user inquiry for help in the external environment. One embodiment of the AEM 1604 used in the example 1600 may not perform an initial analysis regarding the state of the storage system or other context information. In response to a user asking for help, the AEM may collect and transmit 1668a context information to the VAR website 1668. Analysis of the context information transmitted may be performed at the VAR website 1668. In turn, the VAR website 1668 may communicate (e.g., 1666a and 1666b) with the vendor website 1666 as needed. For example, the VAR website 1668 may determine that the user is having problems with a task related to a vendor-supplied component, disk error, and the like, and communicate with the vendor website 1666 to obtain relevant support information. The VAR website may indirectly facilitate providing such vendor-specific information to the AEM 1604 by obtaining vendor-specific information as needed. As such, the user of the AEM 1604 may be unaware of any such communications with the vendor website 1666.

The data flow of the example 1600 may be the result of a configuration option or setting by a VAR in the AEM. The user or customer of the data storage system may not be allowed to modify such a setting.

In connection with the foregoing, a user of the AEM may be provided with relevant support information and services based on context information. The context information may be related to recent user activity including user actions, responses received (e.g., such as errors), resulting state of the data storage system, and the like. Analysis of the context information, such as the trace log, may be performed on the data storage system as well as a target location in the external environment. It should be noted that the analysis performed at the target location in the external environment, such as a VAR website, may also utilize other user profile data as described elsewhere herein.

Another way in which relevant support information and services may be presented to a user of the AEM relates to available training. As described elsewhere herein, training may be offered by the vendor and/or partner, such as a VAR. The training may be determined as relevant in accordance with context information as well as other user profile information. The training information may be for online training, in-person training as in a class or courses offering, and the like. The user may be informed of such training via the AEM when the user is logged into the AEM. In one embodiment, the AEM may push context information to one or more locations in the external environment at selected time intervals. Such times at which information is transmitted from the AEM may be while the user is logged into and using the AEM. In other words, an embodiment may transmit context information to an external environment location to determine relevant training while the user is logged into the AEM. If the user logged out of the AEM, such context information may not be transmitted and targeted available training not provided to the AEM from the external environment. For example, the AEM may transmit context information to a VAR website and/or vendor website one a day, every so many hours, and the like, when the user is logged into and using the AEM. In response, information regarding available training may be sent from the external environment to the data storage system at various times such as, for example, once a day, every so many hours, and the like.

Figure 24:
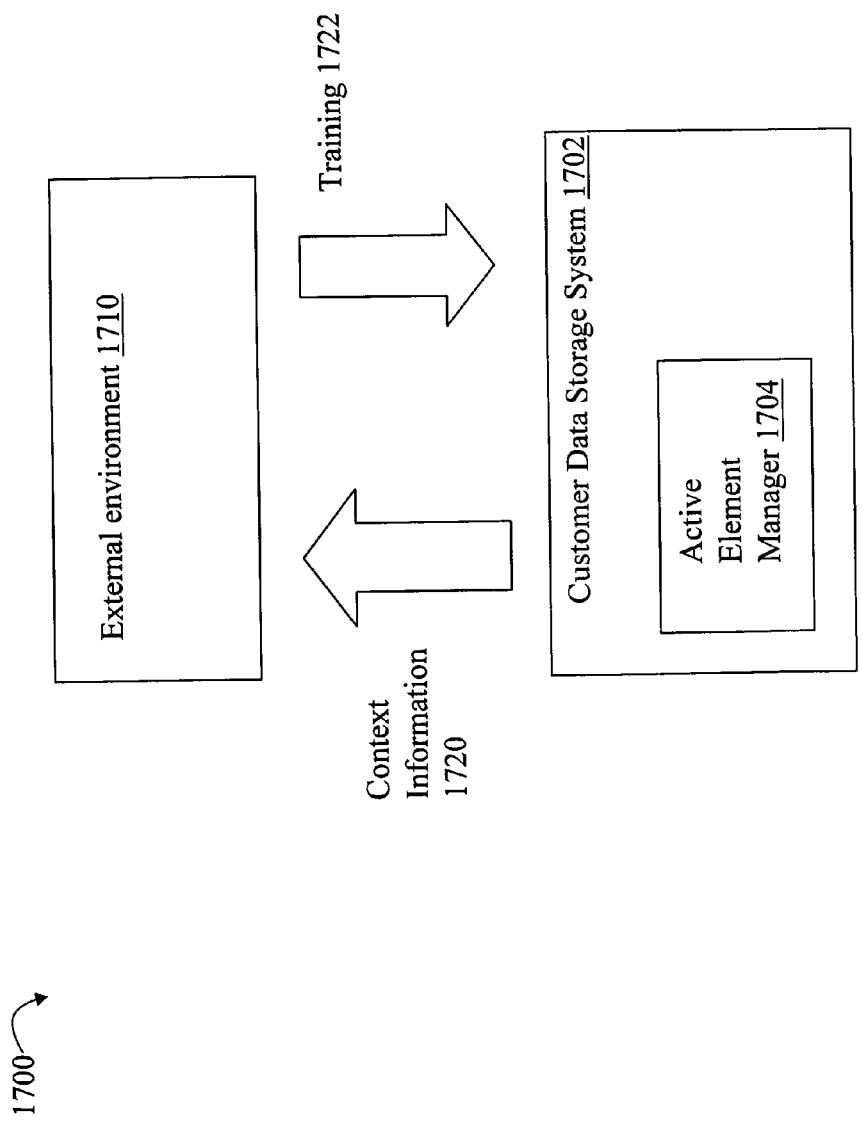

Referring to FIG. 24, shown is an example illustrating a flow of information in an embodiment using the techniques herein to provide support information related to available training. The example 1700 illustrates a flow of information as may occur in an embodiment in connection with a user logged into the AEM and performing a task through interactively issuing commands to the AEM via a user interface. The AEM 1704 may collect context information 1720 based on user activity and transmit the context information 1720 to one or more locations in the external environment 1710. Such collection and transmission of context information 1720 may occur while a user is logged into the AEM. In response, the external environment 1710 may perform processing and evaluate the context information 1720 to determine one or more relevant training offerings 1722 which are transmitted to the data storage system 1702. In one embodiment, the exchange indicated by 1720 and 1722 may be performed while the AEM is online or in-use with a user logged into the AEM. As also described elsewhere herein, context information 1720 may be collected while the AEM is being used and training information 1722 may also be transmitted to the data storage system 1702 while the AEM is not being used (e.g., no user logged in) so that the user may be presented with training options 1722 when the user logs in at a later point in time.

As with other processing described herein, the context information 1720 may include a trace log, data storage configuration information, and the like. In one aspect, the example 1700 of FIG. 24 is a more general representation of the techniques illustrated, for example, in 1250 of FIG. 18.

As with other forms of support information provided as described, for example, in FIGS. 21-23, the AEM 1704 may perform a first analysis of context information and make a determination regarding which location in the external environment to forward context information. As also described herein, the one or more locations with which the AEM 1704 communicates may vary in accordance with configuration options/settings as well as the context information obtained during a time interval (e.g., user activity information collected, data storage configuration, and the like).

The training information 1722 provided may be related to the context of how a user is using the data storage system. If such training information 1722 is provided based on a particular set of context information collected for a time period, then such training information 1722 may vary in accordance with changes in user activity. If training information 1722 is provided using current or recent context information as well as other information collected over time (e.g. such as in the user profile), then such training information 1722 may be based on recent user activity observed as well as historic user collected data.

Notification regarding the training available may take any one or more different forms. For example, the notifications may be in the form of an email, pop-up or dialogue box, UI indicator (e.g., such as illustrated in FIG. 9 and described elsewhere herein), and the like.

The data storage system may conditionally or selectively send the context information to one of a variety of different sites based on initial analysis performed on the data storage system. The analysis may be performed by the AEM with respect to the context information collected during a time interval. Alternatively, the data storage system may not perform any analysis of the context information and may collect and send the context information to one or more external environment locations, such as a VAR and/or vendor website, at which the context information is analyzed.

Figure 25:
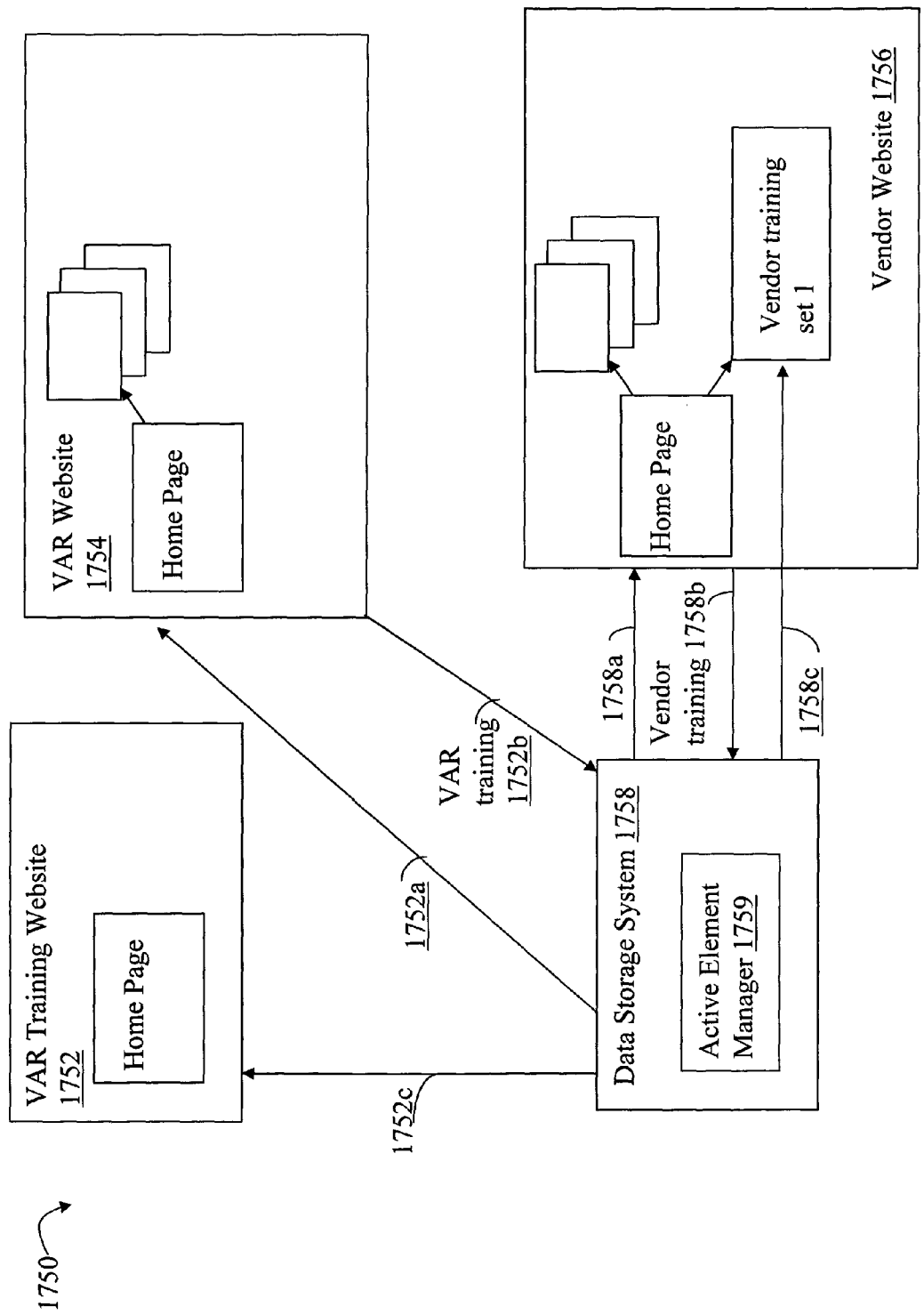

Referring to FIG. 25, shown is an example illustrating 1750 illustrating a data flow of information in one embodiment in connection with techniques herein for providing support information related to available training. The training information may be provided as described above in connection with a user logged onto and interactively using the AEM 1759 to perform a task. The example 1750 illustrates one particular way in which interactions may occur between the data storage system 1758 and a location in the external environment as represented more generally in FIG. 24.

In the example 1750, the data storage system 1758 may collect context information over a time period while a user is logged onto and using the AEM 1759. The context information collected may be analyzed by the AEM to determine whether user activity noted therein relates to a vendor and/or VAR. Depending on the analysis of the context information, the AEM 1759 may then selectively forward the context information to the VAR website 1754 and/or vendor website 1756. Element 1752a denotes transmission of the context information to the VAR website 1754. In response, the VAR website 1754 may analyze the context information, alone or in conjunction with user profile information, to determine available VAR training which is communicated 1752b to the data storage system 1758. The AEM 1759 may present the VAR training information 1752b to the user in the form of a link to a webpage providing additional information on the training. In this example, the user may select to receive more information about the training by selecting a link included in the information of 1752b. Selection of the link may connect 1752c the data storage system 1758 to a VAR training website 1752. This example 1750 illustrates an instance where the VAR training description, registration, and the like, may be provided at a location in the external environment separate from another VAR website 1754. For example, the VAR training website 1752 may be provided by a third party with which the VAR has contracted for services.

Element 1758a denotes transmission of the context information to the vendor website 1756. In response, the vendor website 1756 may analyze the context information, alone or in conjunction with user profile information, to determine available vendor training which is communicated 1758b to the data storage system 1758. The AEM 1759 may present the vendor training information 1758b to the user in the form of a link to a webpage providing additional information on the training. In this example, the user may select to receive more information about the training, sign up for a training class, and the like, by selecting a link included in the information of 1758b. Selection of the link included in 1758b may connect 1758c the data storage system 1758 to a particular web page at the vendor website. If the context information included other information, such as other commands and tasks for a different application, the vendor training information of 1758b may have included a link to a different web page on the vendor website 1756.

As an example, the data storage system 1758 may initially analyze the context information and determine that the user activity relates to particular tasks for an application, such as an email application, database application, and the like. The user activity may include one or more of provisioning tasks, help inquiries or searches in help files local to the data storage system, searching of external environment locations, and the like. Based on commands entered, query terms, and the like, included in the context information, the data storage system 1758 may determine that current user activity relates to performing tasks for a particular application. In response, the AEM may forward the context information to 1754 and/or 1756 for further analysis in accordance with current training offerings. If the vendor, for example, does not provide any training which is application specific, the AEM may be configured to forward the context information only to 1754. Additionally, the AEM may provide selective VAR-specific information in the context information transmitted.

Alternatively, the AEM (and data storage system) may be configured to send the context information to one or both of the VAR website and vendor website without performing analysis on the data storage system 1758. In such case, the AEM 1759 may collect the context information and forward the context information to 1754 and/or 1756 without performing analysis thereof.

Figure 26:
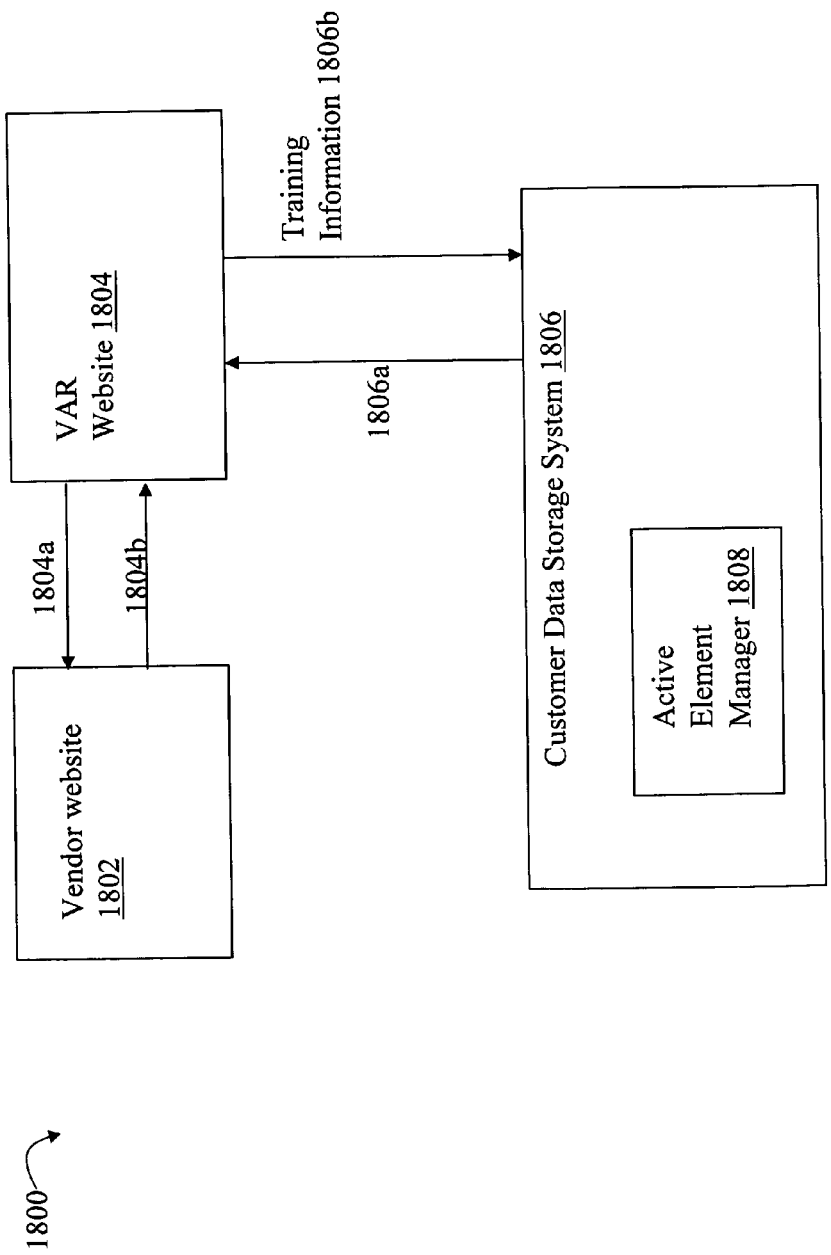

Referring to FIG. 26, shown is another example illustrating how data flow may occur between components in connection with the techniques herein. The example 1800 illustrates another way in which dataflow may occur to provide support information related to training. Such support information, or notification thereof, may be presented to a user while logged onto, and interactively using, the AEM 1808. The example 1800 illustrates another way in which interactions may occur between the data storage system 1806 and a location in the external environment as represented more generally in FIG. 24.

In the example 1800, the AEM 1808 may be configured to initially contact the VAR website 1804 and to forward context information thereto at defined time intervals while the user is logged into the AEM. An embodiment of the AEM 1808 may not perform an initial analysis regarding the state of the storage system or other context information. At defined time intervals while the user is logged into the AEM, the AEM may collect and transmit 1806a context information to the VAR website 1804. In turn, analysis of the context information may be performed at the VAR website 1804 to determine and provide user-relevant training information 1806b to the data storage system 1806. Upon receiving the context information, the VAR website 1804 may analyze the context information, alone or in conjunction with other user profile information, to determine relevant training offerings of the VAR. The VAR website 1804 may also communicate (e.g., 1804a and 1804b) with the vendor website 1802 as needed, for example, to periodically obtain information regarding vendor training offerings (e.g., as illustrated by 1804a and 1804b). The VAR website 1804 may provide training information in 1806b which is a combination of vendor and VAR training determined as relevant in accordance with the context information 1806a. As described herein, the relevance may also be determined more generally with respect to user profile information. The VAR website 1804 may also serve as a filter to include only certain vendor training offerings in the training information provided to the data storage system 1806.

As an example of the analysis that may be performed on the VAR website, the context information may be analyzed and, based on error information, configuration information, and the like, it may be determined that the user is performing commands related to an application for which the vendor offers a course. Analysis of the context information may also indicate, for example, that a user is having problems with a task related to a vendor-supplied component, disk error, and the like. The VAR website may indirectly facilitate providing vendor-related training obtained from the vendor website 1802. As such, the user of the AEM 1808 may be unaware of any such communications with the vendor website 1802.

The data flow of the example 1800 may be the result of a configuration option or setting by a VAR in the AEM. The user or customer of the data storage system may not be allowed to modify such a setting.

With reference to providing notifications regarding available training, such notifications may occur in an embodiment after context information has been collected and reported to the VAR and/or vendor website (or other location in the external environment) for a defined time period. In other words, before sending targeted advertisements for training determined as relevant for a particular user of the AEM 1808, the context information may be collected for a time period in order to build a user profile. After a time period, the user profile information and/or context information provided for one or more time intervals, may be analyzed to provide such targeted training advertisements for training determined as relevant. In one embodiment, the training notification may be a configuration option of the AEM 1808 which is turned on automatically after a time period has lapsed during which the AEM has collected and transmitted context information to one or more locations in the external environment. After the time period has passed, a user may receive relevant or targeted training notification messages. The time period may be a configurable option, for example, that may be set by the VAR or other provider of the AEM and data storage system 1806. There may also be a configuration option to enable/disable receipt of the training notifications. For example, after the time period, the user of the AEM may receive training notification messages. The user may elect to enable or disable receiving any subsequent training notification messages by setting the appropriate configuration option. Such training notifications may be provided to the user when logged into the AEM using any one of a variety of different techniques. It should be noted that the enabling/disabling of training notification for a time period may be performed in a variety of different ways. For example, the VAR may transmit such training information but the AEM (or data storage system) may be configured not to display such training information until such time period has passed. In another embodiment, the VAR may not transmit such information to the AEM until the time period has passed.

Notification regarding new training may take place in an asynchronous manner as such training offerings become available. For example, a VAR may offer new training courses every month. Each time such new training courses are determined, the VAR may perform processing to determine which users to selectively notify each month in accordance with collected context information or more generally, user profile data.

With reference back to FIGS. 21-23, described are examples in which the data storage system may be provided with information regarding software upgrades in response to a user asking for help or assistance with a problem or other inquiry. Information regarding software upgrades may also be provided to the data storage system without a specific user inquiry for help. In other words, one trigger event causing notification regarding software upgrades may relate to a user experiencing a problem or the user making an inquiry for help. Another trigger event causing such notification regarding software upgrades may be related generally to user context information transmitted to a VAR website, vendor website, or other location in the external environment as described, for example, in connection with FIGS. 24-26. The VAR and/or vendor website may collect context information and user profile data as described herein, for example, in connection with FIGS. 24-26. When a software upgrade provided by the VAR is available, the VAR may analyze the user profile information and determine whether to provide notification regarding the software upgrade to an AEM user. In other words, the VAR or vendor may provide selective notification regarding software upgrades based on user profile data. Similarly, the VAR or vendor may provide selective notification regarding relevant publications. Publications may include electronic publications such as white papers, bulletins, or other material as described herein that a user may read. Such information may be used to improve customer knowledge in a particular area, about an application, particular task, vendor or VAR specific software or hardware, and the like.

Figure 27:
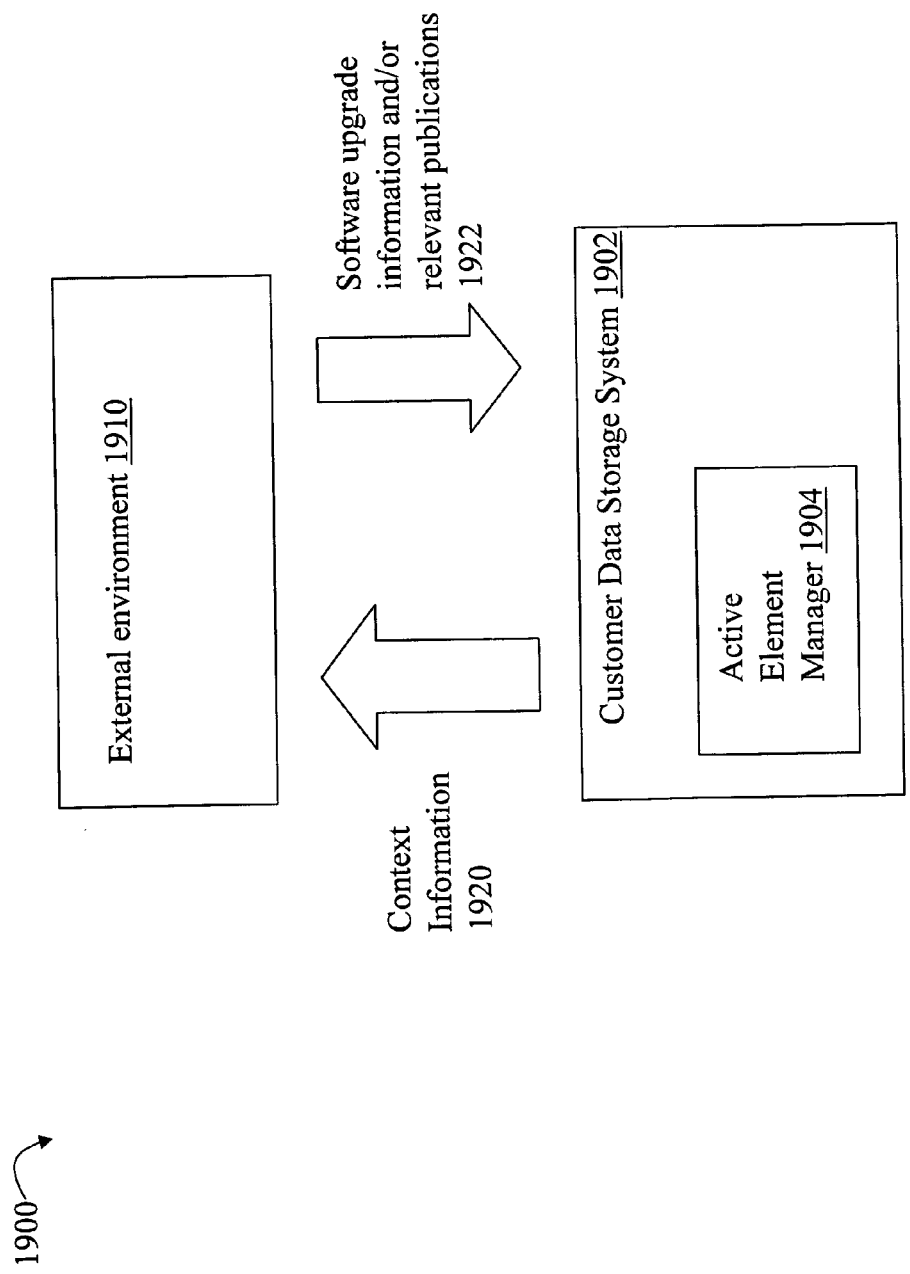

Referring to FIG. 27, shown is an example illustrating a flow of information in an embodiment using the techniques herein to provide support information related to software upgrades and/or publications. In following paragraphs describing the example 1900, reference may be made to providing software upgrade information and notifications. However, the same information flow and description for the example 1900 may be performed with respect to providing notification regarding relevant publications. The example 1900 illustrates a flow of information as may occur in an embodiment in connection with a user logged into the AEM and performing a task, for example, by interactively issuing commands to the AEM via a user interface. The AEM 1904 may collect context information 1920 based on user activity and transmit the context information 1920 to one or more locations in the external environment 1910. Such collection and transmission of context information 1920 may occur while a user is logged into the AEM. In response, the external environment 1910 may perform processing and evaluate the context information 1920 to determine one or more relevant software upgrades 1922 which are transmitted to the data storage system 1902. In one embodiment, the exchange indicated by 1920 and 1922 may be performed while the AEM is online or in-use with a user logged into the AEM. As also described elsewhere herein, context information 1920 may be collected while a user is logged into the AEM, and the software upgrade information 1922 may be transmitted to the data storage system 1902 while the AEM is not being used (e.g., no user logged in). In this latter case, the user may be presented with software upgrade information 1922 when the user logs into the AEM at a later point in time.

Notification regarding new software upgrades and/or publications may take place in an asynchronous manner as such upgrades and publications become available. For example, when a new publication or software upgrade becomes available, a location in the external environment, such as a VAR website, may perform processing to determine, based on previously received context information (or more generally user profile data), which users are to be notified.

As with other processing described herein, the context information 1920 may include a trace log, data storage configuration information, and the like.

As in connection with other forms of support information described, for example, in FIGS. 21-23, the AEM 1904 may perform a first analysis of context information and make a determination as to which location in the external environment to forward context information. As also described herein, the one or more locations with which the AEM 1904 communicates may vary in accordance with configuration options/settings as well as the context information obtained during a time interval (e.g., user activity information collected, data storage configuration, and the like).

The software upgrade information 1922 provided may be related to the context of how a user is using the data storage system. If such software upgrade information 1922 is provided based on a particular set of context information collected for a time period, then such software upgrade information 1922 may vary in accordance with changes in user activity. If software upgrade information 1922 is provided using current or recent context information as well as other information collected over time (e.g. such as in the user profile), then such information 1922 may be based on recent user activity observed as well as historic user collected data.

Notification regarding the software upgrades available may take any one or more different forms. For example, the notifications may be in the form of an email, pop-up or dialogue box, UI indicator (e.g., such as illustrated in FIG. 9 and described elsewhere herein), and the like.

The data storage system may conditionally or selectively send the context information to one of a variety of different sites based on initial analysis performed on the data storage system.

The analysis may be performed by the AEM with respect to the context information collected during a time interval. Alternatively, the data storage system may not perform any analysis of the context information and may just collect and send the context information to one or more external environment locations, such as a VAR and/or vendor website, at which the context information is analyzed.

With reference to FIG. 27 as well as other examples herein, relevant publication information may be, for example, in the form of a hyperlink or location at which an electronic publication may be obtained.

Figure 28:
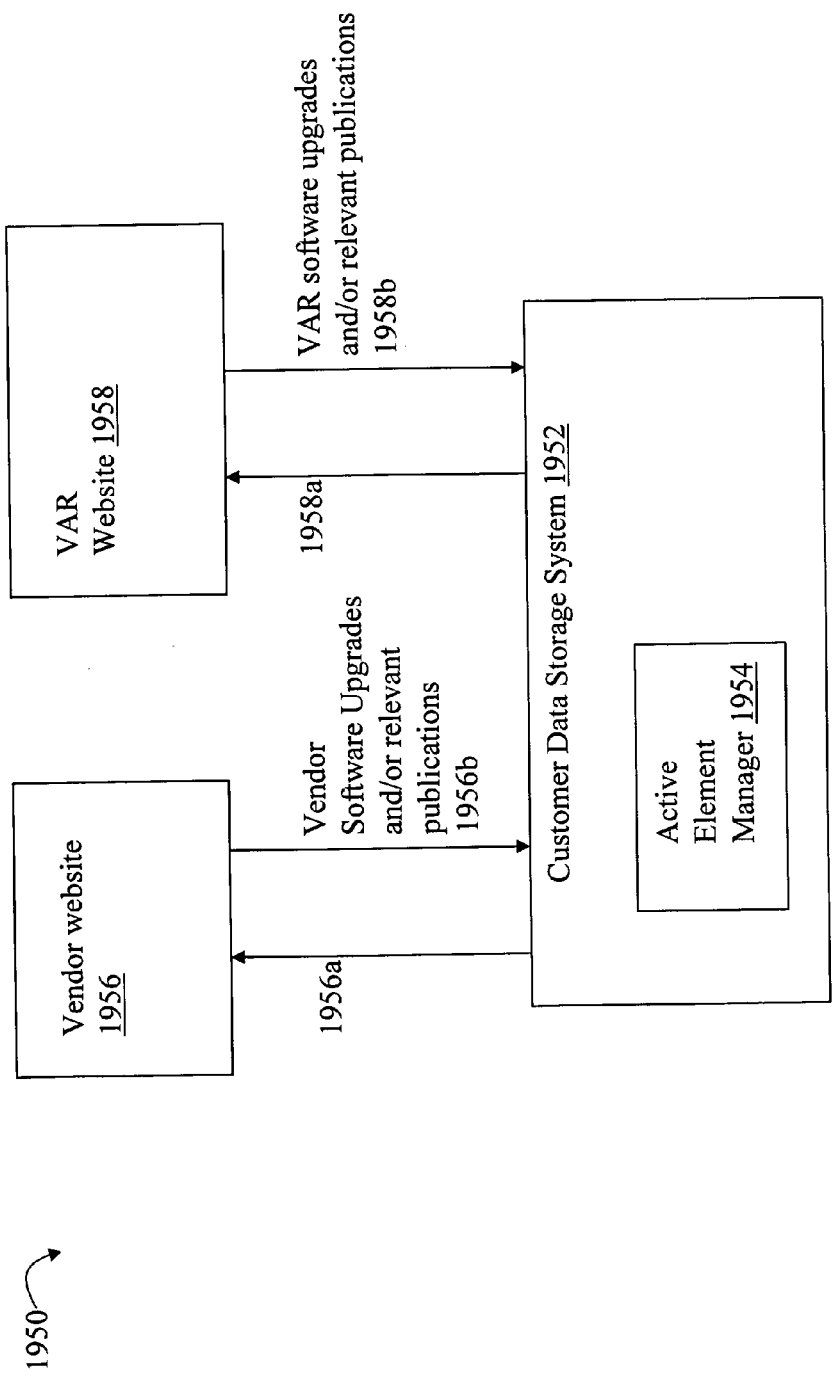

Referring to FIG. 28, shown is an example 1950 illustrating a data flow of information in one embodiment in connection with techniques herein for providing support information related to software upgrades and/or publications. Description in following paragraphs for the example 1950 may make reference to providing software upgrade notifications. However, the same description and information flow of 1950 also applies with respect to providing notification regarding relevant publications. The example 1950 illustrates one particular way in which interactions may occur between the data storage system 1952 and one or more locations in the external environment as represented more generally in FIG. 27. As described above, context information may be collected while a user is logged onto and interactively using the AEM 1954 to perform a task. Analysis may be optionally performed on the data storage system 1952 to selectively forward context information to the website 1956 and/or 1958. The analysis may include extracting vendor-specific context information along with general context information and providing such information 1956a to the vendor website 1956. The analysis may include extracting VAR-specific context information along with general context information and providing such information 1958a to the VAR website 1958a. One or more instances of context information may be transmitted to each of 1956 and/or 1958 at various points in time. Analysis performed at each of 1956 and/or 1958 to determine relevant software upgrades may make use of the context information as well as other information included in user profile data. When a vendor has a software upgrade, such as in the form of a patch, new software version, or event a new software product, and the like, the vendor may use the context information, and more generally information in a user profile, to determine which users to selectively notify regarding the software upgrade via 1956b. If the software upgrade is of a general nature, the software upgrade may be provided to all users. If the software upgrade, for example, relates to performing certain tasks, operations that may be particular to one or more applications, and the like, the vendor may provide notification regarding software upgrades to selected users based on collected information including, for example, one or more instances of context information. Similarly, the VAR website 1958 may receive context information 1958a and use the one or more instances of the context information, alone or in conjunction with other user profile information, to selectively send notifications 1958b regarding relevant VAR software upgrades.

The AEM 1954 of data storage system 1952 may be configured by the VAR to connect 1956a to a vendor website 1956 providing context information 1956a. Element 1956a denotes transmission of the context information including vendor specific information as well as possibly other information as described herein. In turn, as described above, analysis of the context information may be performed at the vendor website to provide notification regarding relevant vendor software upgrades 1956b. The information in 1956b may include a link to a website location from which the software upgrade may be downloaded and installed.

In the example 1950, the AEM 1954 of data storage system 1952 may be configured by the VAR to connect 1958a to a VAR website 1958 providing context information 1958a. Element 1958a denotes transmission of the context information including VAR-specific information as well as possibly other information as described herein. In turn, as described above, additional analysis of the context information may be performed at the VAR website to provide notification regarding relevant vendor software upgrades 1958b. The information in 1958b may include a link to a website location from which the software upgrade may be downloaded and installed.

As described above, context information may be transmitted to any one or more locations in the external environment, such as a vendor website or VAR website. The external environment locations to which the AEM connects and transmits context information may vary depending on, for example, configuration settings in the AEM (and data storage system). Such configurations may be made by the VAR or other partner.

Figure 29:
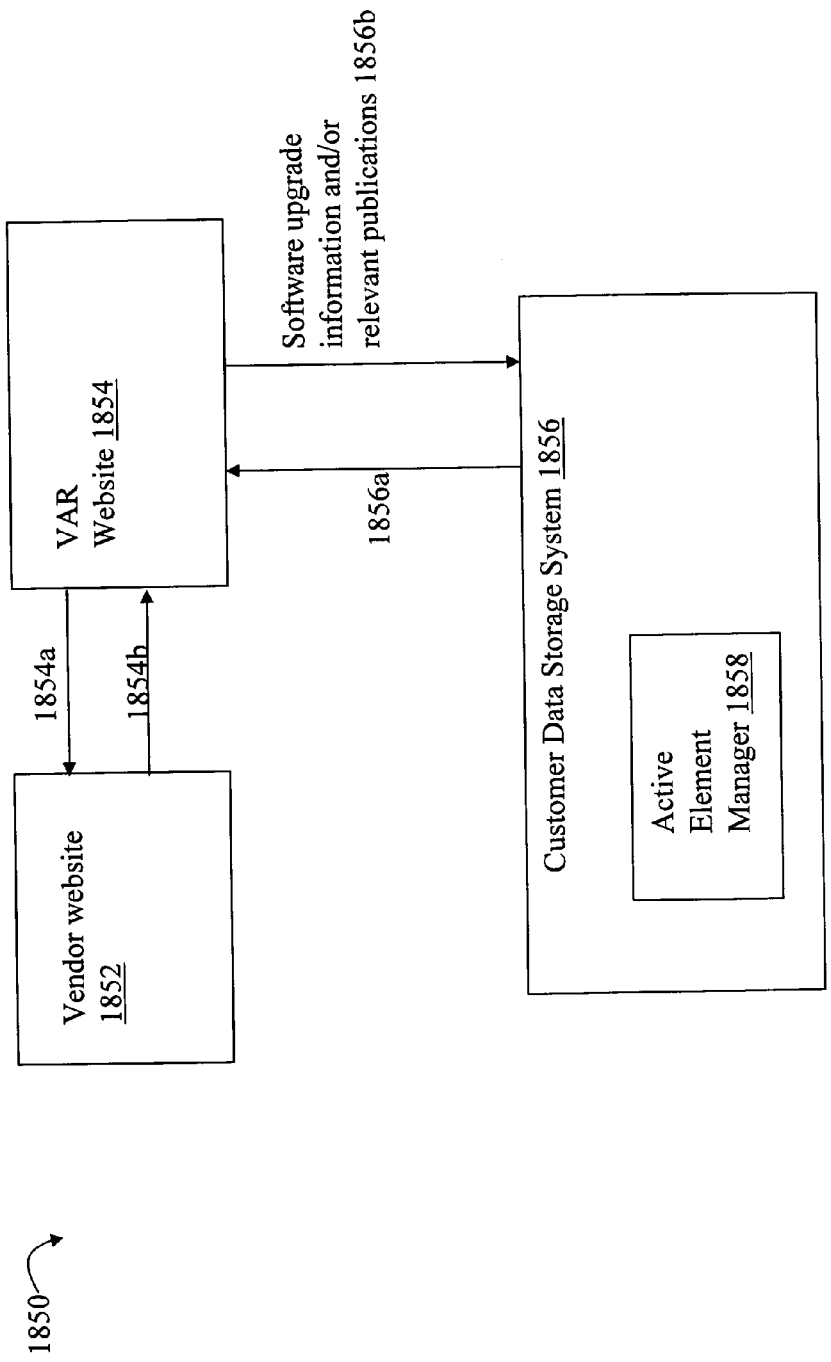

Referring to FIG. 29, shown is another example illustrating how data flow may occur between components in connection with the techniques herein with providing support information relates to software upgrades and/or publications. Set forth in following paragraphs, description related to the example 1850 and information flow may make reference to providing software upgrade notifications. However, the same information flow and description also applies in connection with providing notification regarding relevant publications. The example 1850 illustrates a way in which dataflow may occur to provide support information to a user of the AEM 1858. The context information may be collected at various times while the user is logged into the AEM 1858. Such context information may be transmitted to an external environment location such as the VAR website 1854. The example 1850 illustrates a particular way in which interactions may occur between the data storage system 1856 and a location in the external environment. However, as described elsewhere herein, the AEM and data storage system 1856 may transmit the context information directly to one or more other locations in the external environment such as the vendor website as an alternative to, or in addition to, the VAR website 1854.

In the example 1850, the AEM 1858 may be configured to initially contact the VAR website 1854 and to forward context information thereto at defined time intervals while the user is logged into the AEM. An embodiment of the AEM 1858 may not perform an initial analysis regarding the state of the storage system or other context information. At defined time intervals while the user is logged into the AEM, the AEM may collect and transmit 1856a context information to the VAR website 1854. Analysis of the context information transmitted may be performed at the VAR website 1854 to transmit user-relevant software upgrade information 1856b to the data storage system 1856. Upon receiving the context information, the VAR website 1854 may analyze the context information, alone or in conjunction with other user profile information, to determine relevant software upgrade information of the VAR. The VAR website 1854 may also communicate (e.g., 1854a and 1854b) with the vendor website 1852 as needed, for example, to periodically obtain information regarding any software upgrades of the vendor (e.g., as illustrated by 1854a and 1854b). The VAR website 1854 may provide software upgrade information in 1856b which is a combination of vendor and VAR software upgrade information determined as relevant in accordance with the context information 1856a as well as user profile information that may be collected over time. The VAR website 1854 may also serve as a filter to include only certain vendor software upgrades in the information 1856b provided to the data storage system 1856.

As an example of the analysis that may be performed on the VAR website, the context information may be analyzed and, based on user activity (e.g., such as data storage configuration information, commands related to performing a particular task or application, searches performed of help files, knowledge bases, and the like), the data storage system 1856 may be selectively notified of software upgrades in 1856b. The VAR website may indirectly facilitate providing information regarding relevant vendor-related software upgrades obtained from the vendor website 1852. As such, the user of the AEM 1858 may be unaware of any such communications with the vendor website 1852.

The data flow of the example 1850 may be the result of a configuration option or setting by a VAR in the AEM. The user or customer of the data storage system may not be allowed to modify such a setting.

In connection with FIGS. 27-29 in one embodiment, analysis performed to determine relevant software upgrade information may use data storage configuration and current revision information. The data storage configuration information may indicate the relevant software installed and/or used in connection with the data storage system and the revision information may indicate the current version on the data storage system. In connection with providing information regarding relevant publications, trace log information regarding user activity such as performed on the data storage system and elsewhere (e.g., in connection with interactions in the external environment) may be used along with a user identifier and data storage system identifier to determine relevant publications about which to provide notification.

In connection with FIGS. 21-29, the evaluation performed by the external environment may be performed using automated and/or manual techniques. For example, the processing may be performed using software and/or evaluation by a support person.

In connection with the evaluation as described above by the external environment, licensing information may be used to selectively inhibit or allow particular support information to be provided. Licensing information may be used, for example, with respect to processing described in connection with FIGS. 21-29. Licensing information may be an input to the evaluation processing performed on the vendor website and/or VAR website. In connection with processing described herein, the user relevant support information may be determined. However, prior to providing such information, a check may be performed to determine whether the user, AEM and/or data storage system is licensed to receive all of the user relevant support information.

Collectively, different types of support information and support services can be provided as described above. For example, notification may be provided regarding relevant training information, publications, different types of software upgrade information (e.g., patches, new versions), and updates to help and error messages. Support services may include interactive support in the form of context aware chat, phone support, and the like. As described above, different types of relevant support information may be provided and/or support services performed to assist a user. Prior to sending any information to the data storage system or otherwise initiating any type of support service, a determination may be made as to whether the data storage system and/or particular user is licensed to receive such support information and/or support service. If a user and/or data storage system is not licensed to receive one or more types of support information or partake in a particular support service (e.g., such as interactive or contact aware chat, or phone support), the unlicensed support information is not provided and the unlicensed support service is not initiated or suggested. Rather, the user may be notified regarding the option to receive such support information or participate in particular support services if certain actions are taken. For example, the user may be notified as to what different support information or services may be provided if an upgrade to an existing license is purchased.

An example illustrating use of licensing as a filter in the evaluation process as may be performed by one or more locations in the external environment will now be described with respect to a VAR. However, it should be noted that using licensing as a filter in the evaluation process is also applicable to other external environment locations such as vendor websites.

In one embodiment, a VAR may determine which one or more of the foregoing forms of assistance or support are most costly. For example, interactive support or online technical assistance, and phone call support may be determined as the most costly of all support services provided by a VAR. As such, these forms of support may be provided as a licensing option with the highest or most expensive license. A VAR may provide a tiered license structure of one or more levels. Each level may provide a set of support services. For example, an embodiment may define 3 levels of licensing support: level 1 (basic or bronze support), level 2 (intermediate or silver support), and level 3 (highest or gold support). Level 1 support may include providing notifications regarding software upgrades which are patches or bug fixes, help updates and improved error messages. Level 2 support may include providing notifications as in level 1 with additional notifications regarding available training opportunities, publications and new software versions. Level 3 support may include providing notification as in level 2 with additional support options including interactive chat with an support person, phone support and other forms of more personal interaction with a live support person.

An embodiment may also allow for purchase on an individual basis one or more of the support options described herein. The filtering may be based on the defined licensing levels, individual support options purchased, and/or other licensing structures as may be utilized in an embodiment. In response to a user and/or data storage system not having an appropriate license or support contract, notification may be provided regarding the available options or upgrades and associated support provided therewith. For example, if it is determined that notification regarding relevant publication information may be an appropriate support response and a user and/or data storage system has the foregoing level 1 basic support license, the user may be notified that there are relevant publications which may be of use in connection with a particular problem the user is experiencing. However, notifications regarding such publications are only provided with level 2 and level 3 support licenses which are available for purchase.

Figure 30:
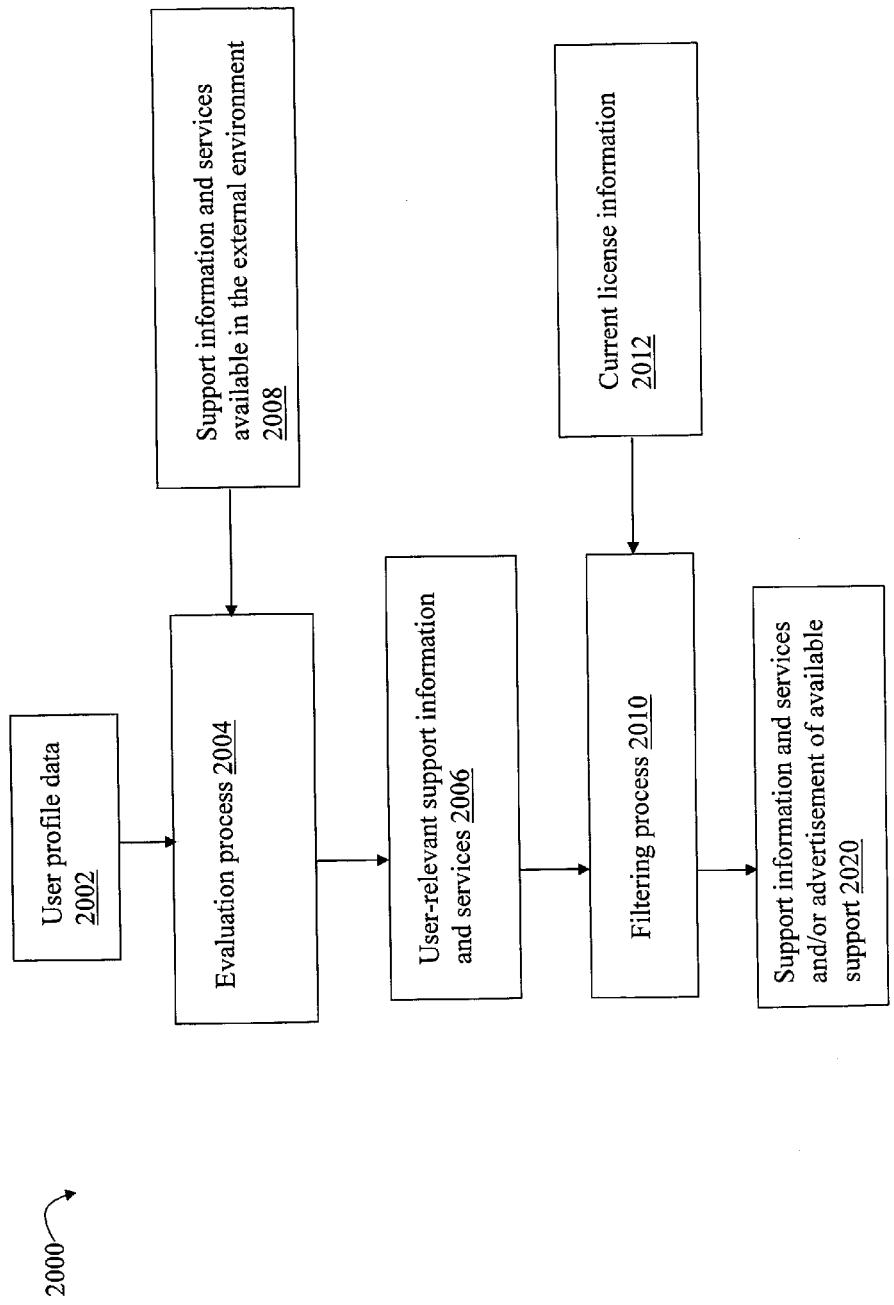
FIG. 30 is an example illustrating data flow processing as may be performed in an embodiment to determine relevant support information and services.

Referring to FIG. 30, shown is an example illustrating the logical processing and data flow that may be performed in connection with techniques described herein for providing one or more types of relevant support information and support services to a user of the AEM from a location in the external environment. The illustration 2000 summarizes the processing that may be performed as just described in accordance with context information, or more generally user profile data, at a location in the external environment. As described herein, one or more sets of context information as provided by the AEM to a location in the external environment, such as a VAR website, may collected and stored in a user profile. The user profile data 2002 may include one or more instances of context information as well as other types of information that may be obtained. In other words, the user profile data 2002 of FIG. 30 may be characterized as a superset of context information as provided by the AEM to the external environment.

The illustration 2000 includes performing an evaluation process 2004. Inputs to the evaluation process include user profile data 2002 and support information and services available in the external environment 2008. The evaluation process 2004 may select one or more of the available support information as services 2008 in accordance with the user profile data 2002. Based on the information in 2002, the processing of 2004 may be used to select appropriate support information and/or services from 2008. Element 2006 represents the selected support information and/or services determined as relevant in accordance with the user profile data 2002. Element 2008 may collectively represent the different types of available support information and services including, for example, notification regarding training information, publications, different types of software upgrade information (e.g., patches, new versions), updates to help and error messages, providing interactive support in the form of context aware chat, phone support, and the like. Processing in 2004 produces as an output the selected user-relevant support information and services 2006. Processing of 2004 may be performed using automated and/or manual techniques. Information and services included in 2008 may be from one or more external environment locations. Each such location may perform its own evaluation processing 2004.

The user-relevant support information and services 2006 and current license information 2012 may be inputs to the filtering process 2010. The current license information 2012 represents the license level or support options which the data storage system and/or user has purchased. The filtering process 2010 determines which of the items in 2006 are allowed under the current license 2012 for the data storage system and/or user. As an example, element 2012 may indicate that a user and/or data storage system currently has license support for one of the three licensing levels described above, individual support options purchased, and the like. The filtering of 2010 may be performed to determine which forms of the user-relevant support information and services of 2006 the user is entitled to receive. Additionally, the filtering of step 2010 may also determine an appropriate advertisement for available support options which the user and/or data storage system does not have with a current license. The advertisement may provide notification regarding other additional licensing information and services that may be purchased with a license upgrade. Element 2020 collectively represents the support information and services allowed under the current license, and also an appropriate advertisement as described above, if any. A message regarding the information of 2020 may be sent from one or more locations in the external environment to the data storage system for presentation to the user via the AEM.

It should be noted that the license information may be communicated as part of the context information. License information may also be available at one or more locations in the external environment through other means. For example, a VAR and/or vendor may have licensing information about a particular user and/or data storage system based on a previous registration or purchase.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method for providing support in connection with a data storage system, the method comprising:
    performing, by an active element manager component, a data storage system management operation in connection with a data storage device of the data storage system;
    collecting, by said active element manager component, context information, said context information including information about a current state of the data storage system in connection with said data storage management operation performed with an active element management session having a first user identifier;
    performing analysis of said context information by said active element manager component, said analysis including determining whether the context information indicates a problem related to performing a task for a particular application, said context information including user activity information comprising query terms entered in connection with a plurality of user search queries performed to determine how to complete the task;
    transmitting said context information from said data storage system to an external environment which is selected in accordance with said analysis, has connectivity to said active element manager component and is external with respect to a data storage system environment including said data storage system;
    receiving user relevant information at said active element manager component from said external environment, wherein said external environment determines said user relevant information in accordance with said context information and support information and services provided by said external environment, said user relevant information including information about any of one or more types of support including updated help, updated error messages, a software upgrade, available training, electronic publication, and an interactive support dialogue; and
    displaying, for said active element management session having said first user identifier, said user relevant information via a user interface, and
    wherein said analysis includes determining whether the context information indicates a first problem related to a device of the data storage system provided by a first vendor or a second problem related to a software or hardware component provided by another vendor and said external environment is a first website of the first vendor if said analysis determines the context information indicates the first problem and said external environment is a second website of said another vendor if said analysis determines the context information indicates the second problem, and wherein said active element manager component determines that said second website is a website of a value added reseller, and said active element manager component determines first information related to a component used in said data storage system supplied by said value added reseller and includes said first information in context information provided to said second website.

2. The method of claim 1, wherein said transmitting is performed in response to a selection to receive assistance in connection with performing said data management operation.

3. The method of claim 2, wherein said user relevant information includes information about at least one of updated help, updated error messages, and a software upgrade, and said user interface provides for display a first portion of said user relevant information, wherein, upon selection of said first portion, said active element manager component connects to a target location in said external environment that is associated with said user relevant information to obtain said at least one of updated help, updated error messages, and software upgrade.

4. The method of claim 1, wherein said active element manager component is included in said data storage system and communicates with said external environment over a network connection, said external environment including a network location having a first web site and the data storage system being location at another network location.

5. The method of claim 1, wherein said context information includes a trace log of one or more actions performed on the data storage system.

6. The method of claim 1, wherein said transmitting is performed at defined time intervals.

7. The method of claim 6, wherein said user relevant information includes information regarding at least one of training, a software upgrade, and a publication.

8. The method of claim 1, further comprising:
    determining, in accordance with a license for said data storage system, a portion of said support information and services provided by said external environment; and performing processing in said external environment to ensure that said user relevant information only includes support information and services of said portion.

9. The method of claim 8, wherein said user relevant information includes an advertisement for a support feature not included in said portion.

10. The method of claim 1, wherein said receiving occurs in response to said transmitting.

11. The method of claim 1, wherein said receiving occurs in response to said external environment providing one of: a new training offering, a new software upgrade, or a new publication.

12. The method of claim 1, wherein at least one of said active element manager and said data storage system is configured to transmit one or more instances of context information for defined time period and, wherein, if said user relevant information includes a training offering, said training offering is displayed in said displaying only after said defined time period.

13. The method of claim 1, wherein said external environment performs analysis of said context information to determine said user relevant information, said analysis including executing software on a computer of said external environment.

14. The method of claim 1, wherein the particular application is any of an electronic mail application and a database application, the task is provisioning storage for the particular application, and the user relevant information includes information on performing the task of provisioning storage for the particular application.

15. A data storage system comprising a computer readable medium with executable code stored thereon for providing support in connection with a data storage system, the computer readable medium comprising executable code for:
  performing, by an active element manager component, a data storage system management operation in connection with a data storage device of the data storage system;
  collecting, by said active element manager component, context information, said context information including information about a current state of the data storage system in connection with said data storage management operation performed with an active element management session having a first user identifier;
  performing analysis of said context information by said active element manager component, said analysis including determining whether the context information indicates a problem related to performing a task for a particular application, said context information including user activity information comprising query terms entered in connection with a plurality of user search queries performed to determine how to complete the task;
  transmitting said context information from said data storage system to an external environment which is selected in accordance with said analysis, has connectivity to said active element manager component and is external with respect to a data storage system environment including said data storage system;
  receiving user relevant information at said active element manager component from said external environment, wherein said external environment determines said user relevant information in accordance with said context information and support information and services provided by said external environment, said user relevant information including information about any of one or more types of support including updated help, updated error messages, a software upgrade, available training, electronic publication, and an interactive support dialogue; and
  displaying, for said active element management session having said first user identifier, said user relevant information via a user interface, and
  wherein said analysis includes determining whether the context information indicates a first problem related to a device of the data storage system provided by a first vendor or a second problem related to a software or hardware component provided by another vendor and said external environment is a first website of the first vendor if said analysis determines the context information indicates the first problem and said external environment is a second website of said another vendor if said analysis determines the context information indicates the second problem, and wherein said active element manager component determines that said second website is a website of a value added reseller, and said active element manager component determines first information related to a component used in said data storage system supplied by said value added reseller and includes said first information in context information provided to said second website.

16. The data storage system of claim 15, wherein the computer readable medium further includes executable code for:
  determining, in accordance with a license for said data storage system, a portion of said support information and services provided by said external environment; and
  performing processing in said external environment to ensure that said user relevant information only includes support information and services of said portion.

17. The data storage system of claim 16, wherein filtering of said support information is performed in accordance with said license by said executable code for determining a portion of said support information and services provided by said external environment to ensure that only allowable support information is included in said user relevant information.

* * * * *